US005737481A

United States Patent [19]
Gushima et al.

[11] Patent Number: 5,737,481
[45] Date of Patent: Apr. 7, 1998

[54] INFORMATION RECORDING METHOD, INFORMATION RECORDING APPARATUS AND INFORMATION RECORDING MEDIUM

[75] Inventors: Toyoji Gushima, Habikino; Yoshiharu Kobayashi; Ryoji Yamaguchi, both of Katano; Satoshi Kondo, Sakai; Katsuhiko Yoshida, Takatsuki; Shigeru Furumiya, Himeji; Kenji Koishi, Sanda; Yoshinari Takemura, Settsu, all of Japan

[73] Assignee: Matsushita Electric Industrial Co., Ltd., Kadoma, Japan

[21] Appl. No.: 493,150

[22] Filed: Jun. 21, 1995

[30] Foreign Application Priority Data

Jun. 22, 1994 [JP] Japan ................................. 6-140130
Nov. 22, 1994 [JP] Japan ................................. 6-287846

[51] Int. Cl.$^6$ ............................. H04N 5/911; H04N 7/64
[52] U.S. Cl. ........................................... 386/113; 386/116
[58] Field of Search ........................... 386/66, 109, 125, 386/126, 111, 107, 106, 112, 117, 116, 113, 129, 34, 40; 360/32; H04N 5/911, 7/64

[56] References Cited

U.S. PATENT DOCUMENTS

| | | | |
|---|---|---|---|
| 5,043,816 | 8/1991 | Nakano et al. | 358/209 |
| 5,471,450 | 11/1995 | Yonemitsu et al. | 369/60 |
| 5,485,447 | 1/1996 | Minoda | 369/84 |

FOREIGN PATENT DOCUMENTS 4103079  4/1992  Japan .

OTHER PUBLICATIONS

Maeda, Journal of the Acoustical Society of Japan, vol. 49, No. 4, pp. 277–283, 1993 "Minidisc System."

Yano et al, Radio Gijutsu, pp. 165–180, 1993, "All of the Sony MD (Minidisc) Techniques, for Example, Magneto-Optical Recording and Adaptive Transform Acoustic Coding".

Primary Examiner—Robert Chevalier
Attorney, Agent, or Firm—Renner, Otto, Boisselle & Sklar, P.L.L.

[57] ABSTRACT

An information recording apparatus for continuously recording information without losing any information even if the apparatus temporarily falls into a recording-disable state owing to the shock externally applied, etc. is provided. A disability detector for detecting the recording-disable state is provided in the information recording apparatus, thereby interrupting the recording operation and the reading operation from the buffer memory under the recording-disable state, and making a coding rate reduction controller instruct a coder to temporarily reduce the coding rate of the input information. A remaining capacity detector is provided for monitoring the remaining capacity in the buffer memory and instructing the coder to temporarily reduce the coding rate of the input information when the remaining capacity becomes a predetermined value or less. As a result, the reduction in the remaining capacity of the buffer memory under the recording-disable state is prevented. When the overflow of the buffer memory is detected, the information after the generation of the overflow is controlled to be overwritten on a part of the data already written into the buffer memory. The variation history of the case where the recording data amount is varied by the coder because of the variation in the coding rate of the input information or the overwriting operation in the buffer memory is controlled to be recorded on the disk as rate variation management information. By dividing the recording area on a disk-shaped information recording medium into an inner circumference and an outer circumference and recording on the outer circumference after the return from the recording-disable state, the recording transfer rate after the return becomes higher.

26 Claims, 24 Drawing Sheets

FIG.10

| Block identification data | Coded data corresponding to one block | #0 |
| --- | --- | --- |
| Block identification data | Coded data corresponding to one block | #1 |
| Block identification data | Coded data corresponding to one block | #2 |
| Block identification data | Coded data corresponding to one block | #3 |
| ⋮ | ⋮ | |
| Block identification data | Coded data corresponding to one block | #(mi−1) |
| Block identification data | Coded data corresponding to one block | #mi |
| ⋮ | ⋮ | |
| Block identification data | Coded data corresponding to one block | #m−1 |

58, 15

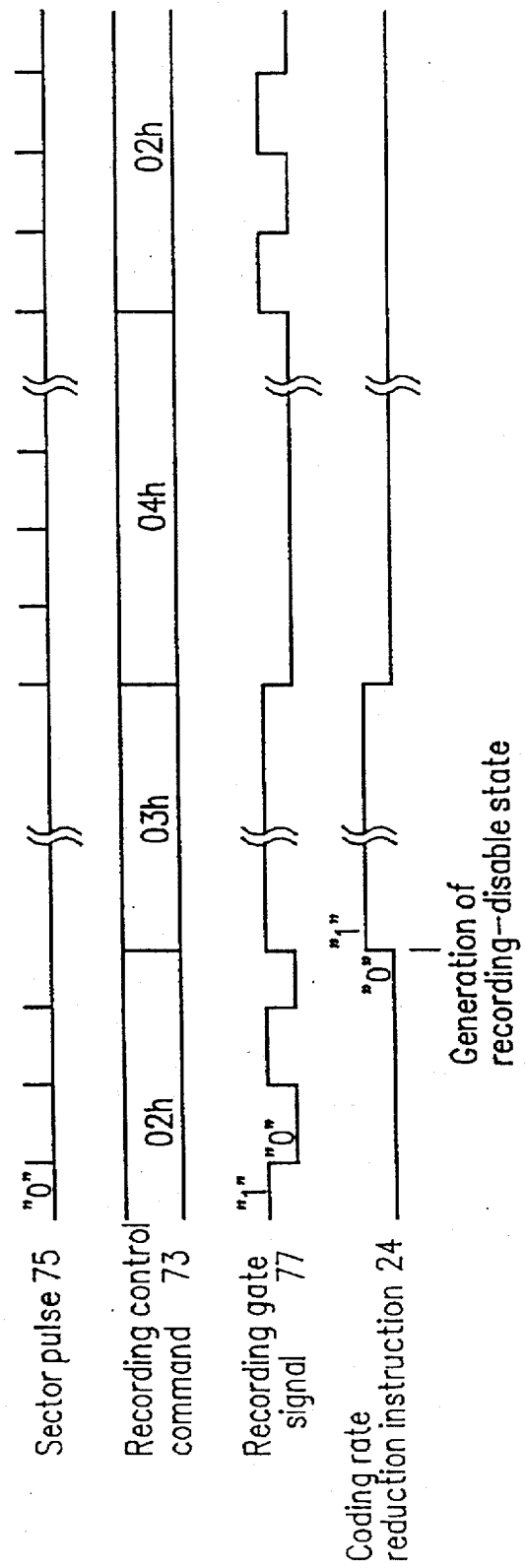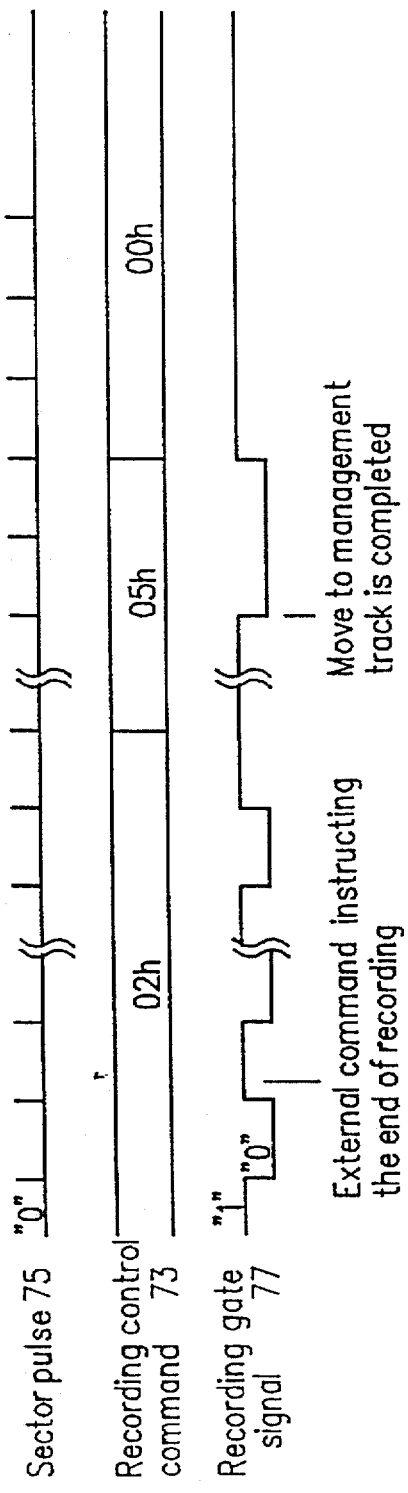

FIG.17

DC component　　High-frequency components

High-frequency components $$\begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix}$$

FIG. 23A
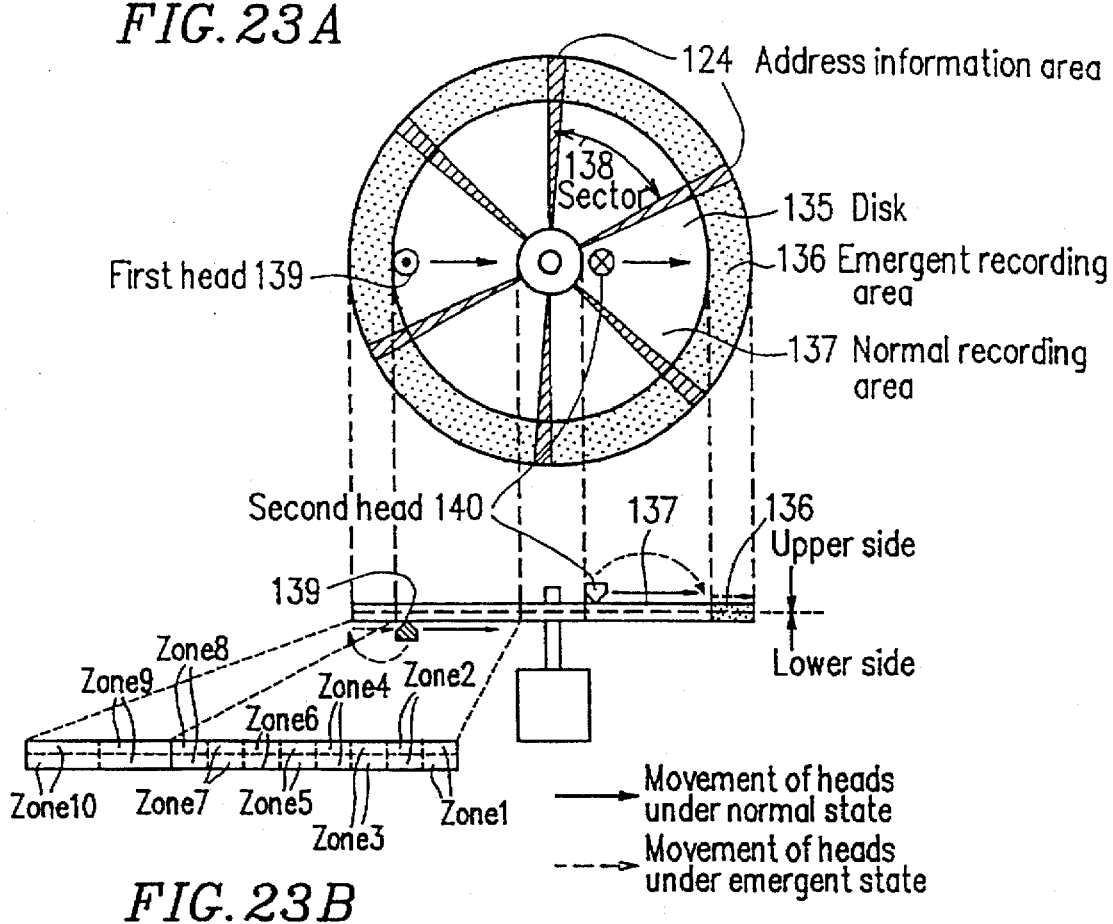
FIG. 23B
| Head | Emergent recording → | Normal recording → | | | | | | | | |
|---|---|---|---|---|---|---|---|---|---|---|
| Zones to which first head accesses | 10 | 9 | 8 | 7 | 6 | 5 | 4 | 3 | 2 | 1 |
| Zones to which second head accesses | 9 | 10 | 1 | 2 | 3 | 4 | 5 | 6 | 7 | 8 |
FIG. 23C
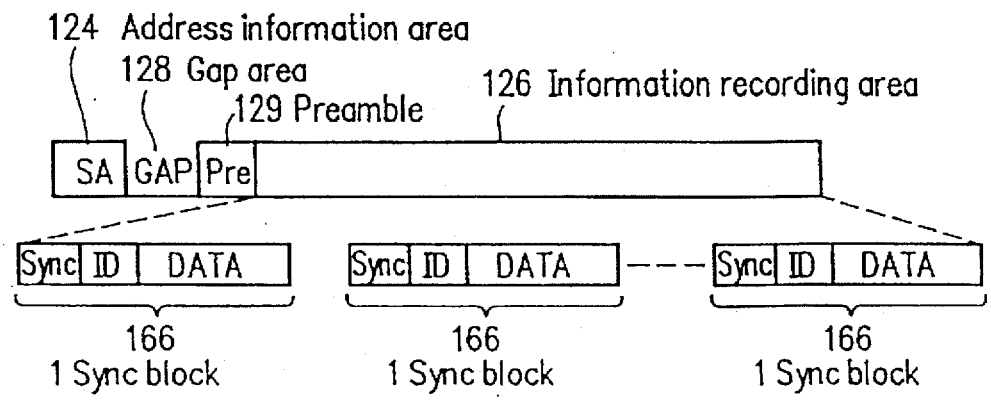

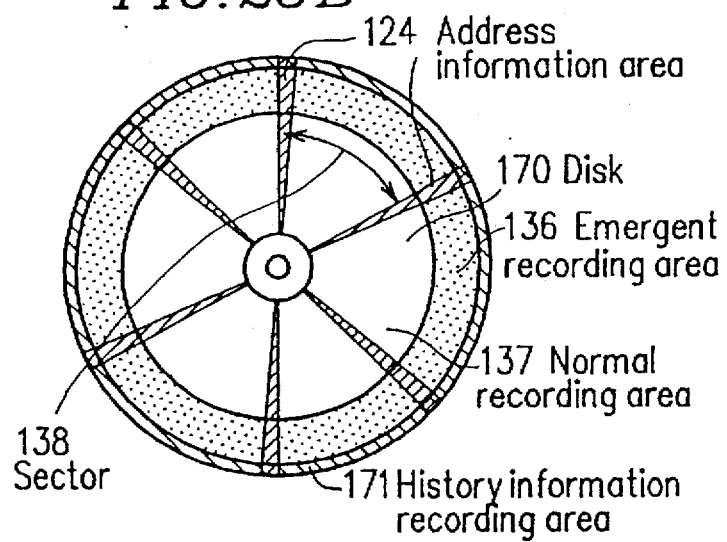

INFORMATION RECORDING METHOD, INFORMATION RECORDING APPARATUS AND INFORMATION RECORDING MEDIUM

BACKGROUND OF THE INVENTION

1. Field of the Invention

The present invention relates to an information recording method, an information recording apparatus, and an information recording medium. More particularly, the present invention relates to an information recording method, an information recording apparatus, and an information recording medium which are suitable for recording information to be continuously input such as image or sound, in particular.

2. Description of the Related Art

In recent years, a high density recording medium in a disk shape such as an optical disk has been developed and the transfer rate of an apparatus for driving such a disk has been more and more accelerated. Reflecting such tendencies, a disk recording apparatus for recording information on a disk-shaped recording medium by a real-time process of a video signal has come into practical use.

A conventional disk recording apparatus has a problem in that an off-track state or the like of a recording head is generated when an external vibration or the like is applied to the apparatus. As a result, the recording apparatus temporarily shows a state where recording can not be performed (hereinafter, such a state will be referred to as a "recording-disable state"). Therefore, in the case of recording information to be continuously input, in particular, a discontinuity is adversely generated in the recorded information.

In order to solve this problem, acoustic signal recording and reproducing apparatuses (see, for example, Japanese Laid-Open Patent Publication No. 4-103079, The Journal of the Acoustical Society of Japan, Vol. 49, No. 4, pp. 277–283, and Radio Gijutsu, March 1993, pp. 165–180) which have become commercially available recently utilize a recording method in which data obtained by bit compressing an acoustic signal is once stored in a buffer memory at a certain data rate, and the stored data is read out from the buffer memory at a higher data rate than a write rate of the buffer memory so as to record the data on a disk continuously.

According to this conventional method, two-channel sound is sampled at a sampling frequency of 44.1 kHz and a number of quantization bits of 16. Thereafter, the sampled digital data is compressed so as to obtain a compressed digital data. The compressed digital data has approximately one-fifth of input data rate (about 1.5 Mbps), i.e., transfer rate of the compressed digital data is about 300 kbps. Next, the compressed digital data is once written into a buffer memory. Then, after redundant data such as an error correction code (often referred to as an "ECC") is added to the compressed data read out from the buffer memory and the data is subjected to an eight-to-fourteen modulation, the data is written on an magneto-optic disk. An input signal is compressed so as to have a constant bit rate, i.e., about one-fifth bit rate. On the other hand, the operation of recording the data on the magneto-optic disk is intermittently performed at a rate equal to the rate required for recording a non-compressed signal, that is to say, a rate about five times as high as the rate of the compressed data, i.e., at about 1.5 Mbps.

Even if the recording cannot help being discontinued due to the off-track state or the like of the recording head during a series of recording operations, the data can be held during a period corresponding to the capacity of the buffer memory because the input acoustic signal is written into the buffer memory. When the head returns to a predetermined track and the recording can be started again, the recording is started again with the data stored in the buffer memory and the recording of the data onto the disk is continuously performed until the amount of the data accumulated in the buffer memory becomes equal to or smaller than a predetermined amount. In this method, though an intermittent recording is normally performed, a continuous recording is performed immediately after the recording has been discontinued. Therefore, an apparent transfer rate becomes about five times as high as the normal rate, and therefore, a remaining capacity can be promptly recovered in the buffer memory.

According to the above-described conventional method, however, since the input signal is compressed at a constant rate, the data cannot be held over a predetermined period corresponding to the capacity of the buffer memory. If the recording-disable state should continue for the period corresponding to the capacity of the buffer memory or longer, then the buffer memory will overflow and it becomes impossible to continuously store the input signal in the buffer.

In the above description, a case where the conventional method is applied to the recording of an acoustic signal to be continuously input has been explained. On the other hand, in the case where a video signal is continuously input, even if the bit compression is performed, it is generally difficult to obtain a five-time-higher recording transfer rate unlike the case of the acoustic signal because the input transfer rate for the video signal is higher than that for the acoustic signal. Therefore, the time period required for restoring the remaining capacity in the buffer memory from just after the discontinuation of the recording becomes necessarily longer as compared with the case of the acoustic signal.

Because of the above-described reasons, according to the above-described conventional method, in the case of recording a data requiring a high transfer rate such as a video signal, a necessary amount of memory capacity becomes adversely enormous in order to continuously record the data without any lack of the data even if the off-track states are generated frequently. In addition, the conventional method does not think much of the reliability of the data when the recording-disable state continues because of the off-track states occurring frequently and the vibration externally applied continuously and the buffer memory overflows.

SUMMARY OF THE INVENTION

According to a aspect of the invention, an information recording method for writing input information into a memory means once so as to record the information read from the memory means onto a recording medium is provided. In this method, a detection of a recording-enable state and a recording-disable state of a recording means is performed during a series of recording operations; on detecting the recording-disable state, the recording operation of the recording means and a reading of the information from the memory means are interrupted; after the recording-enable state is detected again, the reading of the information from the memory means and the recording operation are started again; and a write rate into the memory means is reduced during a predetermined period after the detection of the recording-disable state.

According to another aspect of the invention, an information recording method for writing input information into a memory means once so as to record the information read from the memory means onto a recording medium is provided. In this method, a detection of a recording-enable state and a recording-disable state of a recording means, and a detection of a remaining capacity of the memory means are performed during a series of recording operations; on detecting the recording-disable state, the recording operation of the recording means and a reading of the information from the memory means are interrupted; after the recording-enable state is detected again, the reading of the information from the memory means and the recording operation are started again; and based on results of the detection of the recording-enable state, the recording-disable state, and the remaining capacity, a period during which a write rate into the memory means is reduced is determined.

According to still another aspect of the invention, an information recording method for writing input information into a memory means once so as to record the information read from the memory means onto a recording medium is provided. In this method, a detection of vibration or shock externally applied, a detection of a recording-enable state and a recording-disable state of a recording means, and a remaining capacity of the memory means are performed during a series of recording operations; on detecting the recording-disable state or the vibration or the shock at a predetermined acceleration or more, the recording operation of the recording means and a reading of the information from the memory means are interrupted; after the recording-enable state, or a decrease in the vibration or the shock externally applied to the predetermined acceleration or less is detected again, the reading of the information from the memory means and the recording operation are started again; end based on results of the detection of the vibration or the shock externally applied, the recording-enable state, the recording-disable state, and the remaining capacity, a period during which a write rate into the memory means is reduced is determined.

According to still another aspect of the invention, an information recording method for writing input information into a memory means once based on a predetermined unit so as to record the information read from the memory means onto a recording medium is provided. In this method, a detection of an overflow of the memory means is performed during a series of recording operations; and when the overflow of the memory means is detected, the information after the detection of the overflow is overwritten on a data written into the memory means based on the predetermined unit.

According to still another aspect of the invention, an information recording method for writing input information into a memory means once based on a predetermined unit so as to record the information read from the memory means onto a recording medium is provided. In this method, a detection of a remaining capacity of the memory means and a detection of an overflow of the memory means are performed during a series of recording operations; and based on results of the detection of the remaining capacity and the detection of the overflow, a period during which a write rate into the memory means is reduced, and a period during which the information after the detection of the overflow is overwritten on a data written into the memory means are determined.

According to still another aspect of the invention, an information recording method for writing input information into a memory means once based on a predetermined unit so as to record the information read from the memory means onto a recording medium is provided. In this method, a detection of a recording-enable state and a recording-disable state of a recording means, a detection of a remaining capacity of the memory means and a detection of an overflow of the memory means are performed during a series of recording operations; and based on results of the detection of the recording-enable state and the recording-disable state, the detection of the remaining capacity, and the detection of the overflow, a period during which a write rate into the memory means is reduced, and a period during which the information after the detection of the overflow is overwritten on a data written into the memory means are determined.

According to still another aspect of the invention, an information recording method for writing input information into a memory means once based on a predetermined unit so as to record the information read from the memory means onto a recording medium is provided. In this method, a detection of vibration or shock externally applied, a detection of a recording-enable state and a recording-disable state of a recording means, a detection of a remaining capacity of the memory means, and a detection of an overflow of the memory means are performed during a series of recording operations; and based on results of the detection of the vibration or the shock externally applied, the detection of the recording-enable state and the recording-disable state, the detection of the remaining capacity, and the detection of the overflow, a period during which a write rate into the memory means is reduced, and a period during which the information after the detection of the overflow is overwritten on a data written into the memory means are determined.

In one embodiment, the input information is a video signal; the video signal is analog/digital converted; the analog/digital converted data is written into a memory means; and a number of quantization bits at the analog/digital conversion processing is reduced during a predetermined period.

In another embodiment, the input information is a video signal; a write rate into the memory means is reduced by deleting a part of pixel of the video signal during a predetermined period.

In still another embodiment, the input information is a video signal; a write rate into the memory means is reduced by deleting the video signal on a frame basis or on a field basis during a predetermined period.

In still another embodiment, the input information is a video signal; the video signal is orthogonally transformed into a frequency region based on a first block consisting of a predetermined number of pixels; the orthogonally transformed data is written into the memory means; and a write rate into the memory means is reduced by deleting a part of the orthogonally transformed data and corresponding to AC components of the first block during a predetermined period.

In still another embodiment, the input information is a video signal; the video signal is orthogonally transformed into a frequency region based on a first block consisting of a predetermined number of pixels; the orthogonally transformed data is quantized by using a plurality of quantization matrices and the quantized data is written into the memory means; and a write rate into the memory means is reduced by performing the quantization using a quantization matrix where the values of a part or all of the respective components are larger than those of a quantization matrix used for normal recording during a predetermined period.

In still another embodiment, the input information is a video signal; the video signal is coded based on a second block consisting of a predetermined number of pixels; the coded data is written into the memory means; and a write rate into the memory means is reduced by deleting the coded data based on the second block during a predetermined period.

In still another embodiment, a coded data obtained by error-correction coding the input information is written into the memory means; and a method for generating an error-correction code is changed during a predetermined period.

In still another embodiment, the input information is a video signal; the video signal is divided into odd-numbered pixel blocks consisting of a plurality of odd-numbered pixels obtained by a checkerboard sampling with respect to a screen and even-numbered pixel blocks consisting of a plurality of even-numbered pixels; the divided data is written into the memory means based on the odd-numbered pixel blocks and the even-numbered pixel blocks; and an overwriting is performed only on portions of the data written into the memory means where the odd-numbered pixel blocks or the even-numbered pixel blocks are written during a predetermined period.

In still another embodiment, the input information is a video signal; the writing into the memory means is performed based on a frame of the video signal; and an overwriting is performed only on portions of the data written into the memory means where odd-numbered frames or even-numbered frames are written during a predetermined period.

In still another embodiment, the input information is a video signal; the writing into the memory means is performed based on a field of the video signal; and an overwriting is performed only on portions of the data written into the memory means where odd-numbered fields or even-numbered fields are written during a predetermined period.

In still another embodiment, the input information is a video signal; the video signal is coded based on a second block consisting of a predetermined number of pixels; the coded data is written into the memory means based on the second block; and an overwriting is performed only on portions of the data written into the memory means where a data corresponding to a predetermined number of second blocks per frame or field of the video signal is written during a predetermined period.

In still another embodiment, the input information is a video signal; the video signal is coded by using an orthogonal transform into a frequency region based on a block consisting of a predetermined number of pixels; the coded data is divided into a third block consisting of a part of AC components in the first block and a fourth block consisting of the other AC components and DC components; the divided coded data is written into the memory means based on the third block and the fourth block; and an overwriting is performed only on portions of the data written into the memory means where the data corresponding to the third block is written during a predetermined period.

In still another embodiment, the input information is error-correction coded by using a product code; the error-correction coded data is divided into a check block consisting of inner codes including a check bit for an outer code and an information block consisting of inner codes including an information bit for an outer code; the divided data is written into the memory means based on the check block and the information block; and an overwriting is performed only on portions of the data written into the memory means where the data corresponding to the check block is written during a predetermined period.

According to still another aspect of the invention, an information recording method for writing input information into a memory means once so as to record the information read from the memory means onto a recording medium where a track formed thereon is divided into a plurality of sectors to which address information is added is provided. In this method, a write rate into the memory means is varied based on a third block consisting of a number of bits corresponding To the sector; and rate variation management information including address information of the sector corresponding to a rate variation point is recorded in a predetermined area on the recording medium.

According to still another aspect of the invention, an information recording apparatus is provided. The information recording apparatus includes: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; and a recording-disable detection means for detecting a recording-enable state and a recording-disable state of the recording means so as to output a recording-disable signal to the data amount control means, the memory control means and the recording control means under the recording-disable state. In the information recording apparatus, while the recording-disable signal is output, the memory control means interrupts the reading of the memory means; the recording control means interrupts the recording operation of the recording means; and the data amount control means reduces the data amount of the input information during a predetermined period subsequent to the output of the recording-disable signal.

In one embodiment, a track is formed on the recording medium; the recording means records on the track formed on the recording medium; and the recording-disable detection means detects the recording-disable state by using a tracking error signal output from the recording means.

In another embodiment, the recording medium is an optical recording medium on which a track is formed; the recording means records on the track formed on the recording medium by focusing a light spot thereon; and the recording-disable detection means detects the recording-disable state by using a focusing error signal output from the recording means.

In still another embodiment, the recording-disable detection means includes a vibration detection means for detecting a vibration or an shock externally applied; and at least while the vibration or the shock at a predetermined acceleration or more is detected, the recording-disable detection means outputs the recording-disable signal.

According to still another aspect of the invention, an information recording apparatus is provided. The information recording apparatus includes: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; and a disability detection means for detecting a variation in the rotation speed of the recording medium and for outputting a rotation speed disability signal to the data amount control means, the memory control means and the recording control means when the rotation speed is varied from the predetermined rotation speed. In the information recording apparatus, while the rotation speed disability signal is output, the memory control means interrupts the reading of the memory means; the recording control means interrupts the recording operation of the recording means; and the data amount control means reduces the data amount of the input information during a predetermined period from after the rotation speed disability signal is output.

According to still another aspect of the invention, an information recording apparatus is provided. The information recording apparatus includes: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; a recording-disable detection means for detecting a recording-enable state and a recording-disable state of the recording means, and a variation in the rotation speed of the rotation means so as to output a recording-disable signal to the data amount control means, the memory control means and the recording control means when the recording means is under the recording-disable state or when the rotation speed is varied from the predetermined rotation speed; and a remaining capacity detection means for detecting the remaining capacity of the memory means so as to output a remaining capacity decrease signal to the data amount control means when the remaining capacity is of a predetermined value or less. In the information recording apparatus, while the recording-disable signal is output, the memory control means interrupts the reading of the memory means; the recording control means interrupts the recording operation of the recording means; the data amount control means starts a processing for reducing the data Mount of the input information from the point where the recording-disable signal is output; and in a case where the remaining capacity decrease signal is output when the recording-disable signal is no longer output, the data amount control means performs a processing for reducing the data amount of the input information until the remaining capacity decrease signal is no longer output.

According to still another aspect of the invention, an information recording apparatus is provided. The information recording apparatus includes: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; a vibration detection means for outputting a vibration/shock detection signal to the data amount control means when a vibration or a shock externally applied at a predetermined acceleration or more is detected; a recording-disable detection means for detecting a recording-enable state and a recording-disable state of the recording means, and a variation in the rotation speed of the recording medium so as to output a recording-disable signal to the data amount control means, the memory control means and the recording control means when the recording means is under the recording disable state or when the rotation speed is varied from the predetermined rotation speed; and a remaining capacity detection means for detecting the remaining capacity of the memory means so as to output a remaining capacity decrease signal to the data amount control means when the remaining capacity is predetermined value or less. In the information recording apparatus, while the recording-disable signal is output, the memory control means interrupts the reading of the memory means; the recording control means interrupts the recording operation of the recording means; and the data amount control means performs a processing for reducing the data amount of the input information by using the vibration/shock detection signal, the recording-disable signal and the remaining capacity decrease signal.

According to still another aspect of the invention, an information recording apparatus is provided. The information recording apparatus includes: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; a vibration detection means for outputting a vibration/shock detection signal to the data amount control means when a vibration or a shock externally applied at a predetermined acceleration or more is detected; a recording-disable detection means for detecting a recording-enable state and a recording-disable state of the recording means, and a variation in the rotation speed of the recording medium so as to output a recording-disable signal to the data amount control means, the memory control means and the recording control means when the recording means is under the recording-disable state or when the rotation speed is varied from the predetermined rotation speed; and a remaining capacity detection means for detecting a remaining capacity of the memory means so as to output a remaining capacity decrease signal to the data amount control means when the remaining capacity is of a predetermined value or less, and a memory full signal to the data amount control means and the memory control means when an overflow of the memory means is detected. In the information recording apparatus, while the recording-disable signal is output, the memory control means interrupts the reading of the memory means; the recording control means interrupts the recording operation of the recording means; the data amount control means performs a processing for reducing the data amount of the input information by using the vibration/shock detection signal, the recording-disable signal and the remaining capacity decrease signal; and the memory control means overwrites the data after the detection of the overflow in a predetermined area within the memory means during a predetermined period from after the memory full signal is output.

According to still another aspect of the invention, an information recording apparatus for recording input information onto a recording medium where a track formed thereon is divided into a plurality of sectors to which address information is added, is provided. The information recording apparatus includes: a data amount control means for varying a data amount of the input information based on a third block consisting of a number of bits corresponding to the amount of the data recorded on the sectors; a variation flag generation means for generating a data amount variation flag for identifying a point where the data amount is varied by using an output of the data amount control means; a memory means for temporarily storing the data whose amount is controlled by The data amount control means; a memory control means for controlling to write and to read the data into the memory means; an address information reproduction means for reproducing the address information added to the sectors on the recording medium; a data amount variation management means for generating a data amount variation management information by using the data amount variation flag and the address information reproduced by the address information reproduction means; a recording means for recording the data read from the memory means and the data amount variation management information generated by the data amount variation management means onto the recording medium; and a recording control means for controlling the memory control means, the data amount variation management means and the recording means so that the recording of the data and the recording of the data amount variation management information are switched by a time sharing control.

In one embodiment, the variation flag generation means generates a data amount variation flag by using the data read from the memory means instead of an output of the data amount control means.

In another embodiment, the address information reproduction means simultaneously performs the reproduction of the address information and a generation of a sector synchronization signal; and the recording control means controls the reading of the memory means by using the sector synchronization signal.

In still another embodiment, the data amount variation management information includes the address information of the sector where the data corresponding to the point where the data amount is varied is recorded.

In still another embodiment, the recording control means controls the memory control means, the data amount variation management means, and the recording means so that the data amount variation management information is recorded at once after a recording of a series of input information has finished.

According to still another aspect of the invention, an information recording medium is provided. In the information recording medium, at least one spiral or concentric track is provided on one or both side(s) of a disk; the track is divided into a plurality of sectors having a predetermined length or longer; at least one address information area on which address information for identifying a position on the disk is recorded and at least one information recording area for recording information are provided in the sectors; a area consisting of some of the plurality of sectors on an outer circumference of the disk is used as an emergent recording area; a area consisting of sectors other than the sectors belonging to the emergent recording area is used as a normal recording area; and an amount of the information recorded within the sectors belonging to the emergent recording area is larger than an amount of the information recorded within the sectors belonging to the normal recording area.

In one embodiment, the information recording area of each of the sectors is divided into a plurality of block recording areas; a constant amount of information is recorded in each of the block recording areas; and a number of the block recording areas within the sectors belonging to the emergent recording area is larger than a number of the block recording areas within the sectors belonging to the normal recording area.

In another embodiment, when a track jump is performed from a sector of origin in the normal recording area to a sector of destination in the emergent recording area, or from a sector of origin in the emergent recording area to a sector of destination in the normal recording area, a history information recording area for recording at least one of address information of the sector of origin and address information of the sector of destination is provided at least one of inside of the normal recording area, inside of the emergent recording area, and outside of the normal recording area and the emergent recording area.

According to still another aspect of the invention, an information recording apparatus is provided. The information recording apparatus includes: a recording means for recording information by accessing to a track formed on an information recording medium having a normal recording area on an inner circumference of a disk and an emergent recording area on an outer circumference of the disk; a tracking error signal output means for detecting relative positions of the recording means and the predetermined track on the information recording medium during the recording of the information so as to output a tracking error signal, the tracking error signal output means being connected to the recording means: a position control means for controlling the positions by using the tracking error signal so that the recording means records on the predetermined track; a rotation means for rotating the information recording medium; an address information identification means for identifying address information recorded beforehand on the track; a memory means for temporarily storing the information input during the recording operation and reading out the information into the recording means; a history information memory means for storing address information of origin when the recording means moves a recording position from a track to another track; and a system control means for controlling operations of the recording means, the memory means, the history information memory means and the position control means. In the information recording apparatus, the system control means monitors at least one of the tracking error signal and the address information so as the detect a relative positional error between the position of the predetermined track and the position of the recording means while the recording means is recording information on the predetermined track. When the system control means detects the relative positional error, the system control means makes the history information memory means store the address information of the sector at the generation of the positional error; interrupts the reading of the input information by the memory means; controls the position control means so that the recording means is moved to a sector within the emergent recording area; makes the memory means start the reading of the input information again when the recording means has been moved; and makes the recording means sequentially record the information from just after the generation of the positional error into the emergent recording area. When an amount of the input information accumulated in the memory means becomes a predetermined amount or less, the system control means interrupts the information recording operation; interrupts the reading of the input information; makes the history information memory means store the address information of the sector at the interruption of the recording operation; makes the recording means move to a sector of origin where the positional error has been generated based on the history information stored in the history information memory means; starts the reading of the input information from the memory means again after the recording means has been moved; and controls operations of the recording means, the memory means, the history information memory means, and the position control means so that the recording means continues to record into the normal recording area the information from just after the interruption of the recording into the emergent recording area.

In one embodiment, the system control means makes the history information memory means store the history information of the track jump performed from the normal recording area to the emergent recording area, or from the emergent recording area to the normal recording area; and controls the operations of the recording means, the memory means, the history information memory means, and the position control means so that the history information is recorded in the history information recording area provided on the information recording medium.

In another embodiment, the system control means controls the operations of the recording means, the memory means, the history information memory means, and the position control means so that, when unrecorded areas no longer exist within the normal recording area on the information recording medium but remain within the emergent recording area during recording a series of information, the recording operation is continued by moving to the unrecorded areas within the emergent recording area.

(1) According to the present invention, under a situation where the lack of the remaining capacity in a memory is expected because of the continuation of the recording-disable state, the reduction in the rate of writing the information into the memory is suggested.

More specifically, in a method and an apparatus for recording information according to the present invention, the input information is once written into a memory and then the information read from the memory is recorded on the recording medium.

The two states of a recording processing system where the recording operation can/cannot be performed are detected beforehand during a series of recording operations. On detecting the recording-disable state, the recording operation of the recording processing system and the read operation of the information from the memory are interrupted. When a state where the recording can be started again is detected, in the case where read operation of the information from the memory and the recording operation are started again, the rate of writing the information into the memory is reduced for a predetermined period subsequent to detecting the recording-disable-state.

In addition, the two states of a recording processing system where the recording operation can/cannot be performed and the remaining capacity of the memory are detected beforehand during a series of recording operations. Based on the result of the detection of the recording-disable state and the remaining capacity, a period during which the process for reducing the rate of writing the information into the memory is performed is determined.

This method makes it possible to hold the information continuously input by the memory even when the recording processing system falls in the recording-disable state because of the vibration or the shock externally applied. On the other hand, the amount of bits of the input information is reduced depending upon the length of the period during which the recording-disable state continues and the remaining capacity of the memory. As a result, the rate of writing the information into the memory is suppressed as compared with a normal recording operation, and the data memory capacity in the memory apparently increases. That is to say, since it is possible to minimize the decrease in the remaining capacity in the memory, it is possible to extend a period during which the input information can be held. Accordingly, even when the remaining capacity in the memory decreases because of the continuation or the frequent occurrence of the recording-disable state, it is possible to record the input information on the information recording medium without losing the continuity of the input information.

(2) The writing of the information into the memory is suggested to be performed based on a predetermined unit. In the case where the memory overflows because of the continuation of the recording-disable state, the information obtained after the overflow of the memory has been detected is suggested to be overwritten based on a predetermined unit on the data which has already been written in the memory.

In addition, the detection of the recording-enable/disable states of the recording processing system, the detection of the remaining capacity of the memory, and the detection of the overflow of the memory are suggested to be performed during a series of recording operations. Based on the results of the detection of the recording-disable state, the remaining capacity, and the overflow, the period during which the processing for reducing the rate of writing the information into the memory, and the period during which the processing for overwriting the information on the memory are suggested to be determined.

By performing this method, when an input information is temporarily written into the memory, the information is written into the memory based on a predetermined unit; and, when the memory overflows, the information after the overflow has occurred is selectively overwritten on a part of the data which has been written in the memory.

For example, as the data to be deleted by the overwrite operation, the data which can be interpolated by other data when the other data is reproduced is selected. As a result, it is possible to reproduce the data deleted by the overwrite operation by an interpolation processing. Moreover, the overwrite processing allows for writing still other data, the data memory capacity in the memory apparently increases. Accordingly, even when the memory overflows because the period during which the recording-disable state continues or frequently occurs is long, it is possible to prevent the loss of the continuity of the input information, minimize the absence of the recorded information, and prevent the degradation in the reliability.

(3) The rate of writing the input information is suggested to be varied based on the data corresponding to a sector, i.e., a recording unit of the recording medium. Based on the recording unit, not only the recording information but also the information for managing the variation of the rate are suggested to be recorded.

More specifically, in a method and an apparatus for recording information according to the invention, an input information is once written into a memory, and the information read out from the memory is recorded on a recording medium where each track is divided into a plurality of sectors to which address information is attached. During a series of recording operations, the rate of writing the information into the memory is varied based on a block having a number of bits which can be recorded within the sector; the data is recorded so that the point at which the writing rate is varied is always located on the boundary between adjacent sectors; and the information for managing the variation of the rate including the address information of the sector corresponding to the point at which the writing rate is varied is also recorded.

According to this method, it is possible to prevent the information having different bit rates from being recorded on one and the same sector. In addition, the information for managing the variation in the rate including the address information of the sector having the data corresponding to the point at which the writing rate is varied is also recorded on the recording medium. Accordingly, by reading beforehand the information for managing the variation in the rate during the reproduction operation, it is possible to promptly obtain the information about the point at which the rate is varied. Consequently, it is possible to efficiently manage the variation in the rate of reading the recorded information when the recorded information is reproduced.

(4) In the case where the recording processing system is restored from the recording-disable state to the recording-enable state and the recording is resumed, the rate of reading the information from the memory is suggested to be increased than a normal reading rate.

More specifically, in a recording medium of the invention, a spiral or concentric track is provided on one side or both sides of a disk; an address information area and an information recording area are disposed in each sector obtained by dividing the track into a plurality of portions so as to have a length equal to a predetermined length or longer; the area consisting of a plurality of sectors on the outer circumference including tracks of the disk is regarded as an emergent recording area; and the area consisting of the sectors other than the sectors belonging to the emergent recording area is regarded as a normal recording area.

In a method and an apparatus for recording information according to the invention, the input information is once written into the memory, and the information read out from the memory is recorded on the information recording medium by using a recording device. During performing a normal recording operation, the information is recorded by tracking each sector belonging to the normal recording area by using the recording device. During a series of recording operations, the recording-enable/disable states of the recorder are detected beforehand. As soon as the recording-disable state is detected, the recording operation of the recorder and the read operation of the information from the memory are interrupted. When the recording-enable state is detected again, the recording operation of the recorder starts again and the information is recorded by tracking each sector belonging to the emergent recording area by using the recording device during a predetermined period from after the detection of the recording-disable state.

According to this method, for example, in the case where the information recording medium is controlled so as to always rotate at a constant angular velocity, the relative velocity between the sector and the recorder when the recorder is tracking a sector belonging to the emergent recording area is higher than the relative velocity between the sector and the recorder when the recorder is tracking a sector belonging to the normal recording area. Accordingly, during a predetermined period subsequent to the recording-disable state has been detected, the data can be recorded at a higher rate as compared with a normal recording operation. That is to say, the rate of recording the data can be increased and the rate of reading the data from the memory can also be increased. The increase in the data reading rate of the memory makes it possible to shorten the time required for recovering the data memory capacity in the memory. Consequently, by using a memory having a minimal memory capacity, the recording processing can be performed more effectively after the recording processing system has been restored from the recording-disable state.

(5) In addition, when a track jump is performed from the normal recording area to the emergent recording area, or the emergent recording area to the normal recording area, a history information recording area for recording at least one of the address information of the sector of origin and the address information of the sector of destination is suggested to be provided inside or outside of the normal recording area of the information recording medium, or inside or outside of the emergent recording area thereof so as to record the history information of the track jump on the history information recording area.

According to this method, the history of the track jump during the recording processing can be recorded on the information recording medium. Consequently, by reading beforehand the history information of the track jump recorded on the history information recording area during the reproduction, the track jump processing during the reproduction can be smoothly performed.

Thus, the invention described herein makes possible the advantages of (1) improving the reliability of an information recording apparatus against the vibration or the shock externally applied; and (2) reducing a necessary memory capacity and improving a cost performance of the information recording apparatus in which input information is once written into a memory and then the information read from the memory is recorded on the recording medium.

These and other advantages of the present invention will become apparent to those skilled in the art upon reading and understanding the following detailed description with reference to the accompanying figures.

BRIEF DESCRIPTION OF THE DRAWINGS

FIG. 10 shows the disposition of the data on the buffer memory according to the third example of the invention.

FIG. 15A is a timing diagram showing the passage of the recording operation performed in the case where a recording-disable state is generated during performing a normal recording operation in the fourth example of the invention.

FIG. 15B is a timing diagram showing the passage of the recording operation performed in the case where information for managing the rate variation is recorded in the fourth example of the invention.

FIG. 17 illustrates a typical example of a quantization matrix.

FIG. 23A is a plan view showing the movement of an optical disk and an optical head along the rotation axis direction of the optical disk and the direction vertical to the rotation axis in a fifth example of the invention.

FIG. 23B illustrates the correspondence between the zones to which a first optical head and a second optical head get access during the recording operation in the fifth example of the invention.

FIG. 23C shows a format of the signal on a sector of the optical disk according to the fifth example of the invention.

FIG. 25B is a plan view showing an optical disk seen from the rotation axis direction according to the sixth example of the invention.

DESCRIPTION OF THE PREFERRED EMBODIMENTS

Figure 1:
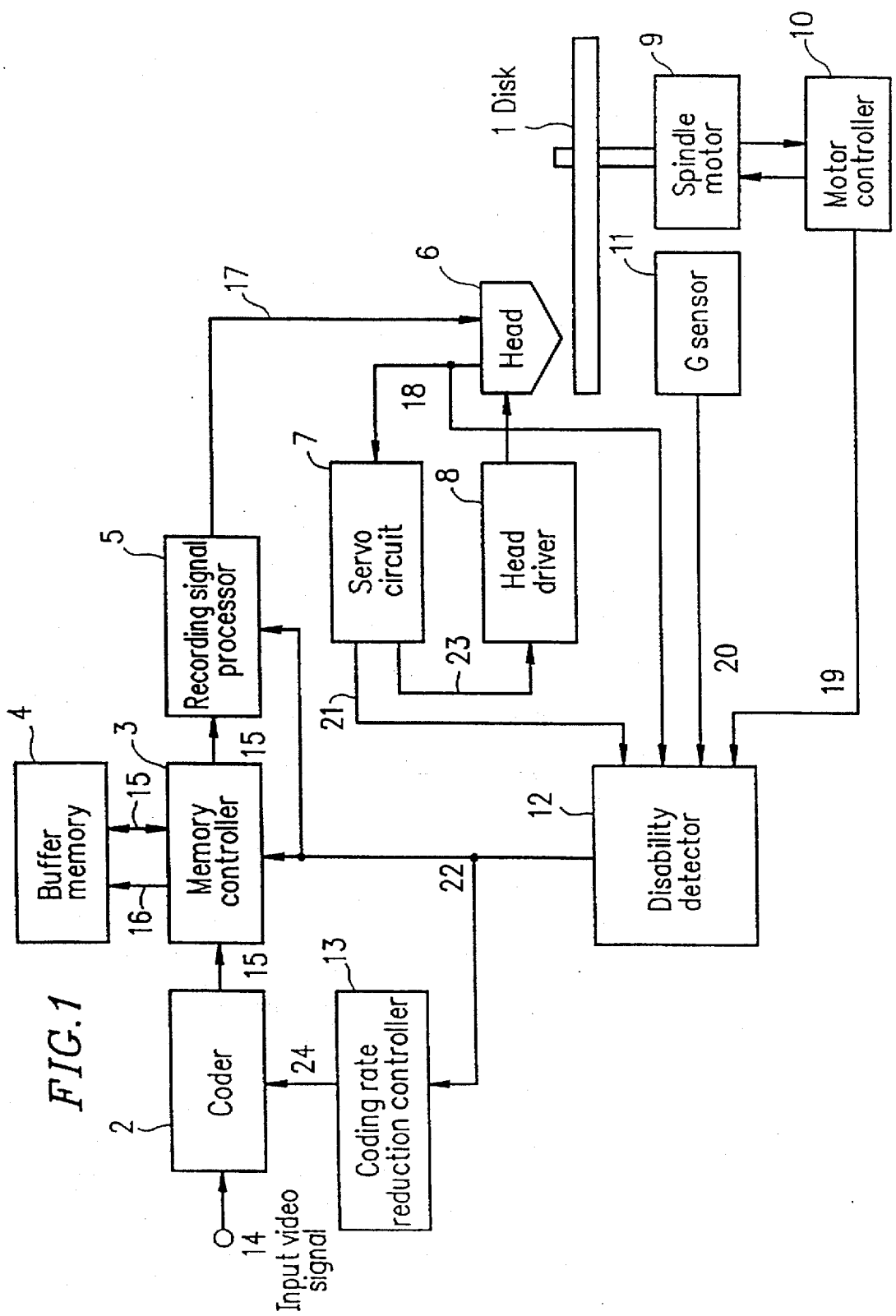
FIG. 1 is a block diagram showing a configuration of a disk recording apparatus according to a first example of the invention.

Hereinafter, the present invention will be described by way of illustrative examples with reference to the accompanying drawings. The same reference numerals denote the same components.

EXAMPLE 1

In a first example of the invention, the coding rate of the input information is reduced based on the detection result of the recording-disable state in a stage prior to writing the information into a memory (or a buffer memory).

FIG. 1 is a block diagram showing a configuration of a disk recording apparatus according to the first example of the invention.

As shown in FIG. 1, an input video signal 14 input from an external device is coded by a coder 2, and the coded data 15 is once written into a buffer memory 4 via a memory controller 3. The memory controller 3 generates various kinds of control signals 16 for controlling write operation and read operation of the buffer memory 4. For example, in the case where the buffer memory 4 is a random access memory (RAM), the memory controller 3 generates a write/read address, a write/read control signal or the like. On the other hand, in the case where a first-in first-out (FIFO) memory is used as the buffer memory 4, the memory controller 3 generates a write clock, signals for controlling the write operation of the buffer memory 4 (such as a write enable signal for permitting data writing and a write reset signal for resetting a write address to have an initial value), a read clock, and signals for controlling the read operation of the buffer memory 4 (such as a read enable signal for permitting read operation and a read reset signal for resetting a read address to have an initial value). The coded data 15 once written into the buffer memory 4 is read out after a predetermined period has passed, and then output to a recording signal processor 5 via the memory controller 3. The recording signal processor 5 modulates the recording data obtained by adding a redundant data such as an error correction code (ECC) to the coded data 15 read out from the buffer memory 4 in accordance with a well-known modulation method, and drives a head 6, thereby recording the data on a disk 1. It is noted that the redundant data such as an error correction code can be added by a method other than the above-mentioned method in which the redundant data is added inside the recording signal processor 5. In other words, the error correction code may be added by the coder 2.

In the case where the disk 1 is an optical recording medium for recording the information optically, the head 6 incorporates a light-emitting element such as a semiconductor laser and an optical member for appropriately focusing a light spot on a surface of the disk 1, and optically records the signal by using a well-known method. On the other hand, in the case where the disk 1 is a magnetic recording medium for recording the information by utilizing the variation of the magnetic field, the head 6 incorporates a coil for converting an electric signal into the variation of the magnetic field and the like, and magnetically records the signal by using a well-known method.

A spindle motor 9 rotates the disk i at a predetermined rotation speed (i.e., rotation number per a unit time). A motor controller 10 detects the variation in the rotation speed of the spindle motor 9 by using a rotary encoder or the like so as to control the spindle motor 9 so that the rotation speed of the disk 1 does not deviate from the predetermined rotation speed.

A track (or a guide groove) for guiding the head 6 is formed on the disk 1 and the recording signal 17 is recorded on the track. The head 6 detects a relative error amount between the position of the track and the position of the head so as to generate an error signal 18. The error signal 18 is output to a servo circuit 7. The servo circuit 7 outputs a head driving signal 23 to a head driver 8 so that tracking deviation of the head 6 is minimized. Following the head driving signal 23 output from the servo circuit 7, the head driver 8 moves the head 6 so that the data can be recorded on a desired track on the disk 1.

Next, a method for detecting a recording-disable state and the operation when the recording-disable state is generated will be described. In this example, the "recording-disable state" will be defined as a period from the point where any of the following three states is generated to the point where the state no longer exists and the head 6 has returned to the predetermined track.

(1) A state where the error signal 18 input to the servo circuit 7 is at a predetermined level or more.

(2) A state where the amount of the variation in the rotation detected by the motor controller 10 is predetermined amount or more.

(3) A state where the acceleration to be detected by a G sensor (or an acceleration sensor) 11 which is caused by the vibration or the shock externally applied is at a predetermined level or more.

In general, a series of information is recorded in a continuous area on the track. Accordingly, the predetermined track refers to the track being scanned by the head 6 at the point where any of the above states occurs. However, in the case where it is not necessary to record the series of information in the continuous area on the track, the head 6 may return to a track other than the predetermined track.

As described above, the error signal 18 to be input under the state (1) indicates an amount of the relative error between the position of the head 6 and that of the track. For example, in the case of performing an optical recording operation by focusing a light spot on a track, a tracking error signal to be obtained as a deviation amount between the light spot and the tracking position in a radial direction of the disk 1, and a focusing error signal to be obtained as a deviation amount of the focal point between the light spot and the tracking position can be obtained as the error signal 18. When the amplitude of the tracking error signal or the focusing error signal reaches or exceeds a predetermined value, the positional error of the head 6 has already exceeded a limit value for enabling recording data on the disk 1. Therefore, the head 6 records the data on a track next to the appropriate track by mistake, or the signal cannot be recorded appropriately.

The rotation variation to be detected in the state (2) is a deviation amount between a predetermined rotation speed and an actual rotation speed, as described above. In general, a track on the disk 1 is divided into a plurality of sectors having a predetermined length, and the data is recorded on the disk 1 by using the sectors as minimal units. Therefore, if the deviation amount of the rotation speed of the disk 1 is large, then the time required for the head 6 to scan the predetermined sector is significantly varied. Consequently, when the rotation speed considerably increases, for example, it is no longer possible to secure the time required for writing all the data to be recorded on the same sector.

On the other hand, the positional deviation of the head 6 and the variation in the rotation speed of the disk 1 frequently increase when a large amount of vibration or shock is externally applied. Generally, the recording head, in particular, has little resistivity against the vibration or the shock because of the mechanism thereof. Accordingly, if the head receives the vibration or the shock having the acceleration at a limit level or more, the head easily falls into an off-track state or an out-of-focus state, so as to fall into the recording-disable state. Assuming that a limit acceleration for preventing the off-track state or the out-of-focus state is known beforehand, then the recording-disable state can be detected instantaneously by detecting the acceleration at the limit value or more using the G sensor 11.

Figure 2:
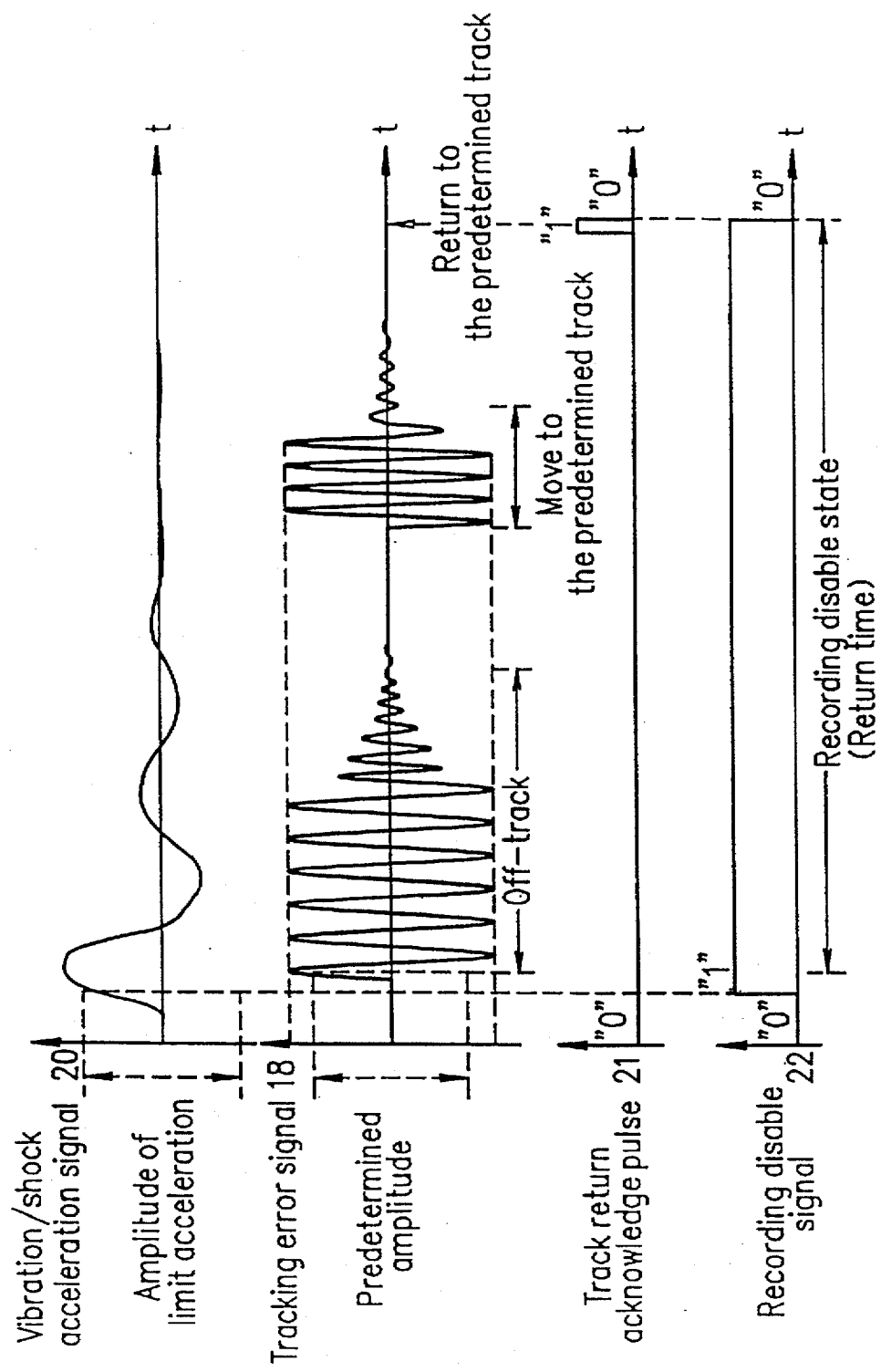
FIG. 2 schematically shows an exemplary waveform of a recording-disable signal to be output when an off-track state is generated in a head of the disk recording apparatus according to the first example of the invention owing to a vibration or a shock externally applied.

In actually detecting the recording-disable state of an apparatus, all the factors described in the states (1), (2) and (3) can be utilized, or any of these factors can be selectively utilized. In this example, in order to detect all the states (1), (2) and (3), by using all of the error signal 18 output from the head 6, the rotation variation amount signal 19 output from the motor controller 10, and the acceleration signal 20, caused by the vibration or the shock, output from the G sensor 11, the recording-disable state is detected by a disability detector 12, and a recording-disable signal 22 continues to be output until the head 6 is confirmed to return to the predetermined track by using a track return acknowledge pulse signal 21 output from the servo circuit 7. FIG. 2 shows an exemplary waveform of a recording-disable signal 22 to be output when an off-track state is generated owing to the vibration or the shock externally applied. In this case, when the recording-disable signal 22 is "1", the recording-disable state is assumed to be output, and when the recording-disable signal 22 is "0", the recording-enable state is assumed to be output. The length of the period during which the recording-disable signal 22 is "1" will be called a time required for returning. In this example, the track being scanned by the head 6 at the point where the off-track state is generated because of the vibration or the shock externally applied is referred to as a "predetermined track". The servo circuit 7 outputs the head driving signal 23 to the head driver 8 so that the head 6 returns to the predetermined track. The head driver 8 moves the head 6 in accordance with the head driving signal 23. The servo circuit 7, upon confirming the return of the head 6 to the predetermined track, outputs a track return acknowledge pulse 21 to the disability detector As shown in FIG. 1, the recording-disable signal 22 output from the disability detector 12 is input to the recording signal processor 5, the memory controller 3 and a coding rate reduction controller 13. As soon as the recording-disable signal 22 becomes "1" during the recording operation, the recording signal processor 5 interrupts the recording operation in order to prevent the signal from being recorded on a different track other than the predetermined track by mistake. The memory controller 3 stops the generation of the read address, the read control signal and the like for the buffer memory 4, thereby interrupting the read operation of the buffer memory 4. The recording operation onto the disk 1 and the read operation from the buffer memory 4 continue to be interrupted until the recording-disable signal 22 becomes "0". When the head 6 has returned to the predetermined track and the recording-disable signal 22 has become "0" again, the memory controller 3 begins to sequentially read the data accumulated in the buffer memory 4, and the recording signal processor 5 starts to record the read data onto the disk 1 again. Since the buffer memory 4 lacks in the remaining capacity immediately after returning to the predetermined track has been accomplished, the read operation from the buffer memory 4 and the recording operation onto the disk 1 are performed at higher data rates as compared with the normal rate until the remaining capacity has returned to the original capacity thereof. In order to record the data at a higher data rate as compared with a normal data rate, a method in which the recording transfer data rate is increased by performing an intermittent recording in the normal operation and performing a continuous recording immediately after returning to the predetermined track can be employed as described in the Description of the Prior Art, or a method in which the recording transfer data rate is increased by setting the rotation speed of the disk 1 at a larger rotation speed than an normal rotation speed immediately after returning to the predetermined can also be employed.

Next, the operation of the coding rate reduction controller 13, the operation of the coder 2, and the amount of the data accumulated in the buffer memory 4 will be described. As described above, when the recording-disable signal 22 is "1", the read operation from the buffer memory 4 is interrupted. However, since the video signal 14 is continuously input to the coder 2, the write operation of the coded data 15 into the buffer memory 4 is not interrupted. Therefore, if the recording-disable signal 22 continues to be "1", then an increasing amount of coded data 15 is accumulated in the buffer memory 4. According to a conventional method, the coding operation is performed at a constant rate, whether the recording-disable state has been generated or not. Assuming that the coded data 15 is written into the buffer memory 4 at a constant rate Ri [bps (bit per second)] during the recording, when the amount Q1 of the data accumulated in the buffer memory 4 when the recording-disable signal 22 continues to be "1" for t seconds will be expressed as follows: Q1=Ri×t [bit]. If the capacity of the buffer memory 4 is indicated by M [bit], even when the buffer memory 4 is vacant at the point where the recording-disable signal 22 becomes "1", the buffer memory 4 overflows if the recording-disable signal 22 continues to be "1" for M/Ri [s] or longer.

According to a method of the invention, in a state where the recording-disable signal 22 is "1", the coding operation is performed so that the rate of the coded data 15 becomes lower as compared with that of the normal recording. For example, in the state where the recording-disable signal 22 is "1", if the coding is performed at the rate of Ri/x [bps] so that the rate of the coded data 15 becomes 1/x (where, x>1) of the rate of the normal recording, then the buffer memory 4 will 15 not overflow so long as the recording-disable signal 22 does not continue for Mx/Ri seconds or longer under the same conditions. Consequently, it is possible to hold the coded data for a time period x times as long as the period of the normal recording.

In this example, when the recording-disable signal 22 is "1", the coding rate reduction controller 13 outputs a coding rate reduction instruction 24 to the coder 2. The coder 2 performs the coding operation while reducing the amount of bits so that the rate of the coded data 15 becomes 1/x of that of the normal recording for the period during which the coding rate reduction instruction 24 is output.

Following are the specific methods for reducing the amount of the bits of the coded data 15.

(1) Reducing the number of the quantization bits when the input video signal 14 is analog/digital (A/D) converted.

(2) Sub-sampling a part of the pixels of the input video signal 14.

(3) Omitting a part of the frames or fields of the input video signal (4) In the case of using a coding technique in which an orthogonal transform into the frequency region and a quantization using a quantization matrix are performed, using a quantization matrix having a coarse quantization characteristic.

(5) Omitting the data based on a block of data utilized as a unit for coding. (6) In the case of using a coding technique in which an orthogonal transform into the frequency region is performed, omitting the data corresponding to the high frequency components from the orthogonally transformed data.

(7) Improving the coding efficiency when the input video signal 14 is subject to error-correction coding operation.

The respective internal configurations of the coder 2 applied to the above methods (1) to (7) will be described below.

Figure 21:
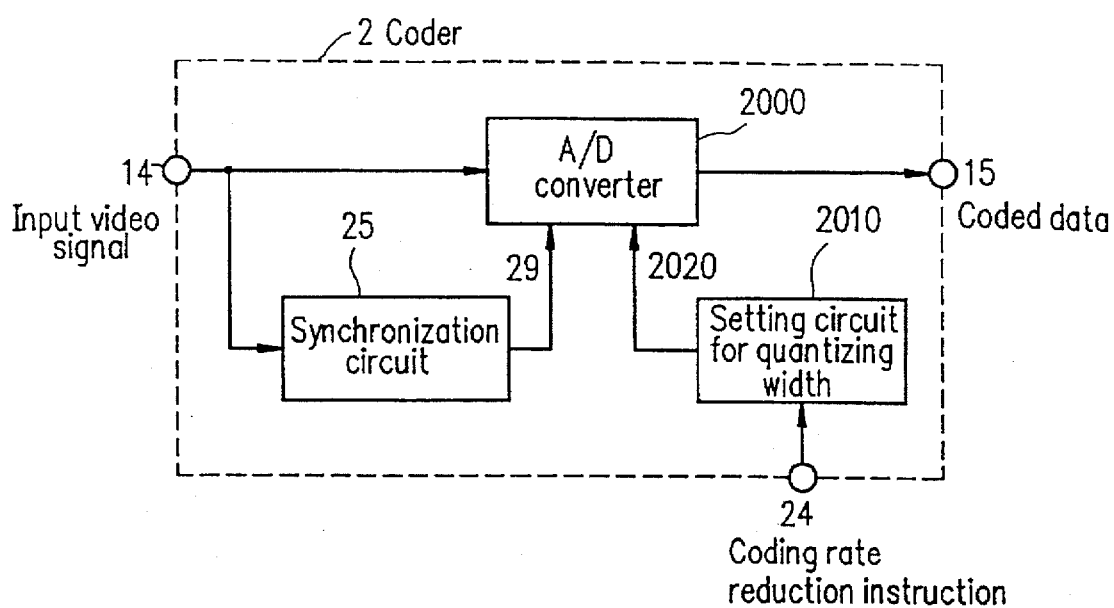
FIG. 21 is a block diagram showing another example of an internal configuration of a coder according to the first example of the invention.

FIG. 21 is a block diagram showing an internal configuration of a coder 2 for reducing the coding rate of the coded data 15 by the method (1). As shown in FIG. 21, the input video signal 14 is further input to a synchronization circuit 25 and an analog/digital converter 2000. The synchronization circuit 25 generates a sampling clock for performing an analog/digital (A/D) conversion based on the input video signal 14, thereby detecting a horizontal synchronization and a vertical synchronization of the video signal and generating various synchronous pulses 29 such as a horizontal synchronous pulse, a field synchronous pulse, a frame synchronous pulse and the like. The analog/digital converter 2000 samples the input video signal 14 by using the sampling clock generated by the synchronization circuit 25, performs a quantization in accordance with the number of the quantization bits 2020 set by a setting circuit for quantization width 2010 so as to output the quantized data as the coded data 15 synchronized with the sampling clock.

Using the coding rate reduction instruction 24 output from the coding rate reduction controller 13, the setting circuit for quantization width 2010 generates a code 2020 obtained by coding the quantization width. In the case where the coding rate reduction instruction 24 is supplied as a digital signal which becomes "1" when the reduction of the coding rate of the coded data 15 is desired, the setting circuit for quantization width 2010 generates the code 2020 so that the relationship q1<q0 is satisfied, where q1 is a number of the quantization bits when the coding rate reduction instruction 24 is "1" and q0 is a number of the quantization bits when the coding rate reduction instruction 24 is "0". For example, if q0=10 and q1=5, then the amount (or the coding rate of the coded data 15) of the data resulting from the analog/digital conversion when the coding rate reduction instruction 24 is "1" becomes a half of the amount of the data when the coding rate reduction instruction 24 is "0". Therefore, it becomes possible to double the length of the period during which the data can be held in the buffer memory 4.

It is noted that it is not necessary to always set the number of the quantization bits when the coding rate reduction instruction 24 is "1" to be constant. For example, depending upon the length of the period during which the coding rate reduction instruction 24 continues to be "1", it is possible to control the number of the quantization bits at multiple stages.

Figure 3:
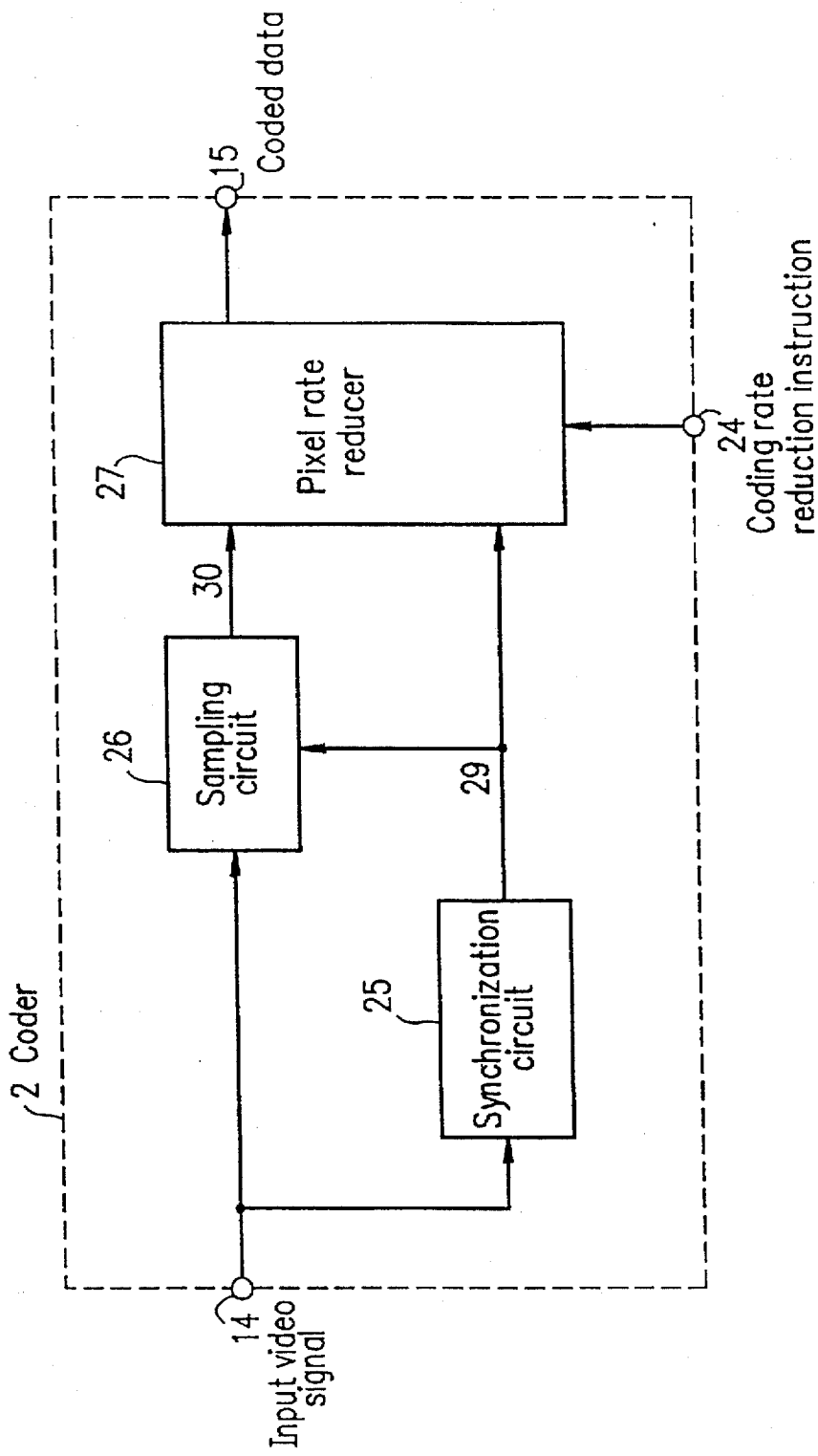
FIG. 3 is a block diagram showing an example of an internal configuration of a coder according to the first example of the invention.

FIG. 3 is a block diagram showing an internal configuration of the coder 2 for reducing the amount of bits of the coded data 15 by the method (2) or (3). As shown in FIG. 3, the input video signal 14 is input to a synchronization circuit 25 and a sampling circuit 26. The synchronization circuit 25 generates a clock for sampling based on the input video signal 14 so as to detect the horizontal synchronization and the vertical synchronization of the input video signal 14 and generate various synchronous pulses 29 such as a horizontal synchronous pulse, a field synchronous pulse, and a frame synchronous pulse. The sampling circuit 26 samples the input video signal 14 by using the clock generated by the synchronization circuit 25 so as to output the signal as a digital data 30 synchronized with the clock. On the other hand, a pixel rate reducer 27 omits the pixel data 30 corresponding to a predetermined pixel, frame or field by using the clock, the synchronous pulse 29, and coding rate reduction instruction 24. Following is the specific methods for omitting the pixel data.

(a) Omitting the data by very other pixel (i.e., sub-sampling the pixel data).
(b) Omitting the data by every other line.
(c) Omitting the data by every other field.
(d) Omitting the data by every other frame.

By employing these methods, the pixel data can be efficiently interpolated when the data is reproduced.

In the case of using the method (a), the subsampled pixels are interpolated based on the four adjacent pixels on a video plane, i.e., two adjacent pixels in a horizontal direction and two adjacent pixels in a vertical direction. In the case of using the method (b), the omitted lines are interpolated based on the two adjacent lines on the video plane. In the case of using the method (c), instead of the omitted fields, the immediately previous fields are repeated. And in the case of using the method (d), instead of the omitted frames, the immediately previous frames are repeated.

Even in the case of omitting the pixel data by any of the method (a) to (d), the amount of the data becomes one half (the above-mentioned value of x is equal to 2) as compared with the case where the data is not omitted, i.e., the coding rate reduction is not performed. Accordingly, the period during which the data can be held by the buffer memory 4 can be advantageously doubled in time.

Figure 4:
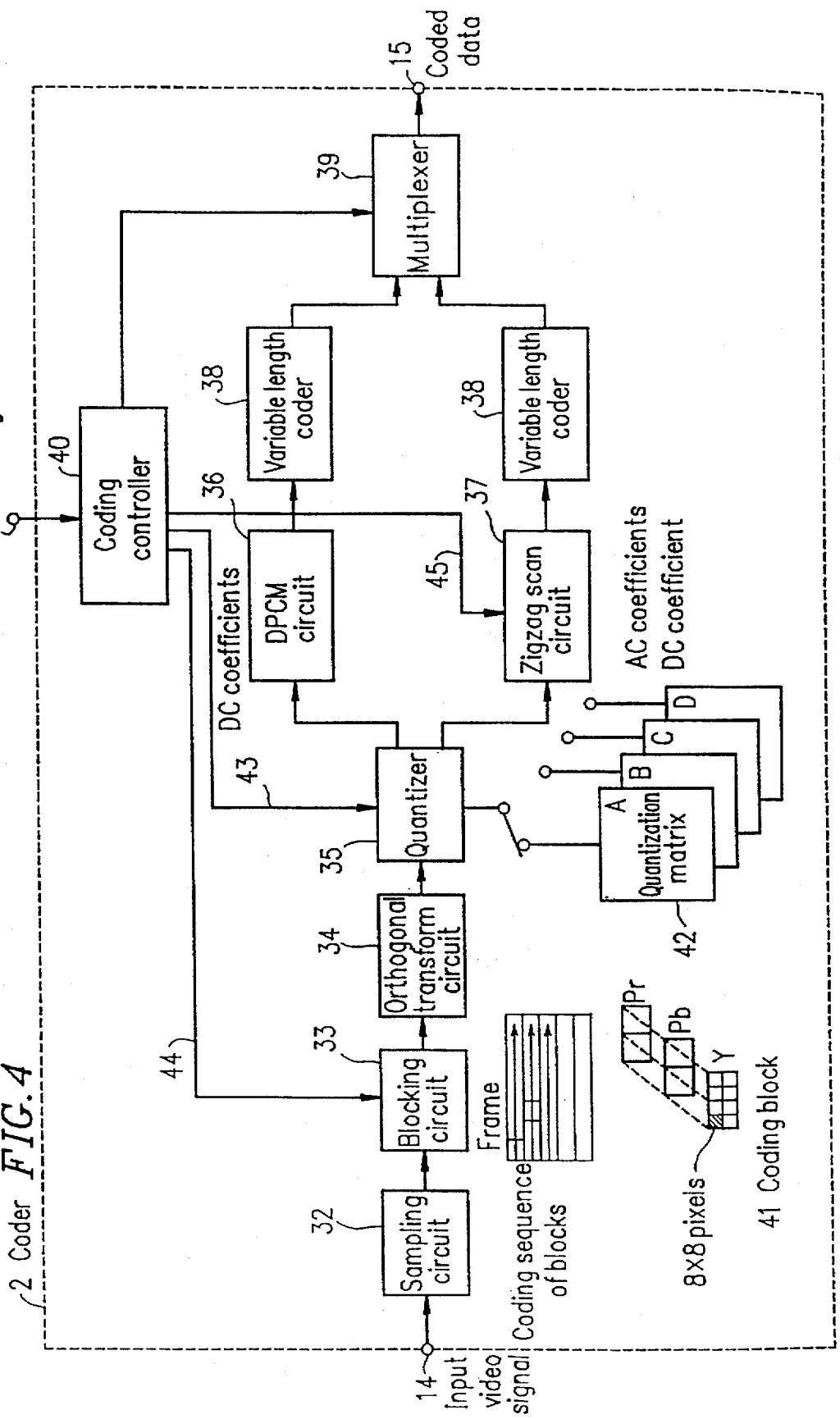
FIG. 4 is a block diagram showing another example of an internal configuration of a coder according to the first example of the invention.

FIG. 4 is a block diagram showing an internal configuration of a coder 2 for reducing the coding rate of the coded data 15 by using any of the methods (4) to (6). AS shown in FIG. 4, a coding controller 40 receives the coding rate reduction instruction 24 so as to control a series of coding processings.

Figure 18:
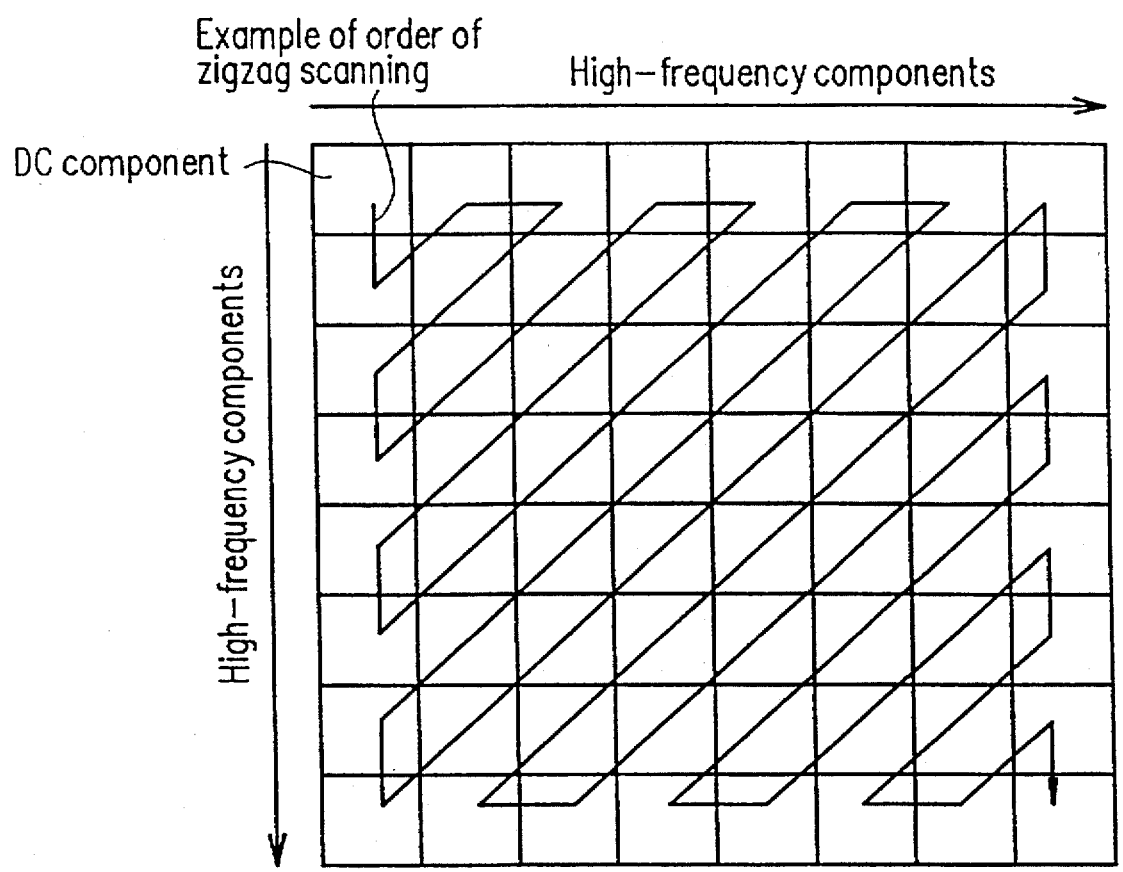
FIG. 18 schematically illustrates an example of a zigzag scanning.

First, the coding operation by a conventional coding method will be described below. According to a conventional coding method, a series of coding processings are not controlled by using the coding rate reduction instruction 24. An input video signal 14 is digitized by a sampling circuit 32 into a luminance signal Y and color difference signals Pb and Pr. The respective brightness signals and the respective color difference signals are divided into the coding blocks 41 as shown in FIG. 4 by a blocking circuit 33. A minimal unit of the coding block 41 is a block consisting of eight by eight pixels. In this case, a brightness signal consists of eight coding blocks 41 and a color difference signal consists of two blocks respectively corresponding to the brightness signal. The coding block 41 has intraframe addresses in the order to be raster-scanned, and the coding is performed in this order. A video signal is divided into a plurality of coding blocks 41 by the blocking circuit 33, and then the divided coding blocks are subjected to a discrete cosine transform by an orthogonal transform circuit 34 on a block basis so as to be converted into a frequency region. The orthogonally transformed coding blocks 41 are quantized by a quantizer 35. The quantizer 35 has a quantization matrix 42 used for the quantization, and quantizes the respective components of the block having different frequency components by using the quantization matrix 42 at respectively different quantization widths. The quantization is generally performed by utilizing the visual characteristics of man. That is to say, high-frequency components with less remarkable quantization noise are quantized at a large quantization width, while low-frequency components with more remarkable quantization noise are quantized at a small quantization width. If the quantization is performed at a large quantization width, then the values of the respective components after the quantization become small and the compression ratio becomes high, but the quantization distortion becomes large. If the quantization is performed at a small quantization width, then the opposite phenomena will occur. FIG. 17 shows an exemplary quantization matrix 42. The respective quantized components of a block are subjected to respectively different processings by using a DC coefficient indicating an average value of the coefficients of the orthogonally transformed block and the AC coefficients. The differential value of the DC coefficients between the respective blocks is obtained by a differential pulse code modulation (DPCM) circuit 36, and the obtained differential value is variable-length coded by a variable-length coder 38. On the other hand, the AC coefficients are zigzag scanned by a zigzag scan circuit 37 from a low-frequency component to a high-frequency component as shown in FIG. 18. The zigzag scanned data is run-length coded, and then variable-length coded by a variable-length coder 38. When the run-length coding is performed, the larger the zero run becomes, the more efficient the coding is performed. The variable-length coded AC and DC coefficients are multiplexed into one bit stream by a multiplexer 39 based on a predetermined syntax, and then transmitted to the memory controller 3 as a coded data 15. When the coefficients are multiplexed, the additional information such as the positional information of the block in a frame is also multiplexed into the bit stream.

Next, the method (4), i.e., the method for reducing the coding rate by controlling the quantization matrix 42, will be described. When the coding rate reduction instruction 24 output from the coding rate reduction controller 13 is "0", a normal coding is performed. On the other hand, when the coding rate reduction instruction 24 is "1", the coding controller 40 decodes a coding rate reduction degree code indicating a degree of the reduction in the coding rate multiplexed in the coding rate reduction instruction 24, so as to output a quantization matrix designation signal 43 for instructing the quantizer 35 to use the quantization matrix 42 defined by the coding rate reduction degree code. In accordance with the quantization matrix designation signal 43 output from the coding controller 40, when the degree of the coding rate reduction is large, the quantizer 35 performs a coarse quantization by using a quantization matrix 42, the values of the respective components of which are larger than those of a normal quantization matrix 42, i.e., a quantization matrix 42 having a larger quantization width (or quantization step) than a quantization matrix 42 used for a normal coding, so as to reduce the coding rate to be generated. That is to say, in accordance with the coding rate reduction degree code, the quantization matrix 42 used for the quantizer 35 is adaptively switched. The switching of the quantization matrix 42 is performed in the following stages. When the coding rate reduction degree is small, the quantization width of the high-frequency components is set to be as large as possible so long as the reproduced video remains a visually permissible one. On the other hand, when the coding rate reduction degree is large, the quantization width of the low-frequency components as well as that of the high-frequency components is set to be as large as possible so long as the reproduced video remains a visually permissible one. In this manner, the quantized coefficients can be set to be small, thereby reducing the coding rate generated by the coding. In this example, the quantizer 35 includes four quantization matrices 42 (A to D) having the quantization widths of the low-frequency components and the high-frequency components of the AC coefficients at four different levels, thereby adjusting the coding rate. In the case where the quantization matrix 42 is changed by the multiplexer 39, a quantization matrix change flag indicating the kind of the changed quantization matrix 42 is also multiplexed in the coded bit stream.

Figure 19A:
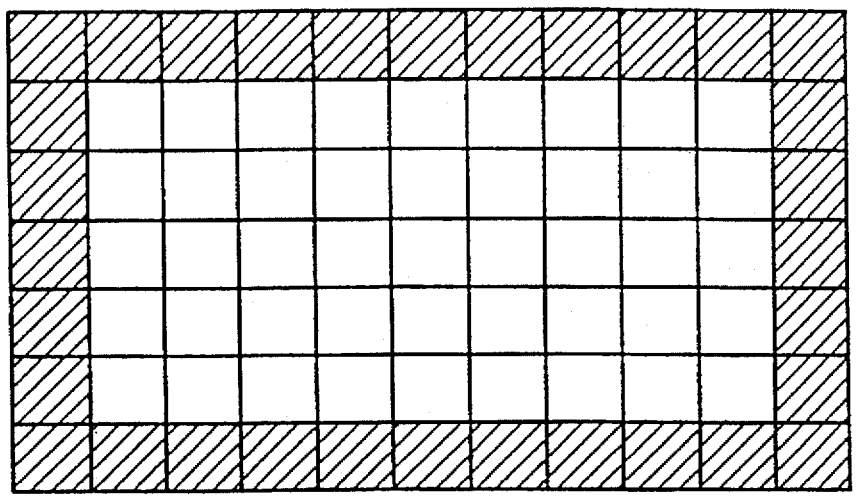
FIG. 19A schematically illustrates a method for omitting the coding blocks corresponding to the peripheral portion of the screen.
Figure 19B:
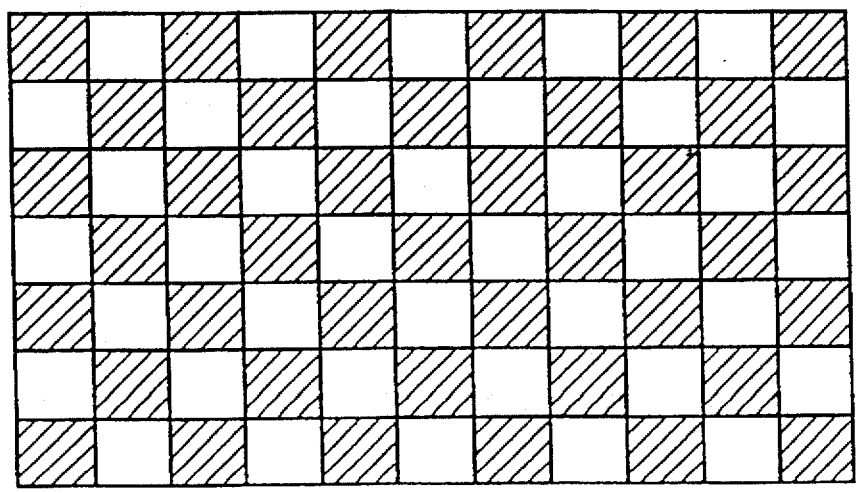
FIG. 19B schematically illustrates a method for omitting the coding blocks interleaved in a "checkerboard" pattern with respect to the screen.

Next, the method (5), i.e., the method for reducing the coding rate of the coded data 15 by omitting the block will be described. In the same way as the above-described method (4), when the coding rate reduction instruction 24 output from the coding rate reduction controller 13 is "1", the coding controller 40 transmits a block omitting signal 44 to the blocking circuit 33 for blocking the input video signal 14 in accordance with the degree of the reduction in the amount of the code. An interleave code for instructing the omitting method based on a coding block of a video is multiplexed in the block omitting signal 44. The block omitting signal 44 is a signal instructing which part of the coding block 41 of the frame of the input video signal 14 is coded by the omitting. The blocking circuit 33 receives the block omitting signal 44 so as to omit the coding block 41. The omitting is performed, for example, as shown in FIG. 19A. That is to say, less important coding blocks 41 in the peripheral portion of the frame are omitted from the coding blocks 41 constituting the frame. When the block omitting signal 44 is output, the omitted coding blocks are not coded, and only the address of the coding block and a flag indicating that the coding block is omitted are variable-length coded. When the decoding is performed, the omitted coding blocks are substituted by the coding blocks having the same block addresses of the decoded frame which is an immediately previous frame. Alternatively, the coding blocks 41 may be omitted as shown in FIG. 19B. That is to say, the coding blocks 41 may be alternately interleaved on a coding block basis. As described above, by omitting the coding blocks 41 so that some of blocks are not coded, the amount of the bits generated by the coding can be reduced.

Next, the method (6), i.e., the method for reducing the coding rate by deleting the data corresponding to the AC components by replacing a part of the AC coefficients with "0", will be described below. In the same way as in the method (4), when the coding rate reduction instruction 24 output from the coding rate reduction controller 13 is "1", the coding amount reduction degree code indicating the degree of the reduction in the coding amount multiplexed in the coding rate reduction instruction 24 and the instruction for operating the AC coefficients are decoded so as to transmit an AC coefficient operating signal 45 to the zigzag scan circuit 37. Based on the AC coefficient operating signal 45, the zigzag scan circuit 37 substitutes "0" for a part of the high-frequency components of the quantized block in accordance with the degree of the reduction in the coding rate instructed by the coding rate reduction code during the zigzag scanning by the scanning method as shown in FIG. 18. The AC coefficients are substituted by "0", so that a zero run becomes longer during the zigzag scanning and the coding rate is reduced.

Figure 22:
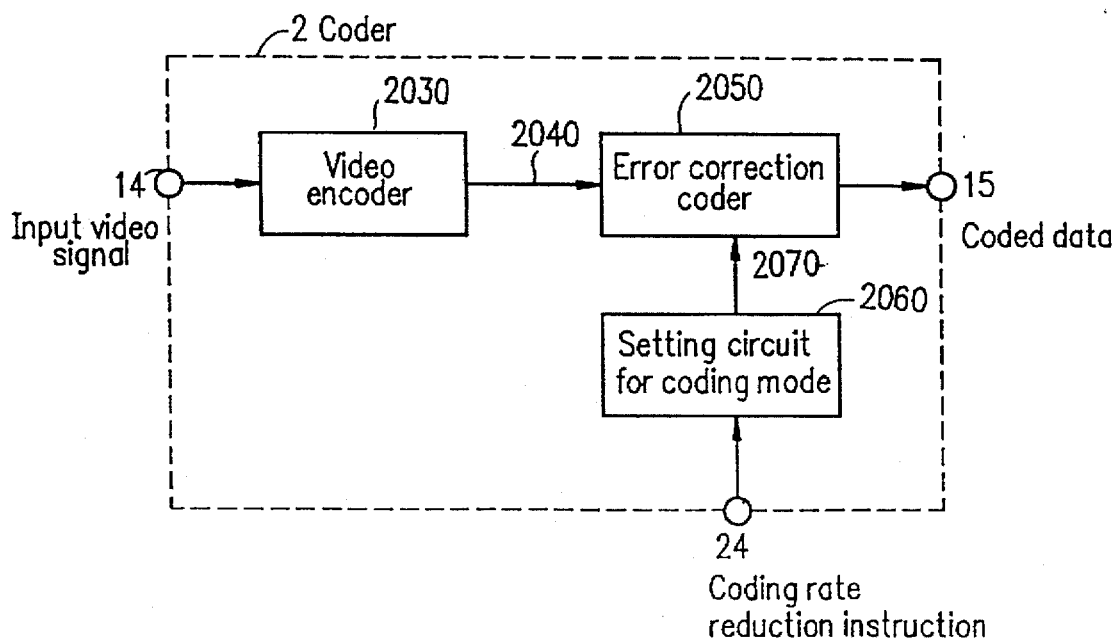
FIG. 22 is a block diagram showing still another example of an internal configuration of a coder according to the first example of the invention.

FIG. 22 is a block diagram showing an internal configuration of a coder 2 for reducing the coding rate of the coded data 15 by using the method (7). As shown in FIG. 22, the video signal 14 externally input is input to a video encoder 2030. The video encoder 2030 converts the video signal 14 into a digital data 2040, so as to output the digital data to an error correction coder 2050. The error correction coder 2050 generates an error correction code and adds the error correction code to the digital data 2040 in accordance with predetermined coding rules, so as to output the data as a coded data 15. The error correction coder 2050 has a function of generating an error correction code by selectively switching plural kinds of coding rules. In other words, the error correction coder 2050 can perform an error correction coding in a plurality of modes by selecting coding rules having respectively different coding efficiencies. Herein, a "coding efficiency" will be defined. A digital data 2040 is divided into information block having a unit of k bytes. Byte for check are further added to the information blocks having k bytes, thereby constituting a code block having n bytes. In the following expression:

$$Re = k/n \text{ (where, } 0 < Re < 1)$$

Re will be referred to as a "coding efficiency". The coding efficiency Re indicates a ratio of the information bytes to one code block. That is to say, the higher the coding efficiency Re is, the higher the ratio of the information bytes to one code block becomes. Therefore, in the case of coding the same amount of information, the higher the coding efficiency Re becomes, the smaller the number of the bytes of the code block, showing the result of the coding, becomes.

A setting circuit for coding mode 2060 generates a mode setting code 2070 for specifying a coding mode by using the coding rate reduction instruction 24. In the case where the coding rate reduction instruction 24 is provided as a digital signal so that the signal 24 becomes "1" when the coding rate of the coded data 15 is desired to be reduced, the setting circuit for coding mode 2060 sets a mode so that the relationship $Re_1 < Re_0$ is satisfied (where $Re_1$ is a coding efficiency when the coding rate reduction instruction 24 is "1", and $Re_0$ is a coding efficiency when the coding rate reduction instruction 24 is "0"). For example, if $Re_1$ is 0.9 and $Re_0$ is 0.6, then the amount of error correction coded data, i.e., the amount of bits of the coded data 15, when the coding rate reduction instruction 24 is "1" becomes two-thirds (0.6/0.9) of the amount of error correction coded data when the coding rate reduction instruction 24 is "0". Therefore, the period during which the data can be held in the buffer memory 4 can be advantageously extended to be 1.5 times as long as the ordinary period.

It is noted that when the coding rate reduction instruction 24 is "1", the coding mode may be varied. For example, depending upon the length of period during which the coding rate reduction instruction 24 continues to be "1", it is possible to switch a plurality of coding modes, and to control the coding efficiency at multiple stages.

By providing the coder 2 for reducing the amount of the coded data as compared with the amount of the data obtained at the normal recording operation by using any of the above-described methods (1) to (7), it is possible to minimize the reduction in the remaining capacity of the post-stage buffer memory 4. Therefore, even when the period during which the recording-disable signal 22 continues to be "1" becomes more or less long, the buffer memory 4 will no longer overflow. Consequently, when the recording-disable state is generated owing to the vibration or the shock externally applied, it is possible to increase the period during which the data is held in the buffer memory 4 by x times.

Figure 5:
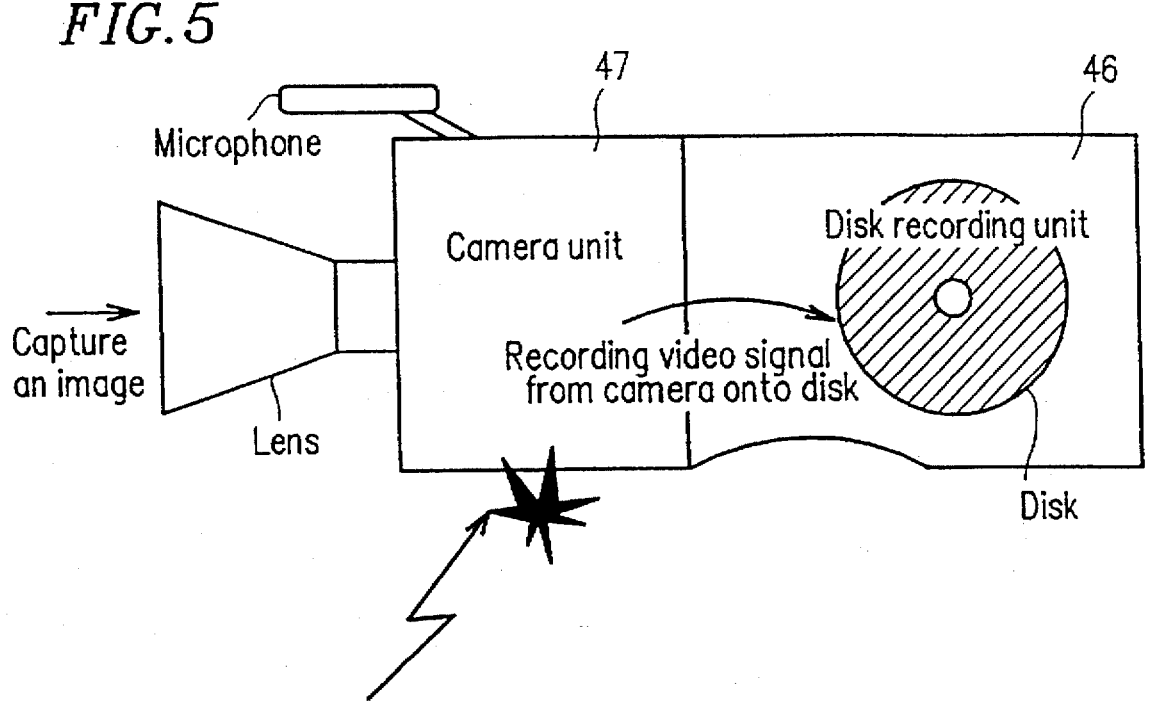
FIG. 5 schematically shows a disk recording apparatus integrally incorporating a camera unit which can be obtained by applying an information recording apparatus according to the invention.

FIG. 5 schematically shows a disk recording apparatus incorporating a camera integrally formed therein (hereinafter, such an apparatus will be referred to as a "disk cam-corder") representing a preferred embodiment of the disk driving apparatus described above. Nowadays, a video tape recorder (VTR) is a mainstream product for recording the captured video. The efficiency in editing and transferring such a video tape can be further improved as compared with a magnetic tape by using a disk medium allowing for a high-speed access. In the case of using such a disk medium in place of a magnetic tape, the problem of the vibration resistance is required to be solved. The effect of the shock which is externally applied onto the disk cam-corder in the case where the video captured by an electronic camera is recorded onto a disk by performing a digital compression coding will be described. A camera unit 47 formed by an electronic camera is affected by the shock, so that some "camera moving" is likely to be generated on the screen for displaying the video. On the other hand, the disk recording unit 46 formed by the disk recording apparatus is also affected by the shock, so that the recording-disable state is likely to be generated because of the rotation variation of the disk 1 or an off-track state of the head. If the recording-disable state is generated, then the remaining capacity in the buffer memory rapidly decreases at a constant rate in a conventional apparatus for recording the data coded. As a result, the length of the period during which the recording-disable state continues becomes long, and if the buffer memory overflows at last, a discontinuity is adversely generated in the recorded data. If the video of an important scene under capture is discontinued because of the absence of the recorded data, such an error will become fatal. In addition in a conventional recording apparatus, if off-track states are generated frequently, then such an off-track state is generated again before the remaining capacity in the buffer memory 4 is recovered. Therefore, the buffer memory 4 will overflow easily. As described above, when the video captured during the application of an external shock is displayed, a camera moving is likely to be generated on the screen. The video generating a camera moving on the screen is a fast motion video. Therefore, even if some degradation is caused on the video, such a degradation will not be observed easily by human eyes. In other words, even if the video generating a camera moving on the screen because of the vibration or the shock is coded by reducing the amount of the code thereof more or less, the degradation of the video can be regarded as a less remarkable one. Moreover, since the write rate into the buffer memory can be lowered by reducing the amount of the code, it is possible to extend the period during which the recorded data can be held. In the disk camcorder to which a disk recording apparatus according to the invention is applied as a disk recording unit 46, the length of the period during which the recorded data can be held in the recording-disable state is longer than that of a conventional recording apparatus, and therefore, the vibration resistance characteristics of the entire apparatus is improved as compared with a conventional one. Consequently, it is very advantageous to apply a disk recording apparatus of the invention to a disk cam-corder.

EXAMPLE 2

In this second example, a method for reducing the coding rate of the input information before the information is written into the buffer memory based on the detection result of the recording-disable state and the reduction in the remaining capacity in the buffer memory will be described.

Figure 6:
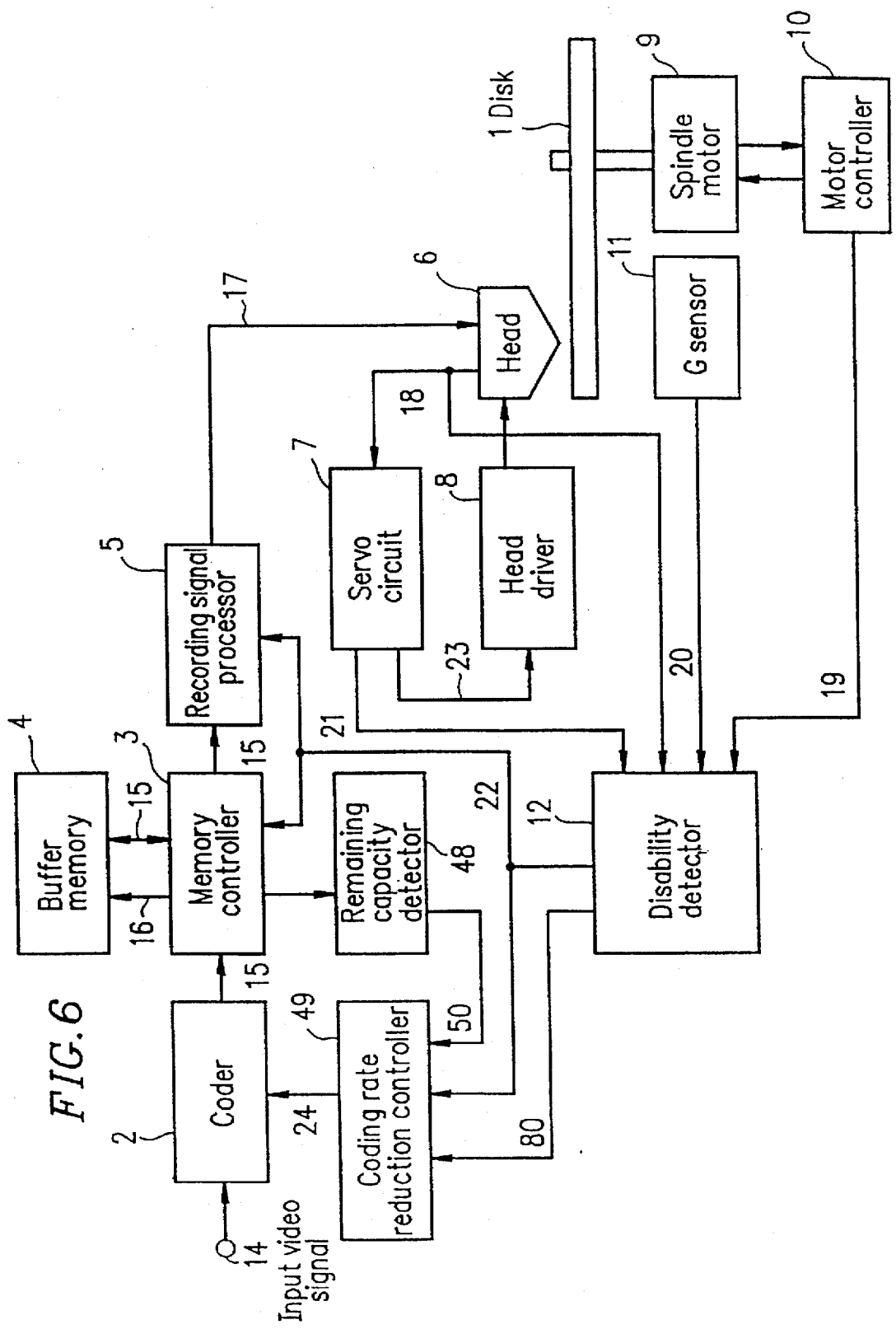
FIG. 6 is a block diagram showing a configuration of a disk recording apparatus according to a second example of the invention.

FIG. 6 is a block diagram showing a configuration of a disk recording apparatus according to a second example of the invention. In FIG. 6, the blocks having completely the same functions as those of the blocks of the first example shown in FIG. 1 will be denoted by the same reference numerals, and the detailed description thereof will be omitted herein.

A difference between this example and the first example is that a remaining capacity detector 48 is additionally provided for the disk recording apparatus of this second example. The remaining capacity detector 48 detects the remaining capacity in the buffer memory 4 by using the output from the memory controller 3. When the remaining capacity is detected to be a predetermined amount or less, the remaining capacity detector 48 outputs a remaining capacity decrease signal 50 to the coding rate reduction controller 49. In this example, the remaining capacity decrease signal 50 is regarded as "1" when the remaining capacity is a predetermined amount or less, while the remaining capacity decrease signal 50 is regarded as "0" in the other cases, so as to be output.

Following are the methods for detecting the remaining capacity in the buffer memory 4 by using the remaining capacity detector 48.

(a) A method in which a write address and a read address in the buffer memory 4 are used.

(b) A method in which the write clock, a read clock, a write control signal and a read control signal in the buffer memory 4 are used.

According to the method (a), the difference between the write address and the read address generated by the memory controller 3 into the buffer memory 4 is calculated, thereby detecting how far the read address is advanced from the write address. As a result, it is possible to detect how many bytes of unread data is accumulated in the buffer memory 4. This method has an advantage in that the address generated by the memory controller 3 can be used without performing any processing, and therefore is effectively applied to the case where a random access memory (RAM) is used as the buffer memory 4.

According to the method (b), a write counter (not shown) for counting the number of write operations performed during a predetermined time period by using a write clock and signals for controlling the write operation into the buffer memory 4 (such as a write enable signal for permitting the write operation and a write reset signal for resetting the write address to an initial value), and a read counter (not shown) for counting the number of read operations performed during a predetermined time period by using a read clock and signals for controlling the read operation from the buffer memory 4 (such as a read enable signal for permitting the read operation and a read reset signal for resetting the read address to an initial value) are provided inside the remaining capacity detector 48; and a difference between the counted value obtained by the write counter and the counted value obtained by the read counter is calculated, thereby detecting how many bytes of unread data is accumulated in the buffer memory 4. This method has a disadvantage in that a counter is required to be provided outside of the memory controller 3. However, this method can be effectively applied to the case where a FIFO memory is used as the buffer memory 4 because memory controller 3 does not generate the write address and the read address of the FIFO memory directly.

Figure 7:
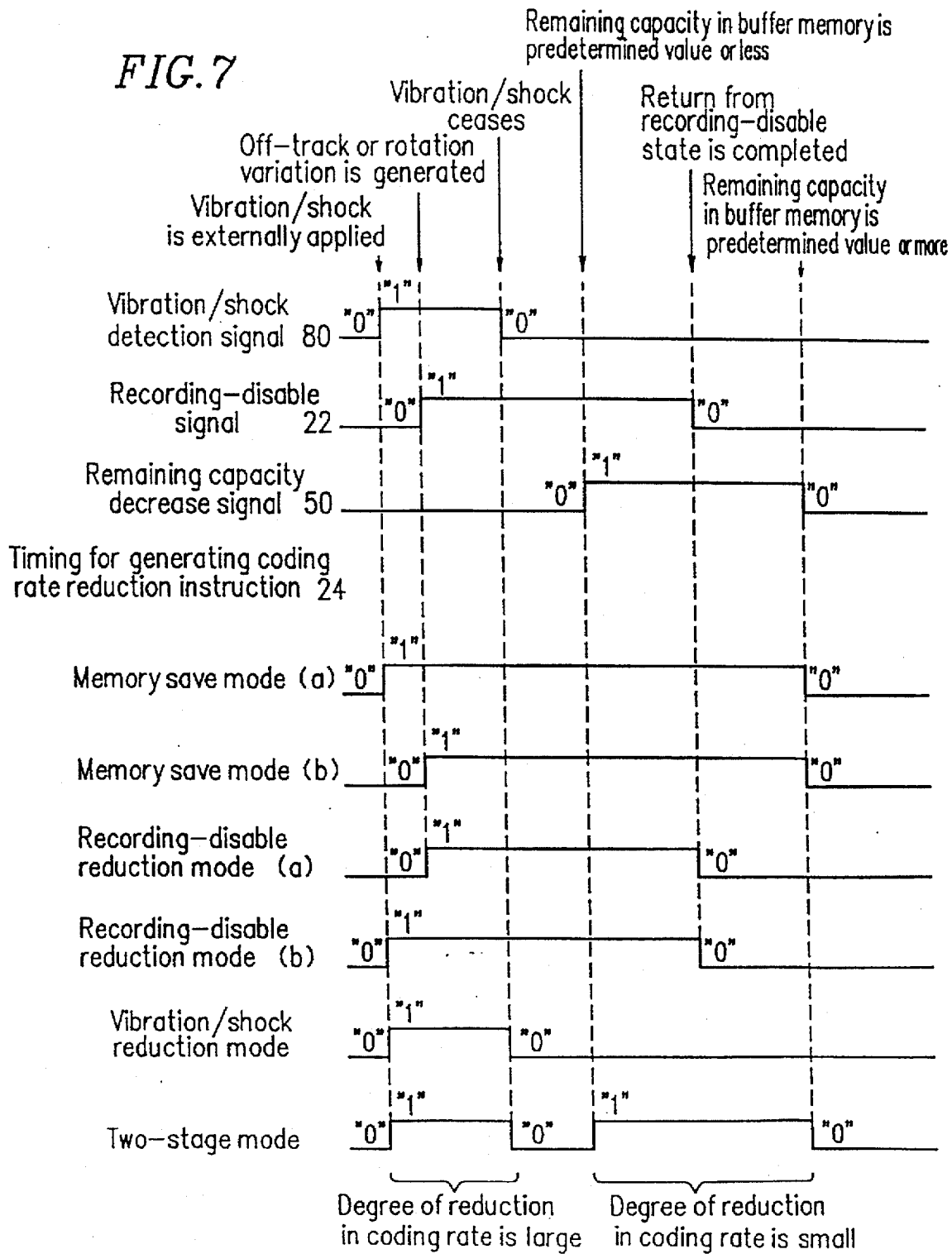
FIG. 7 is a timing diagram showing an exemplary timing for generating a coding rate reduction instruction according to the second example of the invention.

By using the remaining capacity decrease signal 50 output from the remaining capacity detector 48 for detecting the remaining capacity of the buffer memory 4 by the above-mentioned method, the recording-disable signal 22 output from the disability detector 12 in the same way as in the first example, and a vibration/shock detection signal 80, the coding rate reduction controller 49 generates a coding rate reduction instruction 24. In this case, the vibration/shock detection signal 80, as well as the recording-disable signal 22, is 15 generated by the disability detector 12, and becomes "1" when a predetermined acceleration width or more is obtained by using the acceleration signal 20 caused by the vibration or the shock output from the G sensor. FIG. 7 is a timing diagram showing an exemplary timing for generating a coding rate reduction instruction 24. The axis of abscissas indicates the flow of time. In the case where the recording-disable state is generated owing to the vibration or the shock externally applied, six phenomena are caused in the order indicated by the arrow (if the vibration or the shock are continuously applied, the order may be different). The recording-disable signal 22 is output from the disability detector 12 as described in the first example, and becomes "1" when the recording-disable state is generated because of the off-track state of the head 6 or the rotation speed variation of the disk 1. As described above, the remaining capacity decrease signal 50 is output from the remaining capacity detector 48, and becomes "1" when the remaining capacity in the buffer memory 4 is predetermined value or less. The coding rate reduction controller 49 determined the timing for setting the coding rate reduction instruction 24 to be "1" based on the values of the vibration/shock detection signal 80, the recording-disable signal 22 and the remaining capacity decrease signal 50 which have been input. The six kinds of timings shown in FIG. 7 will be described.

A memory save mode (a) is a timing generated in accordance with Table 1 showing the truth values. In the memory save mode (a), when at least one of the vibration/shock detection signal 80, the recording-disable signal 22 and the remaining capacity decrease signal 50 is "1", the coding rate reduction instruction 24 is set to be "1"

TABLE 1

Truth Table in the Memory Save Mode (a)

| vibration/shock detection signal | recording-disable signal | remaining capacity decrease signal | coding-rate reduction instruction |
|---|---|---|---|
| 0 | 0 | 0 | 0 |
| 1 | 0 | 0 | 1 |
| 1 | 1 | 0 | 1 |
| 1 | 1 | 1 | 1 |
| 0 | 1 | 0 | 1 |
| 0 | 1 | 1 | 1 |
| 1 | 0 | 1 | 1 |
| 0 | 0 | 1 | 1 |

A memory save mode (b) is a timing generated in accordance with Table 2 showing the truth values. In the memory save mode (b), the vibration/shock detection signal 80 is not used, and when one or both of the recording-disable signal 22 and the remaining capacity decrease signal 50 is/are "1", the coding rate reduction instruction 24 is set to be "1".

TABLE 2

Truth Table in the Memory Save Mode (b)

| vibration/shock detection signal | recording-disable signal | remaining capacity decrease signal | coding-rate reduction instruction |
|---|---|---|---|
| 0 | 0 | 0 | 0 |
| 1 | 0 | 0 | 0 |
| 1 | 1 | 0 | 1 |

TABLE 2-continued

Truth Table in the Memory Save Mode (b)

| vibration/shock detection signal | recording-disable signal | remaining capacity decrease signal | coding-rate reduction instruction |
|---|---|---|---|
| 1 | 1 | 1 | 1 |
| 0 | 1 | 0 | 1 |
| 0 | 1 | 1 | 1 |
| 0 | 0 | 1 | 1 |
| 1 | 0 | 1 | 1 |

In the memory save modes (a) and (b), the period during which the coding rate is reduced becomes longest, and therefore, the capacity of the buffer memory 4 may be smallest.

A recording-disable reduction mode (a) is a mode in which only the recording-disable signal 22 is used, and the same timing as that of the first example in which the period during which the recording-disable signal 22 is "1" is aligned with the period during which the coding rate reduction instruction 24 is "1".

A recording-disable reduction mode (b) ie a timing generated in accordance with Table 3 showing the truth values. In the recording-disable reduction mode (b), when one or both of the vibration/shock detection signal 80 and the recording-disable signal 22 is/are "1", the coding rate reduction instruction 24 is set to be "1".

TABLE 3

Truth Table in the Recording-Disable Reduction Mode (b)

| vibration/shock detection signal | recording-disable signal | remaining capacity decrease signal | coding-rate reduction instruction |
|---|---|---|---|
| 0 | 0 | 0 | 0 |
| 1 | 0 | 0 | 1 |
| 1 | 1 | 0 | 1 |
| 1 | 1 | 1 | 1 |
| 0 | 1 | 0 | 1 |
| 0 | 1 | 1 | 1 |
| 1 | 0 | 1 | 1 |
| 0 | 0 | 1 | 0 |

A vibration/shock reduction mode is a mode in which only the vibration/shock detection signal 80 is used, and the period during which the vibration/shock detection signal 80 is "1" is aligned with the period during which the coding rate reduction instruction 24 is "1".

In the recording-disable reduction modes (a) and (b), and the vibration/shock reduction mode, the length of the period during which the coding rate reduction instruction 24 is "1" is close to that of the period during which the vibration or the shock continue to be externally applied. Therefore, by applying these modes to the disk cam-corder as shown in FIG. 5, the degradation in the image can be the least remarkable, in particular.

In addition, it is possible to use a two-stage mode in which the coding rate signal is output at two stages. The two-stage mode is a timing generated in accordance with Table 4 showing the truth values. In the two-stage mode, when one or both of the vibration/shock detection signal 80 and the remaining capacity decrease signal 50 is/are "1", the coding rate reduction instruction 24 is set to be "1".

TABLE 4

Truth Table in the Two-Stage Mode

| vibration/shock detection signal | recording-disable signal | remaining capacity decrease signal | coding-rate reduction instruction |
| --- | --- | --- | --- |
| 0 | 0 | 0 | 0 |
| 1 | 0 | 0 | 1 |
| 1 | 1 | 0 | 1 |
| 1 | 1 | 1 | 1 |
| 0 | 1 | 0 | 0 |
| 0 | 1 | 1 | 1 |
| 1 | 0 | 1 | 1 |
| 0 | 0 | 1 | 1 |

In this two-stage mode, the degree of the reduction in the amount of code is set to be large when the vibration/shock detection signal 80 is "1" (or the input video signal is not written into the memory), and the degree is set to be small when the remaining capacity decrease signal 50 is "1", thereby suppressing the effect of the degradation in the image, and saving the memory capacity at the same time.

The generation timing of the coding rate reduction instruction 24 is realized by combining the three kinds of signals, i.e., the vibration/shock detection signal 80, the recording-disable signal 22 and the remaining capacity decrease signal 50. Therefore, at least $2^7$ timings are possible though not all of them are shown in FIG. 7. Consequently, it is possible to control the coding rate reduction more precisely by using timings other than those described above.

Following the coding rate reduction instruction 24 output at the above-mentioned timings, the coder 2 reduces the coding rate of the coded data 15 in order to reduce the write rate of the coded data 15 into the buffer memory 4. The internal configuration Of the coder 2 and the coding operation thereof are the same as those described in the first example, so the description thereof will be omitted herein.

EXAMPLE 3

In this third example, a method for selectively overwriting the information after the overflow on the data which has already been written in the buffer memory based on the detection result of the overflow of the buffer memory will be described.

Figure 8:
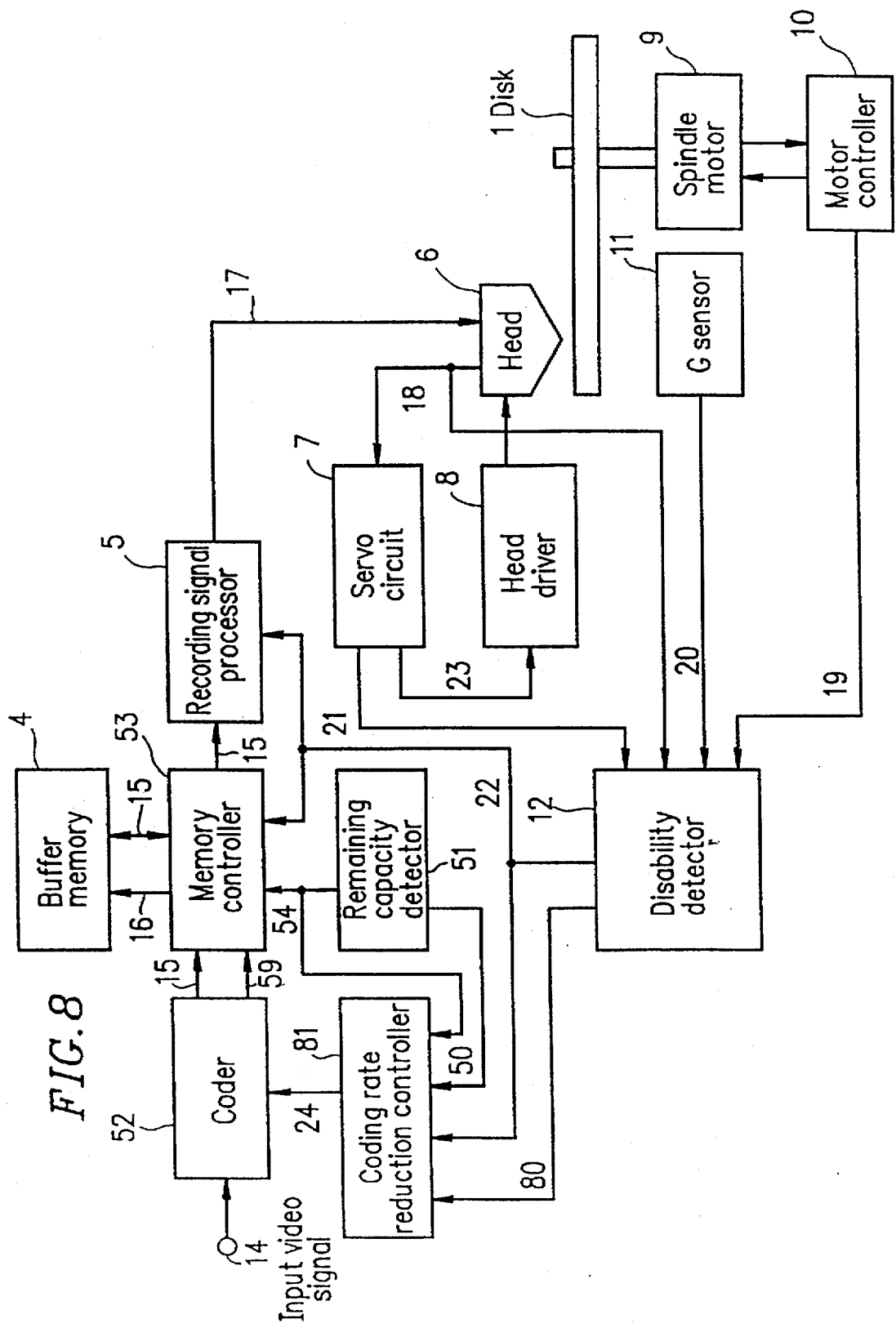
FIG. 8 is a block diagram showing a configuration of a disk recording apparatus according to a third example of the invention.

FIG. 8 is a block diagram showing a configuration of a disk recording apparatus according to a third example of the invention. In FIG. 8, the blocks having completely the same functions as those of the blocks of the first example shown in FIG. 1 will be denoted by the same reference numerals, and the detailed description thereof will be omitted herein. In the first and the second examples, the coding rate of the input information is reduced before the information is written into the buffer memory 4. This example relates to a processing method to be taken in the case where the buffer memory 4 overflows because the recording-disable state continues for a prolonged period.

In FIG. 8, the remaining capacity detector 51 detects the remaining capacity in the buffer memory 4 by using the output from the memory controller 53 and outputs a memory full signal 54 when the overflow is detected. The "overflow" herein refers to a state where the buffer memory 4 is full of the data yet to be read and there is no space for writing new information. The overflow of the buffer memory 4 can be detected by the remaining capacity detector 51 in accordance with the methods (a) and (b) as described in the second example. In other words, by detecting the accord between the write address position and the read address position, the overflow can be detected. In this example, when the overflow is detected, the memory full signal 54 is set to be "1", and in the other cases, the memory full signal 54 is set to be "0".

The memory full signal 54 output to the remaining capacity detector 51 in the above-mentioned way is input to the memory controller 53. When the memory full signal 54 is "1", the memory controller 53 overwrites the coded data 15 after the detection of the overflow on the already-written data on the buffer memory 4 in a predetermined unit. Following is examples of the predetermined units.

(a) The input video signal 14 is sampled in a "checkerboard" pattern with respect to the screen so as to be divided into odd-numbered pixel blocks consisting of odd-numbered pixels and the even-numbered pixel blocks consisting of even-numbered pixels. The odd-numbered pixel blocks and the even-numbered pixel blocks are used as the units.

(b) One frame or one field of the input video signal 14 is used as a unit.

(c) By coding the input video signal 14 based on a predetermined number of pixels, a coding block consisting of a predetermined number of pixels is used as a unit.

(d) The input video signal 14 is coded by coding techniques including an orthogonal transform into a frequency region, thereby dividing the orthogonally transformed data into the blocks consisting of a part of the AC components and the blocks consisting of the other AC components and the DC components. These blocks are used as units.

(e) The input information is error correction coded, and then the error-correction coded data is divided into the check blocks consisting of inner codes including the check bits of the outer codes and the blocks consisting of inner codes including the information bits of the outer codes. The check bits and the information bits are used as units.

Either when the normal recording is performed or when the overflow is detected, the coder 52 outputs a coded data 15 based on any of the units (a) to (e). In order to write the coded data 15 into the buffer memory 4, the memory controller 53 generates a write address based on the unit. The internal configuration of the coder 52 for outputting the coded data 15 based on the respective units (a) to (e), and a method for writing the coded data 15 into the buffer memory 4 will be described.

Figure 9A:
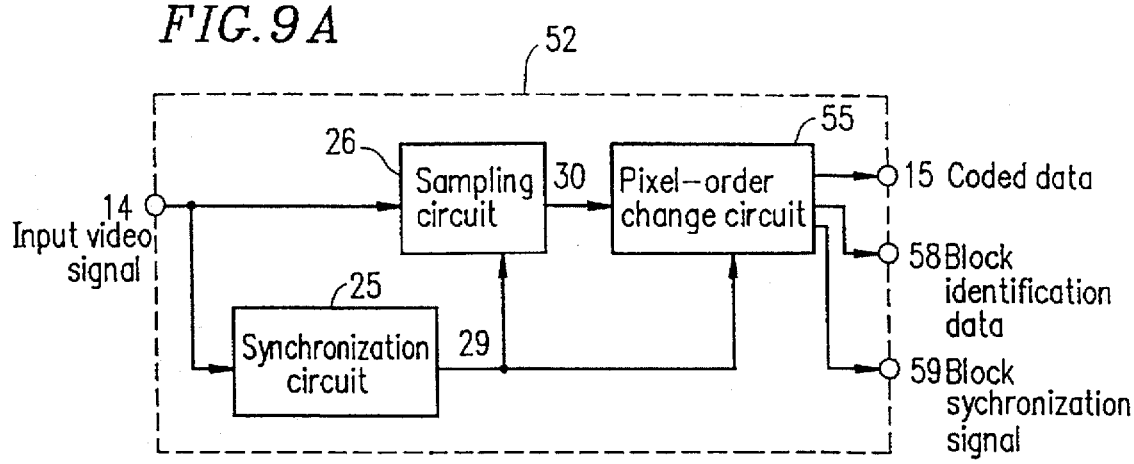
FIG. 9A is a block diagram showing an example of an internal configuration of a coder according to the third example of the invention.
Figure 9B:
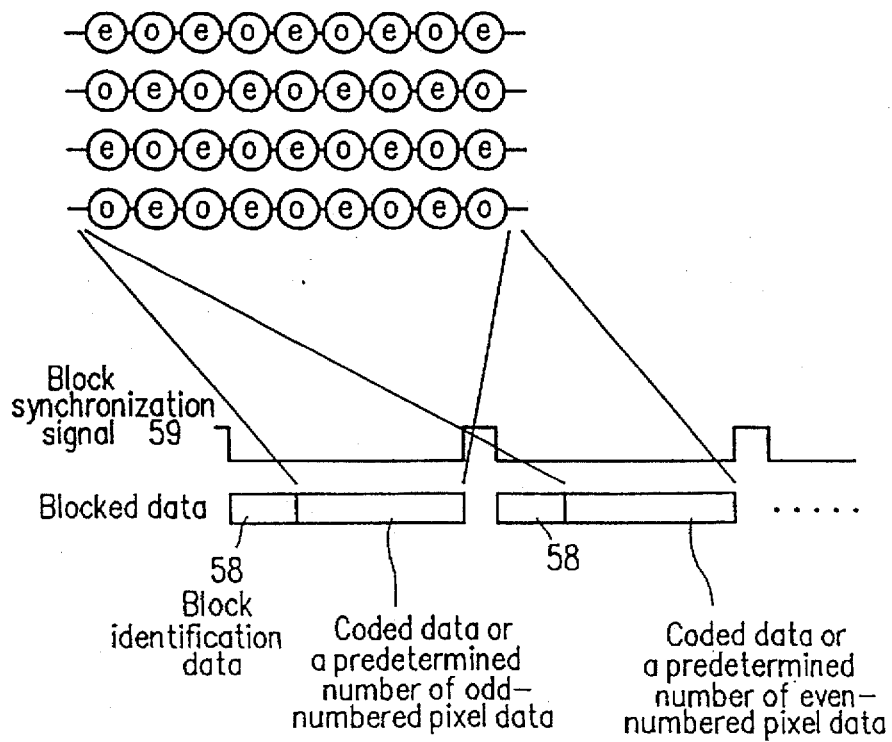
FIG. 9B schematically illustrates a "checkerboard" sampling, a method for separating the odd-numbered pixel data from the even-numbered pixel data, and the blocking of the data according to the third example of the invention.

FIG. 9A is a block diagram showing an internal configuration of the coder 52 for outputting the coded data 15 based on the unit as described in (a). The video signal 14 externally applied is input to a synchronization circuit 25 and a sampling circuit 26. The synchronization circuit 25 generates a clock for sampling the pixel units based on the input video signal 14 so as to detect the horizontal synchronization, the vertical synchronization and the like of the video signal 14 and generate various synchronous pulses 29 such as a horizontal synchronous pulse, a vertical synchronous pulse, and a frame synchronous pulse. The sampling circuit 26 samples the input video signal 14 by using the clock generated by the synchronization circuit 25 so as to output the signal as a digital data 30 synchronized with the clock to a pixel order change circuit 55. The pixel order change circuit 55 writes the digitized video data on a frame basis into a memory (incorporated in the coder 52, though not shown in FIG. 9A) by using the clock and the various synchronous pulses 29 generated by the synchronization circuit 25 thereby reading out the data by changing the order of the pixel data so that the data is separated into the odd-numbered pixel data 56 and the even-numbered pixel data 57 as shown in FIG. 9B. In this case, the pixel data can be read from the memory in any of the following orders. That is to say, after all of the odd-numbered pixel data 56 in one frame are read, all of the even-numbered pixel data can be read. Alternatively, as shown in FIG. 9B, the odd-numbered pixel data 56 and the even-numbered pixel data 57 may be alternately read based on predetermined bytes. The unit consisting of the predetermined bytes is regarded as one block of the coded data 15. The memory controller 53 generates a block identification data 58 and a block synchronization signal 59 as auxiliary data for generating the write address into the buffer memory 4. In this case, the block identification data 58 consists of a position on the screen, an identification flag for identifying whether the pixel data is odd-numbered or even-numbered, a frame number and the like of each block. The block synchronization signal 59 is a pulse for indicating the boundary between the adjacent blocks. The coded data 15 and the block identification data 58 can be output separately. Alternatively, as shown in FIG. 9B, a time-sharing multiplexing can be performed. That is to say, after the block identification data 58 has been output, the coded data 15 corresponding to the block identification data 58 can be output.

FIG. 10 shows the disposition of the data on the buffer memory. The buffer memory is divided into a number m of areas. The numeral attached to # denotes the number of each area. A line shows a data corresponding to one block, which is stored in each area. Each block consists of the block identification data 58 and the coded data 15. The maximal number of blocks which can be stored in the buffer memory 4 is m. Accordingly, the buffer memory 4 has a capacity of (the amount of the data corresponding to one block)×m. By using the blocked coded data 15, the block identification data 58 and the block synchronization signal 59, the memory controller 53 generates a write address into the buffer memory 4, thereby writing the coded data 15 and the block identification data 58 into the buffer memory 4 by disposing them as shown in FIG. 10. When a normal recording is performed, the coded data 15 output from the coder 52 shown in FIG. 9A together with the block identification data 58 is stored in a predetermined area in the buffer memory 4.

When the overflow of the buffer memory 4 is detected because of the continuation of the recording-disable state, the memory controller 53 generates a write address so that the data after the detection of the overflow is overwritten in the predetermined area in the buffer memory 4. For example, in the case where the blocks consisting of the odd-numbered pixel data 56 are stored in the odd-numbered areas and the blocks consisting of the even-numbered pixel data 57 are stored in the even-numbered areas during the normal recording operation, the memory controller 53 generates a write address so that the data after the detection of the overflow is overwritten only in the even-numbered areas. The data in the area where the overwrite operation is performed is read out only after all of the data in the area where the overwrite operation is not performed, i.e., the data which has originally been stored in the area, is read out. Therefore, the memory controller 53 is required to store the address of the area where the data after the detection of the overflow is overwritten.

If the overwrite operation is selectively performed in this way, then the blocks consisting of the even-numbered pixel data are lost for a predetermined time period. However, since an interpolation processing can be performed by using the four pixels, i.e., two horizontal pixels by two vertical pixels, when the data is reproduced, it is possible to minimize the reduction in the reliability caused by the loss of the recorded data.

Figure 11:
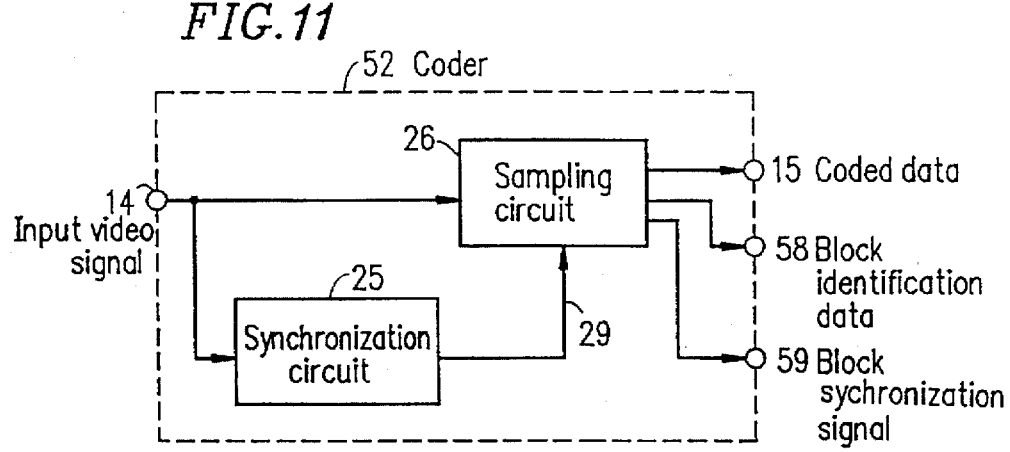
FIG. 11 is a block diagram showing another example of an internal configuration of a coder according to the third example of the invention.

FIG. 11 is a block diagram showing an internal configuration of a coder 52 for outputting the coded data 15 based on the unit as described in (b). The video signal 14 externally applied is input to a synchronization circuit 25 and a sampling circuit 26. The synchronization circuit 25 generates a clock for sampling the pixel units based on the input video signal 14 so as to detect the horizontal synchronization, the vertical synchronization and the like of the video signal 14 and generate various synchronous pulses 29 such as a horizontal synchronous pulse, a vertical synchronous pulse, and a frame synchronous pulse. The sampling circuit 26 samples the input video signal 14 by using the clock generated by the synchronization circuit 25 so as to output the signal as the coded data 15 synchronized with the clock. The sampling circuit 26 simultaneously outputs the coded data 15, and a block identification data 58 including a frame number and a field number and a block synchronization signal 59. The block identification data 58 and the coded data 15 can be output separately. Alternatively, a time-sharing multiplexing can be performed. That is to say, immediately after the block identification data 58 has been output for every frame or every field, the time division multiplexing is performed so that the coded data 15 corresponding to the block identification data 58 can be output. In this case, the block synchronization signal 59 is a pulse synchronized with an output timing of the coded data 15 corresponding to one frame or one field for indicating the boundary between the adjacent frames or fields. In this example, it is assumed that the data output within a period during which the block synchronization signal 59 outputs one pulse, i.e., the coded data 15 and the block identification data 58 corresponding to one frame or one field, is regarded as a data corresponding to one block.

As described above, the blocked data and the block synchronization signal 59 are transmitted to the memory controller 53, so that the memory controller 53 generates a write address into the buffer memory 4 depending upon the disposition as shown in FIG. 10. If recording-disable state is continued, the overflow of the buffer memory 4 is detected. Then, the memory controller 53 generates a write address so that the data after the detection of the overflow is overwritten in the predetermined area in the buffer memory 4. For example, in the case where the blocks consisting of the odd-numbered frames or fields are stored in the odd-numbered areas and the blocks consisting of the even-numbered frames or fields are stored in the even-numbered areas during the normal recording operation, the memory controller 53 generates a write address so that the data after the detection of the overflow is overwritten only in the even-numbered areas. The data in the area where the overwrite operation is performed is read out only after all of the data in the area where the overwrite operation is not performed, i.e., the data which has originally been stored in the area, is read out. Therefore, the memory controller 53 is required to store the address of the area where the data after the detection of the overflow is overwritten.

If the overwrite operation is selectively performed in this way, then the blocks consisting of the even-numbered frames or fields are lost for a predetermined time period. However, since an interpolation processing can be performed by using one or both of two adjacent frames or fields when the data is reproduced, it is possible to minimize the reduction in the reliability caused by the loss of the recorded data.

A coder 52 for outputting the coded data 15 based on the units as described in (c) and (d) is realized so as to have fundamentally the same internal configuration as that Of the coder 2 as shown in FIG. 4. Additional information such as positional information of the coding block 41 serving as a coding unit on the screen is multiplexed in the coded data 15 output from the coder 2 as shown in FIG. 4. Accordingly, a memory controller 53 can generate a write address into the buffer memory 4 by using the additional information multiplexed in the coded data 15, and therefore, can write the coded data 15 into the buffer memory 4 based on the coding unit as described in (c). When the buffer memory 4 overflows, the memory controller 53 generates a write address so that the data is overwritten only in the area where the data corresponding to a predetermined number of blocks per frame or field has already been written.

In addition, the data of the block at the same position on the screen are not overwritten for two successive frames or fields. If the overwrite operation is performed in this way, then the data of the blocks in the area where the overwrite operation is performed is lost. However, since an interpolation processing can be performed by using the data of the block at the same position for one or both of two adjacent frames when the data is reproduced, it is possible to minimize the reduction in the reliability caused by the loss of the recorded data. It is necessary to slightly modify a method for multiplexing the DC coefficients or AC coefficients by using a multiplexer 39 as shown in FIG. 4.

More specifically, in order to write the data into the buffer memory 4 based on the unit as described in (d), a data is time-sharing multiplexed into high-frequency blocks consisting of high-frequency AC coefficients alone which are not likely to be visually remarked and low-frequency blocks consisting of the other coefficients, and a flag for distinguishing the high-frequency blocks from the low-frequency blocks is incorporated as additional information. The memory controller 53 can generate a write address into the buffer memory 4 by using the flag and based on the high-frequency blocks and the low-frequency blocks as described in (d). When the buffer memory 4 overflows, the memory controller 53 generates a write address so that the overwrite operation is performed only in the area where the high-frequency blocks are written. Although the data in the high-frequency blocks is lost, visual loss is minimal. Therefore, it is possible to minimize the degradation in the reliability because of the loss of the recorded data.

Figure 12:
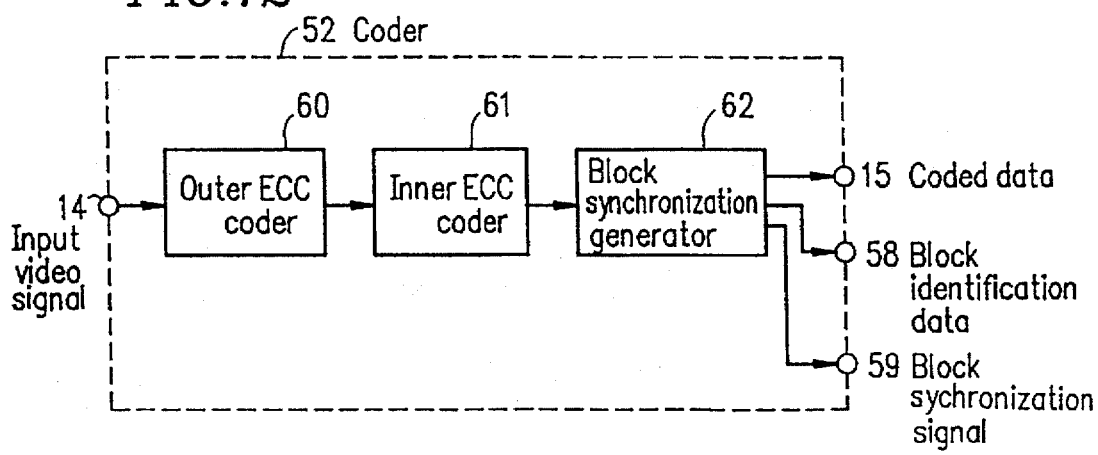
FIG. 12 is a block diagram showing still another example of an internal configuration of a coder according to the third example of the invention.

FIG. 12 is a block diagram showing an internal configuration of a coder 52 for outputting the coded data 15 based on the unit as described in (e). The externally input information 14 is first input to an outer ECC coder 60. The outer ECC coder 60 divides the input information 14 into information symbols 63 having ko bytes (where, ko is a natural number) as a unit. By adding a check symbol to the information symbols 63 having ko bytes, a code word having no bytes (where "no" is a natural number and no>ko). This code word having no bytes will be called a Co code word. The Co code word formed by the outer ECC coder 60 is input to an inner ECC coder 61. The inner ECC coder 61 adds a check symbol shown in FIG. 13 to a number ki (where ki is a natural number) of Co code words.

Figure 13:
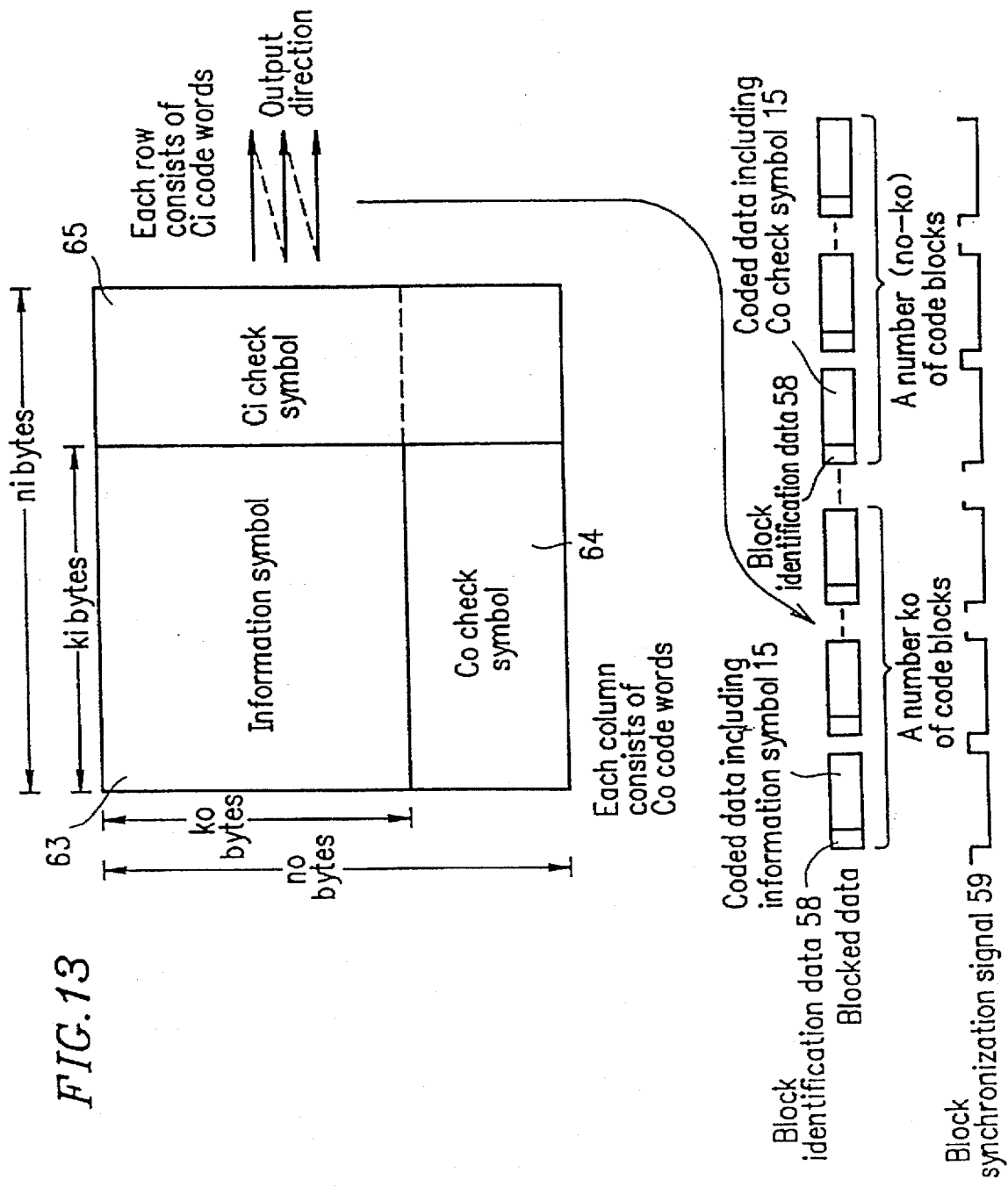
FIG. 13 schematically illustrates the blocking of the data which is error-correction coded by using a product code.

First the number ki of Co code words to be continuously input are stored in a memory (not shown) incorporated in the inner ECC coder 61 so that each column becomes a Co code word. Next, by adding the check symbols to the number ki of information symbols 63 corresponding to the respective rows, a code word having ni (where ni is a natural number, ni>ki) bytes is formed based on the rows. This code word having ni bytes will be called a Ci code word. In the case where a code word is indicated by a matrix having no×ni bytes, a code where each column is a Co code word and each row is a Ci code word will be called a Co and Ci product code. In addition, as shown in FIG. 13, a matrix having ko×ki bytes in the product code will be called an information symbol 63, a matrix having (no−ko)×ki bytes will be called a Co check symbol 64, and a matrix having (ni−ki)×no bytes will be called a Ci check symbol In this case, in order to produce a product code two-dimensionally arranged as shown in FIG. 13, the information symbol 63 in each column is coded to be a Co code, and each row of the resulting matrix having no×ki bytes is coded to be a Ci code. However, even if the Ci code word is first coded and then the Co code word is coded, the same result can be obtained. The product code thus formed is sequentially output to a block synchronization generator 62 in the direction indicated by the arrow in FIG. 13, that is to say, by using the Ci code word as a coded data 15 on a block basis. The block synchronization generator 62 generates a block identification data 58 including a block synchronization signal 59 which is a pulse indicating the head of the Ci code word, i.e., the boundary between adjacent blocks, and a flag for distinguishing between a block including an information symbol and a block including a Co check symbol.

The blocked coded data 15 and the block identification data 58 can be output separately. Alternatively, a time-sharing multiplexing may also be performed in order to output the block identification data 58 and then the coded data 15 corresponding to the block identification data 58. In general, a code formed along the direction of recording or transfer is called an inner code and a code formed in a different direction from that of recording or transfer is called an outer code. In this case, the Ci code word to be coded by the inner ECC coder 61 is an inner code, and the code word can correct a random error. On the other hand, the Co code word to be coded by the outer ECC coder 60 is an outer code, and the code word is effective in correcting a burst error.

The data blocked in this way and the block synchronization signal 59 are transmitted to the memory controller 53, and the memory controller 53 generates a write address into the buffer memory 4 in accordance with the disposition as shown in FIG. 10. When the overflow of the buffer memory 4 is detected because of the continuation of the recording-disable state, the memory controller 53 generates a write address so that the data after the detection of the overflow is overwritten in the predetermined area in the buffer memory 4. For example, in the case where a number mi of Ci code blocks including the information symbols 63 are stored in a area consisting of mi blocks numbered as from 0 to (mi−1), and (m−mi−1) Ci code blocks including the Co check symbols 64 are stored in a area consisting of (m−mi−1) blocks numbered as from mi to (m−1) during a normal recording operation, the memory controller 53 generates a write address so that the data only in the area numbered as from mi to (m−1) is overwritten after the detection of the overflow. The data in the area where the overwrite operation is performed is read out only after all the data in the area where the overwrite operation is not performed, i.e., all the data which has already been stored, is read out. Accordingly, the memory controller 53 is required to store the address of the area where the data after the detection of the overflow is overwritten.

By selectively performing the overwrite operation in this way, the code blocks including the Co check symbol 64 are lost for a predetermined period. However, since the random error can be corrected by using the Ci check symbol 65 added to the information symbol 63, it is possible to minimize the reduction in the reliability caused by the loss of the recorded data during the reproduction.

In the foregoing description, an example in which only an overwrite processing is performed when the buffer memory 4 overflows has been described. However, the overwrite processing can be effectively performed in combination with the processing for reducing the coding rate as described in the first and the second examples. The disk recording apparatus having the configuration as shown in FIG. 8 can perform both the coding rate reduction processing and the overwrite processing for the buffer memory. That is to say, by using four kinds of signals, i.e., the vibration/shock detection signal, the recording-disable signal, the remaining capacity decrease signal and the memory full signal, it is possible to set the period during which the coding rate is reduced and the period during which the overwrite processing is performed.

Figure 20:
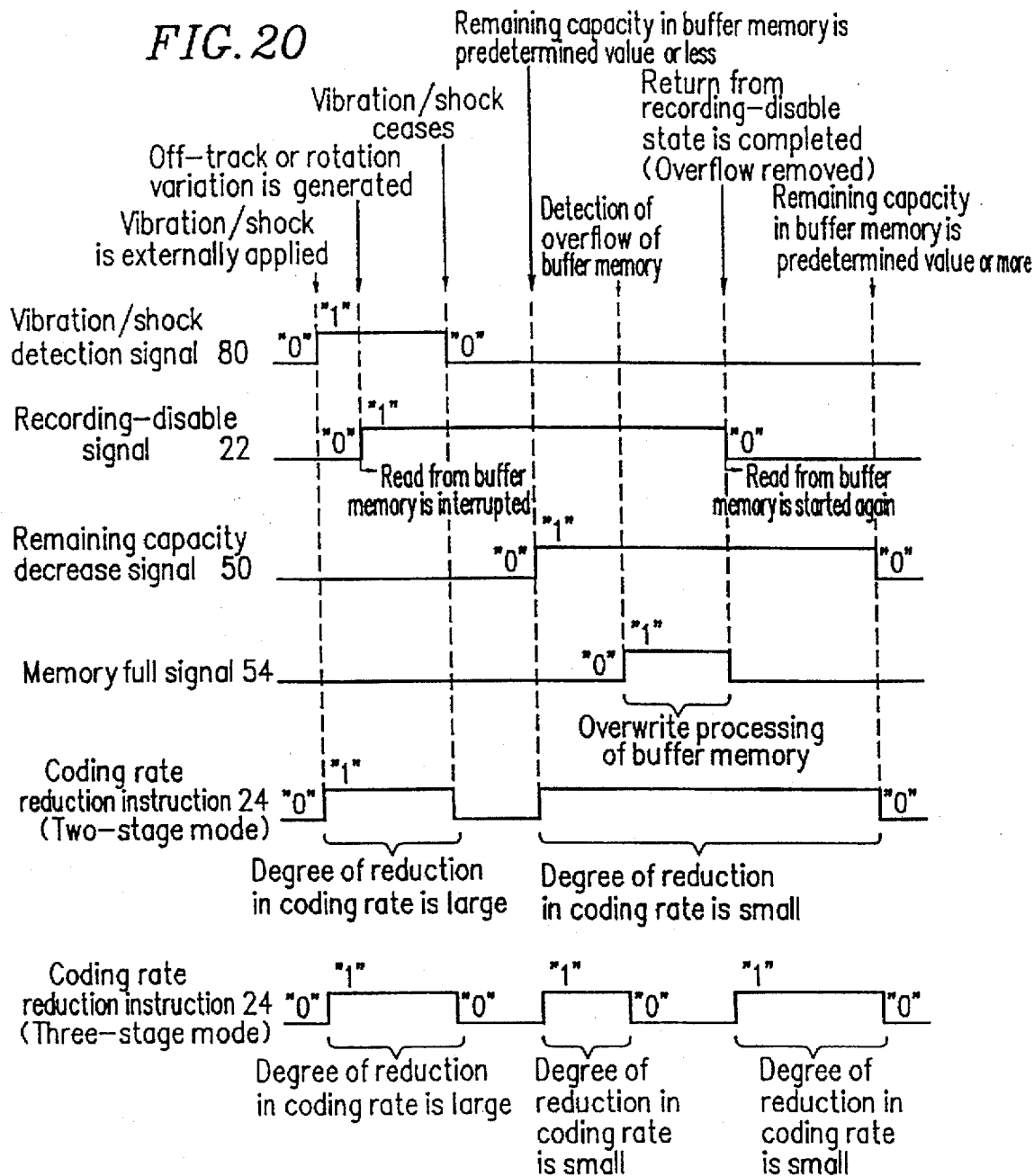
FIG. 20 is a timing diagram showing an exemplary period during which the coding rate reduction processing is performed and an exemplary period during which the overwrite processing in the buffer memory is performed in the third example of the invention.

FIG. 20 is a timing diagram showing an exemplary period during which the coding rate reduction processing is performed and an exemplary period during which the overwrite processing in the buffer memory is performed. Since the overflow is generated as the result of the gradual decrease in the remaining capacity of the buffer memory 4, the period during which the memory full signal is "1" is included within the period during which the remaining capacity decrease signal is "1". FIG. 20 shows two exemplary periods during which the coding rate reduction instructions for commanding the reduction in the coding rate are output. One of the two periods is the two-stage mode as described in the second example. During the period, the coding rate reduction instruction is set to be "1" when one or both of the vibration/shock detection signal 80 and the remaining capacity decrease signal 50 is/are "1". In this mode, the coding rate reduction processing is continuously performed even in the period during which the overwrite processing for the buffer memory 4 is performed. The other of the two periods is a three-stage mode. In the three-stage mode, the coding rate reduction processing is not performed in the period during which the memory full signal is "1", i.e., the period during which the overwrite processing for the buffer memory 4 is performed.

The timing for generating the coding rate reduction instruction 24 is realized by combining the states of the four kinds of signals, i.e., the vibration/shock detection signal 80, the recording-disable signal 22, the remaining capacity decrease signal 50 and the memory full signal 54. Therefore, though not shown in FIG. 20, it is possible to use at least $2^{11}$ kinds of timings. Accordingly, it is possible to control the coding rate reduction more precisely by using the timings other than those described above.

In the case where both the coding rate reduction processing and the overwrite processing for the buffer memory are performed, it is necessary to select an effective combination in determining specific methods for realizing both the processings. For example, in the case where an overwrite processing on a frame basis (i.e., the method described in (b) of this example) is performed with respect to the coded data whose frame is omitted by the coder 52 (according to the method (3) as described in the first example), the data corresponding to continuous two or more frames are lost as the result of the processing. In such a case, since an appropriate interpolation processing cannot be performed during the reproduction, the reliability of the data is degraded. Following are exemplary optimal combinations of the coding rate reduction processings and the overwrite processings for the buffer memory.

(a) When the reduction in the coding rate is processed by sub-sampling the pixels, the overwrite operation is performed in the buffer memory on a frame basis or on a field basis.

(b) When the reduction in the coding rate is processed by deleting the high-frequency components after the orthogonal transform, the overwrite operation is performed in the buffer memory on a frame basis or on a field basis.

(c) When the reduction in the coding rate is processed by changing the quantization matrices, the overwrite operation is performed in the buffer memory on a frame basis or on a field basis.

(d) When the reduction in the coding rate is processed by deleting the data on a coding block basis, the overwrite operation is performed in the buffer memory on a frame basis or on a field basis.

(e) When the reduction in the coding rate is processed by deleting the high-frequency components after the orthogonal transform, the overwrite operation is performed in the buffer memory on a coding block basis.

(f) When the reduction in the coding rate is processed by changing the quantization matrices, the overwrite operation is performed in the buffer memory on a coding block basis.

(g) When the reduction in the coding rate is processed by deleting the data on a frame basis or on a field basis, a "checkerboard" sampling is performed and one of the blocks is overwritten in the buffer memory.

Needless to say, above-mentioned methods do not show all the possible combinations. However, by employing these combinations, even if there is any recorded data which has been subjected to both the coding rate reduction processings and the overwrite processings for the buffer memory, an appropriate interpolation processing can be performed during the reproduction. Consequently, the reduction in the reliability of the data can be minimized.

EXAMPLE 4

In this fourth example, a method for recording a rate variation management information for managing a variation history when the coding rate of the input information is varied will be described.

Figure 14:
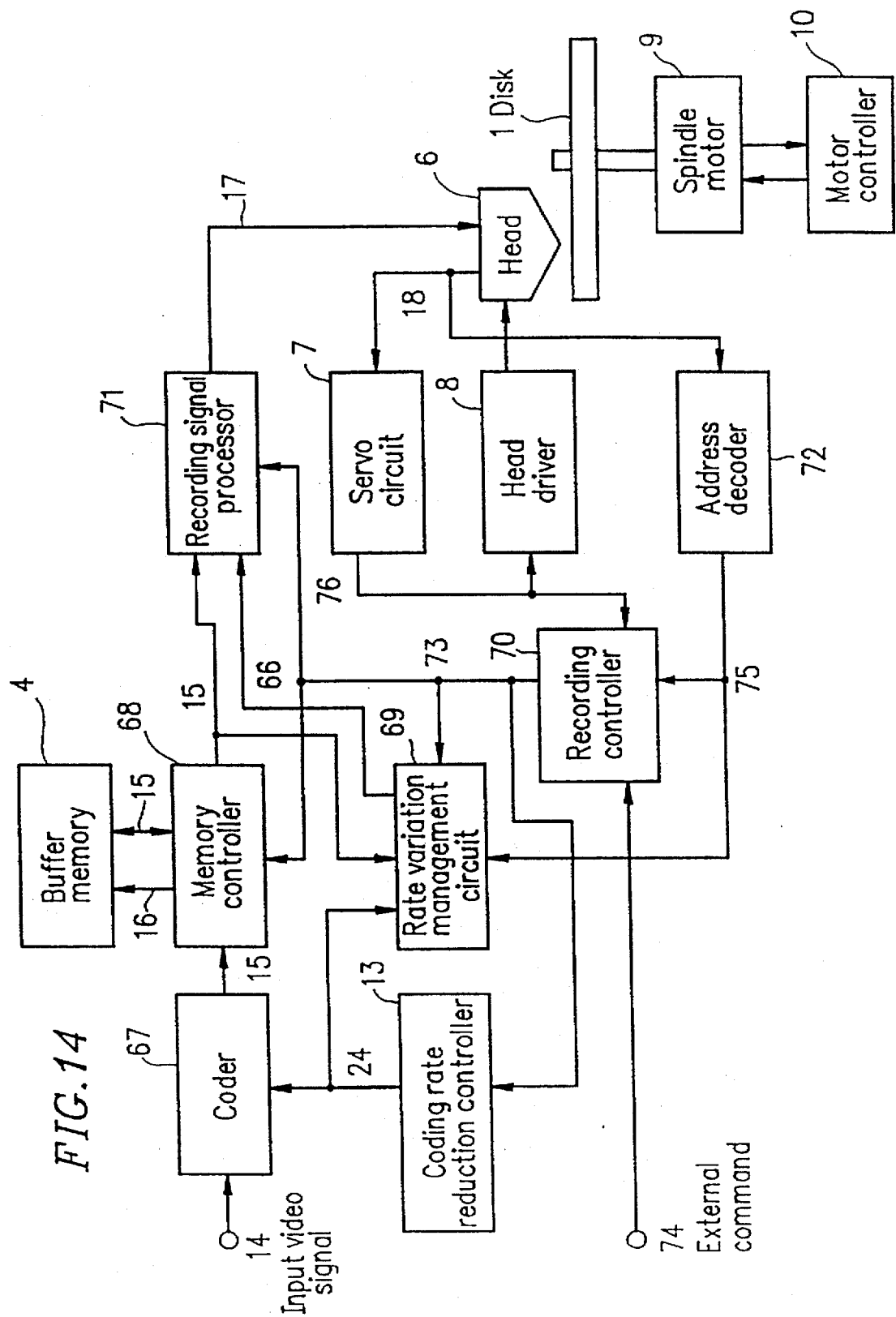
FIG. 14 is a block diagram showing a configuration of a disk recording apparatus according to a fourth example of the invention.

FIG. 14 is a block diagram showing a configuration of a disk recording apparatus according to the fourth example of the invention. In FIG. 14, the blocks having completely the same functions as those of the blocks of the first example shown in FIG. 1 will be denoted by the same reference numerals, and the detailed description thereof will be omitted herein. In this forth example, the coding rate of the input information is reduced before the information is written into the buffer memory 4 as described in the first and the second examples. The method of this fourth example is characterized by that the history of the variation in the coding rate of the input information is recorded on the disk together with the information. The information showing the history of the variation in the coding rate will be particularly called rate variation management information 66 in this example. The coding rate is varied on a sector basis, i.e., a minimal unit of the recording processing onto the disk 1, in order to improve the efficiency of the processing during the reproduction.

As shown in FIG. 14, a coder 67 codes the input video signal 14 by using the above-described methods (1) to (5) in the same way as the coder 2 of the first example. When the coding rate reduction instruction 24 output from the coding rate reduction controller 13 is "1", the coder 67 reduces the coding rate of the coded data 15 as compared with that of the normal recording operation. In addition, the coder 67 codes the input video signal 14 based on a data amount which is integer times as much as the data amount which can be recorded in one sector on the disk (hereinafter, the data amount will be called a "user data amount"). Thus it is possible to vary the coding rate based on the data amount which is integer times as much as the user data amount, too.

For example, it is assumed that the input video signal 14 is coded by using the method (6) as described in the first example. More specifically, it is assumed that the input video signal 14 is coded on a frame basis so as to be a coded data 15 having a rate of 24 Mbps (bps: bits per second) during the normal recording operation, and 12 Mbps during the interruption of the recording operation. The user data amount corresponding to one sector is assumed to be 2048 bytes, and the coded data 15 corresponding to one frame of the video signal is assumed to be recorded by dividing the coded data 15 into 50 sectors during the normal recording operation and 25 sectors during the interruption of the recording operation. Based on these settings, the coded data having the rate of 24 Mbps and the coded data having the rate of 12 Mbps are no longer recorded in one and the same sector, and therefore, it is possible to efficiently recognize the sector on the boundary where the rate is varied. Therefore, the decoding processing during the reproduction can be efficiently performed on a sector basis. It is not necessary to vary the coding rate at the two stages mentioned above. The coding rates can be varied at three stages or more so long as the data having different rates is not recorded in the same sector. In the above-described case, it is possible to provide a mode in which a coded data 15 having a rate of 9.6 Mbps is recorded by dividing the coded data 15 into 20 sectors.

In this example, a data amount variation flag for indicating the boundary where the rate is varied is further multiplexed in the coded data 15 so as to be output. The data amount variation flag can be of any kind so long as the rate variation management circuit 69 shown in FIG. 14 can clearly recognize the boundary where the rate is varied. The data amount variation flag may be generated simultaneously when the input video signal 14 is coded by the coder 67, or may be generated by using the coded data 15 which has not been written yet into the buffer memory 4 by the memory controller 68 or the coded data 15 which has already been read out from the buffer memory 4.

The memory controller 68 generates the write address and the write control signal for the buffer 30 memory 4 in accordance with the timing at which the coded data 15 is output from the coder 67, so that the coded data 15 is once written into the buffer memory 4. The memory controller 68 generates the read address and the read control signal for the buffer memory 4 following a recording control command 73 generated by a recording controller 70, thereby reading the data from the buffer memory 4 at a predetermined timing and outputting the data to a recording signal processor 71.

Following an external command 74 input externally by an operator of the apparatus, the recording controller 70 generates the recording control commands 73 as shown in the following Table 5.

TABLE 5

Table showing the recording control commands

| stop | standby | normal recording | recording interrupted | high-speed recording | management information recording |
|---|---|---|---|---|---|
| 00h | 01h | 02h | 03h | 04h | 05h |

A recording control command 73 is expressed as an eight bit data, for example. In this case, the hexadecimal numbers from "00h" to "05h" are respectively assigned to "stop", "standby", "normal recording", "recording interrupted", "high-speed recording", and "management information recording". When the power supply of the apparatus is turned on, the recording control command 73 automatically becomes "stop" (00h). When the start of the recording is commanded by an external command 74, the recording control command 73 becomes "standby" (01h), so that a motor controller 10 controls the spindle motor 9 so as to rotate the disk 1 at a predetermined rotation speed, and a head driver 8 moves the head 6 onto a predetermined track by using the output from the servo circuit. When the rotation speed of the disk 1 reaches the predetermined rotation speed, and the head 6 has moved to the sector where the recording is started, the recording control command 73 becomes "normal recording" (02h).

An address decoder 72 reads out a sector address, which has already been formatted on the disk 1 through the head 6 and outputs the read address information and a sector pulse 75 to the recording controller 70 and the rate variation management circuit 69. The sector pulse 75 is a pulse indicating the head of a sector, and continues to be "1" for a predetermined period after the sector address has been reproduced. Therefore, as shown in FIG. 15A or 15B, the pulse of "1" is output at a constant period while the sector address is reproduced normally. The sector pulse 75 becomes a reference timing for performing the recording operation.

FIG. 15A is a timing diagram showing the passage of the recording operation performed in the case where a recording-disable state is generated during performing a normal recording operation. In this example, the recording-disable state is detected by using the variation in an error signal such as a tracking error signal indicating an error between the position of the head and the position of the track. Though not shown, it is also possible to employ a method in which the magnitude of the vibration or the shock externally applied is directly detected by the G sensor as described in the first example, and a method in which the variation in the rotation speed of the disk 1 is directly detected by using the output of the motor controller 10. The recording controller 70 always monitors an error signal 76 such as a tracking error signal output from the servo circuit 7 during the recording operation. When the amplitude of the error signal 76 becomes a predetermined value or more, the recording controller 70 sets the recording control command 73 to be "recording interrupted" (03h).

As soon as the recording control command 73 becomes "recording interrupted" (03h), the recording signal processor 71 interrupts the recording operation in response to the command; the memory controller 68 interrupts the reading from the buffer memory 4; and the coding rate reduction controller 13 sets the coding rate reduction instruction 24 to be "1" in accordance with the output period of the "recording interrupted" (03h). The output period of the "recording interrupted" (03h) continues until the recording controller 70 confirms that the head 6 returns to the predetermined sector and the sector pulse is output. After the "recording interrupted" (03h), the "high-speed recording" (04h) is commanded.

During the output period of the "high-speed recording" (04h), the recording is performed at a higher speed as compared with the output period of the "normal recording" (02h). By commanding the "high-speed recording" (04h), it is possible to record the data accumulated in the buffer memory 4 at a high speed so as to restore the remaining capacity in the buffer memory 4 to the original remaining capacity during the recording interruption period. After the "high-speed recording" (04h) continues for a predetermined period, the "normal recording" (02h) is commanded again. In the period during which the "high-speed recording" (04h) continues, it is possible to use a method (not shown) as described in the second example in which the remaining capacity in the buffer memory 4 is directly detected by using the remaining capacity detector 48 so as to reset the command to the "normal recording" (02h) when the remaining capacity in the buffer memory 4 is restored.

A recording gate signal 77 shown in FIGS. 15A and 15B indicates a timing at which the recording is performed through the head 6. When the recording gate signal 77 is "0", the read operation from the buffer memory 4 and the recording operation of the recording signal processor 71 are performed. As is apparent from FIGS. 15A and 15B, the recording gate signal 77 has a sequence in which "0" and "1" are repeatedly output in accordance with the timing of the sector pulse 75 during the normal recording operation, while the recording gate signal 77 has a sequence in which "0" is continuously output during the high-speed recording operation. In this example, an intermittent recording in which a signal corresponding to one sector is recorded in two sectors is performed during the normal recording operation, while a continuous recording is performed during the high-speed recording operation. Therefore, the rotation speed of the disk 1 remains the same whether the normal recording is performed or the high-speed recording is performed. However, the read rate of the buffer memory 4 and the recording transfer rate during the high-speed recording operation apparently becomes twice as high as that during the normal recording operation.

FIG. 15B is a timing diagram showing the passage of the recording operation performed in the case where the rate variation management information 66 is recorded after the end of the recording is commanded as the external command 74 and the unrecorded data accumulated in the buffer memory 4 is recorded on the disk 1. In this example, all the rate variation management information 66 is controlled to be recorded after the input video signal 14 has been recorded. However, the rate variation management information 66 is not necessarily required to be recorded in this way.

For example, it is also possible to record the rate variation management information 66 together with the information every time the coding rate is varied. In this example, when the end of the recording is commanded as the external command 74, the write operation into the buffer memory 4 is terminated. On the other hand, the unrecorded data accumulated in the buffer memory 4 continues to be read (or the "normal recording" (02h) continues to be performed) until all the read data has been recorded on the disk 1. After the recording of the data is finished, the recording control command 73 becomes the "management information recording" (05h).

In this example, all the rate variation management information 66 is recorded in a predetermined area on the disk 1, e.g., a management track provided beforehand for recording the management information. FIG. 15B shows the operation to be performed after the "management information recording" (05h) is commanded. In this case, the head is moved to a predetermined management track and then the rate variation management information 66 is controlled to be recorded. It is not always necessary to provide a management track for the management information though the track is provided in this example. In the case of providing the management track, it becomes possible to read all the rate variation management information 66 recorded on the management track before reproducing the data, thereby improving the efficiency of the processing during the reproduction.

Next, the contents of the rate variation management information 66 and the operation of the apparatus during the recording of the management information will be described. Some information allowing for improving the efficiency of the processing during the reproduction is required to be contained in the contents of the rate variation management information 66.

In this example, the coding rate of the coded data 15 is varied on a sector basis, and therefore it is desirable for the rate variation management information 66 to contain address information of the sector on the boundary where the coding rate is varied. In addition, in order to efficiently perform the decoding, i.e., a completely opposite processing to the coding performed by the coder 67 during the recording, when the data is reproduced, it is desirable to contain the information indicating the method for reducing the coding rate.

Figure 16:
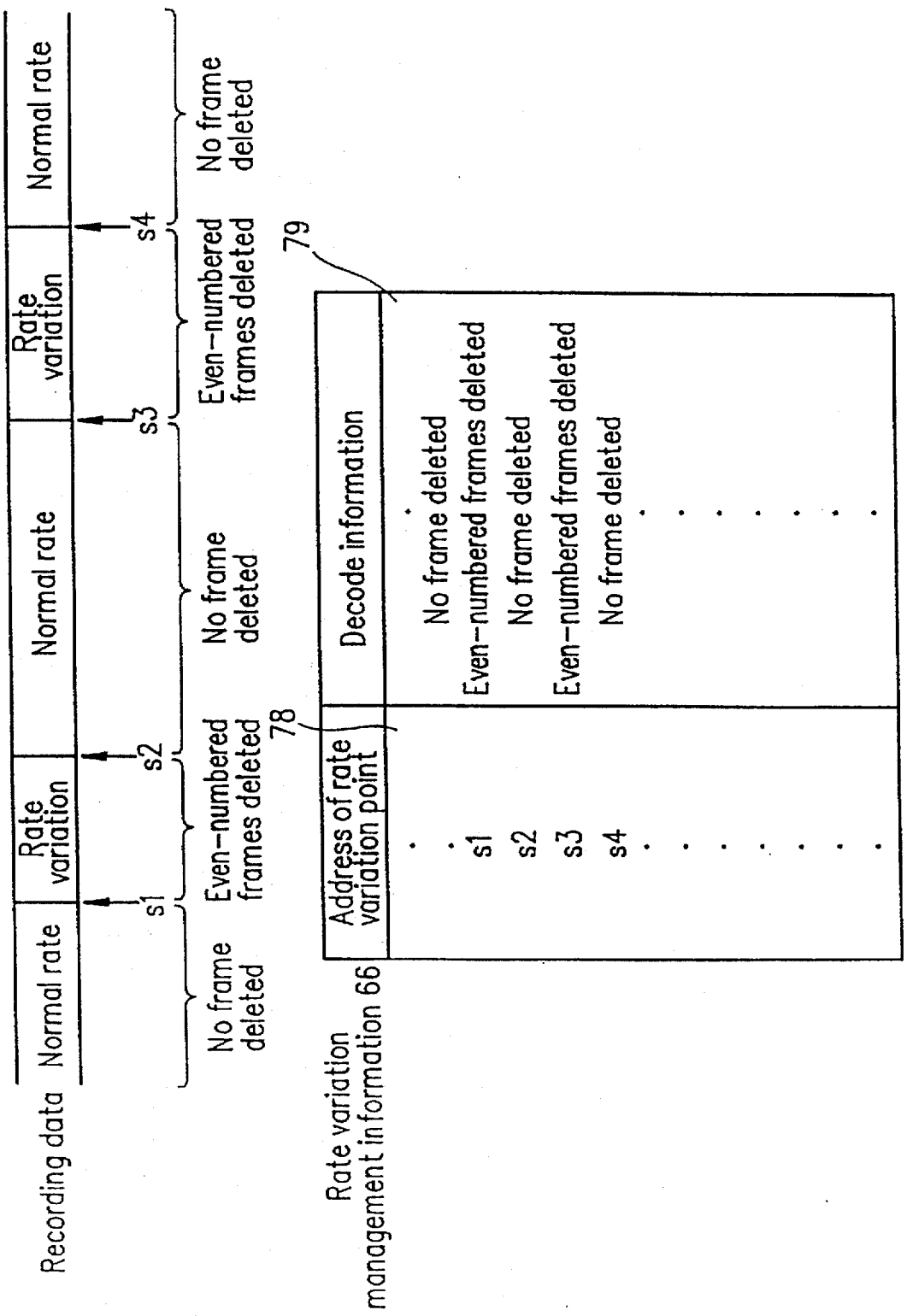
FIG. 16 illustrates the contents of the information for managing the rate variation in the fourth example of the invention.

FIG. 16 schematically shows the contents of the rate variation management information 66 in the case where the coding rate is varied by the method (2) as described in the first example, i.e., the omitting of the frame. As shown in FIG. 16, the period during which the coding rate is reduced can be judged based on the address information of the sector corresponding to the variation point of the coding rate, i.e., the address of the rate variation point 78. The method for varying the coding rate can be judged based on the information indicating the data corresponding to the even-numbered frame is deleted, for example. Therefore, in this case, the address of the rate variation point 78 corresponding to the point where the coding rate is varied and a decoded information 79 obtained by coding the information indicating the kind of the deleted data is required to be recorded as the rate variation management information 66.

As shown in FIG. 14, a rate variation management circuit 69 for generating the rate variation management information 66 is provided in this example. The rate variation management circuit 69 generates the rate variation management information 66 by using the sector address and the sector pulse 75 output from the address decoder 72, the coding rate reduction instruction 24 output from the coding rate reduction controller 13 and a code for specifying the coding rate reduction method which is multiplexed in the coding rate reduction instruction 24, the data 15 read from the buffer memory 4 to be output from the memory controller 68 or a data amount variation flag indicating the coding rate variation point which is multiplexed in the read data 15.

More specifically, by using the sector address, the sector pulse 75, and the data amount variation flag, the address of the rate variation point 78 is generated; by using the data amount variation flag and the code for specifying the coding rate reduction method, a decode information 79 is generated; and the address of the rate variation point 78 and the decode information 79 are stored as the rate variation management information 66 in the rate variation management memory (not shown) incorporated in the rate variation management circuit 69. In this way, every time the coding rate is varied, the rate variation management information 66 is accumulated in the memory. When the command of the "management information recording" (05h) is generated from the recording controller 70 by the external command 74 instructing the end of the recording, the rate variation management circuit 69 reads out the accumulated rate variation management information 66 from the incorporated memory so as to output the information to the recording signal processor 71. The recording signal processor 71 performs a predetermined signal processing such as a modulation with respect to the rate variation management information 66 and then records the processed information onto the management track or the like on the disk 1 through the head 6.

The method for improving the efficiency of the processing during the reproduction by recording the rate variation management information 66 can be applied not only to the case where the coding rate is reduced before the information is written into the buffer memory 4 as described in this fourth example, but also to the case where the coding rate of the coded data 15 is reduced as the result of the overwrite operation in the buffer memory as described in the third example.

EXAMPLE 5

In this fifth example, a method for performing the recording operation in emergent recording areas immediately after the return from the recording-disable state by dividing the recording area of an information recording medium (or a disk) into inner circumference portion (or the normal recording area) and outer circumference portion (or the emergent recording area).

FIGS. 23A to 23C show a disk 135 and the movement of the heads during the recording operation according to a fifth example of the invention. As shown in FIG. 23A, the disk 135 is a modified constant angular velocity (MCAV) method disk having tracks on both sides thereof. On each side of the disk 135, the recording area is divided into two areas, that is, an emergent recording area 136 on the outer circumference portion and a normal recording area 137 on the inner circumference portion. The MCAV method is a modified method of CAV method in which a rotation speed of the disk is constant. The MCAV method is a recording method in which the rotation speed of the disk is kept constant; the recording area is divided into a plurality of areas called zones along the radial direction of the disk; and the recording clock frequency is varied for the respective zones so that the frequency becomes higher towards the outer circumference thereof, thereby substantially equalizing the recording mark length in the inner circumference and the outer circumference.

In the disk 135, the normal recording area 137 on each of the upper side and the lower side is divided into eight zones along the radial direction of the disk. The eight zones will be sequentially referred to as zones 1 to 8 as counted from the inner circumference toward the outer circumference. On the other hand, the emergent recording area 136 on each of the upper side and the lower side is divided into two zones along the radial direction of the disk. The two zones will be referred to as zone 9 on the inner side and zone 10 on the outer side. In the four areas, i.e., two normal recording areas 137 and two emergent recording areas 136, a track corresponding to one rotation of the disk is divided into six sectors 138. Address information is pre-formatted in an address information area 124 of each sector so that each sector can be recognized.

Figure 24:
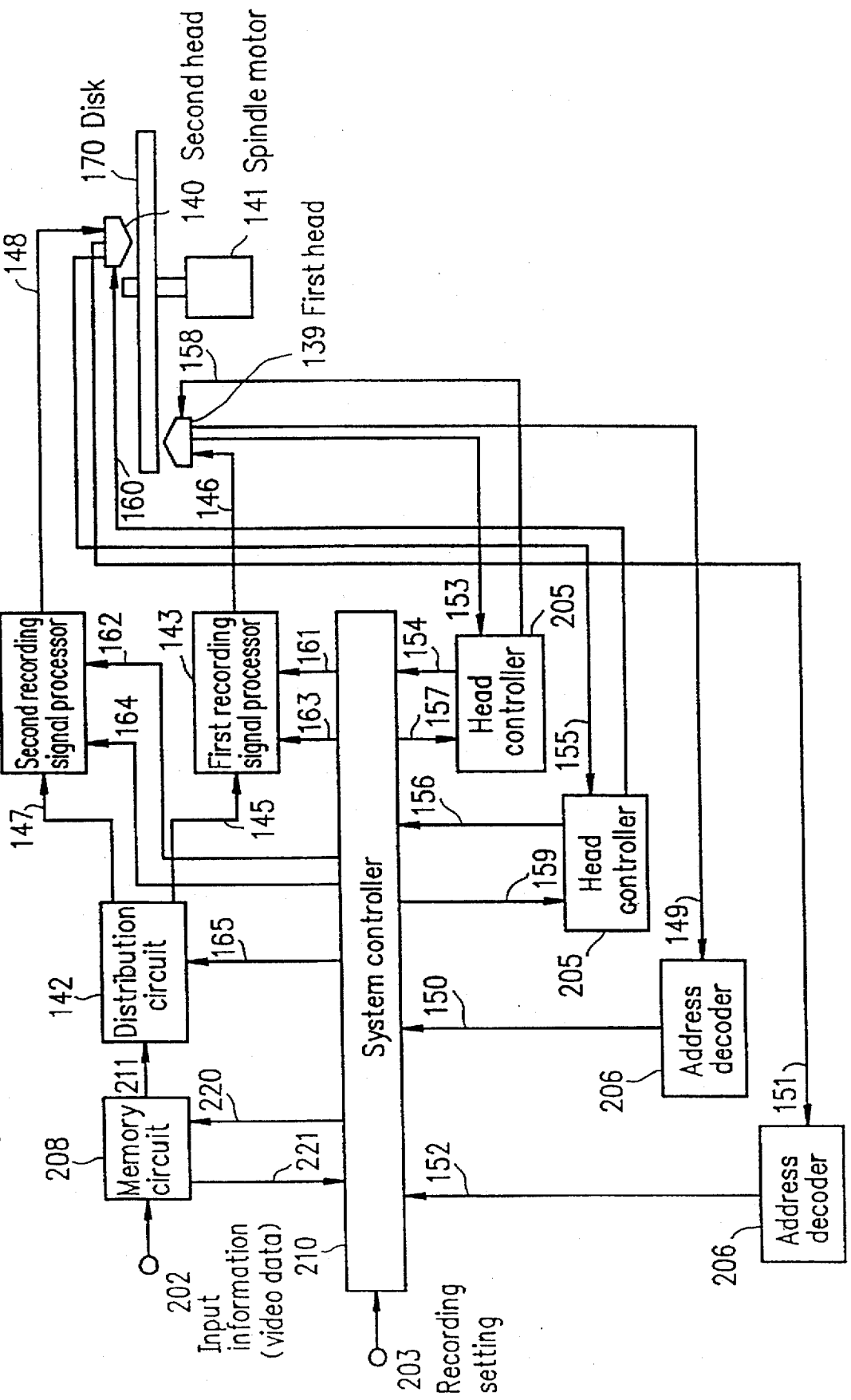
FIG. 24 is a block diagram showing a configuration of an optical disk recording apparatus according to the fifth example of the invention.

FIG. 24 is a block diagram showing a disk recording apparatus according to this fifth example of the invention. A first head 139 and a second head 140 access to the tracks on the upper and the lower surfaces of the disk 170, thereby recording the signal onto the disk 170. The disk 170 is rotated by e spindle motor 141 at a constant rotation speed of 1800 rpm (rotations per minute). The video signal input externally having a field frequency of 60 Hz is recorded on the disk.

The externally input information 202 (or a video data) is temporarily stored into a memory circuit 208. The digital data 211 read from the memory circuit 208 is divided into two by a distribution circuit 142 so as to be input to a first recording signal processor 143 and a second recording signal processor 144. The first recording signal processor 143 is connected to the first head 139, thereby converting the first digital data 145 into a first recording signal 146 for driving a semiconductor laser (not shown) incorporated in the first head 139. The second recording signal processor 144 is connected to the second head 140, thereby converting the second digital data 147 into a second recording signal 148 for driving a semiconductor laser (not shown) incorporated in the second head 140. The first recording signal 146 and the second recording signal 148 are transmitted to the first head 139 and the second head 140, and recorded on the predetermined sectors on the lower and the upper surfaces of the disk 170, respectively.

Address decoders 206 having the same function are provided for the respective heads (in this example, two address decoders are provided). One address decoder 206 identifies first address information 150 (a track number, a sector number, and the like) of the sector on which the first head 139 is located based on the first reproduction signal 149 output from the first head 139. The other address decoder 206 identifies second address information 152 (a track number, a sector number, and the like) of the sector on which the second head 140 is located based on the second reproduction signal 151 output from the second head 140.

Head controllers 205 having the same function are provided for the respective heads (in this example, two head controllers are provided). One head controller 205 outputs a first driving signal 158 for driving an actuator (not shown) incorporated in the first head 139 so that the first head 139 records the first recording signal 146 on the predetermined sector on the disk 170, thereby controlling the tracking, the address of writing position and the like. The other head controller 205 also outputs a second driving signal 160 for driving an actuator (not shown) incorporated in the second head 140 so that the second head 140 records the second recording signal 148 on the predetermined sector on the disk 170, thereby controlling the tracking, the address of writing position and the like.

Various kinds of recording settings 203, i.e., the recording start time, the recording period, the recording start address and the like, are externally input to a system controller 210. The system controller 210 controls the head controller 205, the first recording signal processor 143, and the second recording signal processor 144 so that the recording onto the disk 170 is started from the recording start address. The system controller 210 detects an off-track of the first head 138 by monitoring a first tracking error signal 154 detected by the head controller 205 and/or the first address information 150 identified by the address decoder 206. Also, the system controller 210 detects an off-track of the second head 140 by monitoring a second tracking error signal 156 detected by the head controller 205 and/or the second address information 152 identified by the address decoder 206.

Herein, in the case where the off-track state is not generated and the amount of the data 221 (Q) accumulated in the memory circuit 208 is less than a predetermined amount Qm (i.e., Q<Qm), such a state will be referred to as a normal state. On the contrary, if Q≧Qm, then such a state will be referred to as an emergent state. In this example, the signal is recorded on the sector in the normal recording areas 137 of the disk 170 under the normal state, while the signal is recorded on the sectors in the emergent recording areas 136 of the disk 170 under the emergent state.

Next, the recording method under the normal state will be described below. As shown in FIG. 23A, the head moves as indicated by the solid line under the normal state. That is to say, the first head 139 moves within the normal recording area 137 on the lower side of the disk 170 from the outer circumference to the inner circumference thereof, and the second head 140 moves within the normal recording area 137 on the upper side of the disk 170 from the inner circumference to the outer circumference thereof. Herein, the amount of the data recorded on each sector of the respective zones 1 to 8 is assumed to be denoted by Q1 to Q8. Then, the recording clock frequency is set so as to satisfy the following equation.

$$Q1+Q8=Q2+Q7=Q3+Q6=Q4+Q5=M \text{ (constant)}$$

In addition, as shown in FIG. 23B, the two heads are moved so that when the first head 139 accesses within an N zone (N is an integer ranging from 1 to 8), the second head 140 accesses within (9–N) zone. In this way, it is always possible to record a constant amount of data at a constant recording rate during the normal recording operation. In other words, the amount of data recorded by the first and the second heads 139 and 140 within a unit time period is always constant. In addition, the video data corresponding to two fields is recorded for one rotation of the disk under the normal state. During one rotation of the disk, the first and the second heads 139 and 140 access to six sectors, respectively. Therefore, during a half rotation of the disk, the first and the second heads 139 and 140 access to three sectors, respectively. Thus the video data corresponding to one field is recorded onto the six sectors. Herein, the amount of the video data corresponding to one field is set to be 3M.

Under the emergent state, that is to say, when the data can no longer be recorded on the predetermined track on the disk 170 due to the off-track caused by some external disturbance, i.e., vibration or shock, the system controller 210 immediately outputs a first recording interruption instruction 161 and a Second recording interruption instruction 162 to the first recording signal processor 143 and the second recording signal processor 144, respectively, thereby interrupting the recording operation. The system controller 210 outputs a reading stop command 220 to the memory circuit 208, thereby interrupting the read operation of the digital data. Also, the system controller 210 stores the address of the sector where the off-track is generated. In the meantime, the respective head controllers 205 start the track return operations of the first and the second heads 139 and 140. The video data 202 input during the return operations is stored in the memory circuit 208. As indicated by the broken line in FIG. 23A and as shown in the correspondence table in FIG. 23B, the first and the second heads 139 and 140 are moved to the emergent recording area 136, respectively. As soon as the disturbance ceases, the first and the second heads 139 and 140 start to record the data again onto the sectors within the emergent recording area 136.

Next, the recording method under the emergent state will be described below. The first head 139 starts to record the data on the track on the outermost circumference of the zone 10 and advances the recording gradually into the inner circumference. On the other hand, the second head 140 starts to record the data on the track on the innermost circumference of the zone 9 and advances the recording gradually into the outer circumference. Herein, the amount of the data recorded on one sector of the zones 9 and 10 are assumed to be denoted by Q9 to 010, respectively. Then, the recording clock frequency is set so as to satisfy the following equation.

$$Q9+Q10=1.5M$$

Therefore, the recording rate under the emergent state becomes 1.5 times higher than that under the normal state. In other words, the amount of the data recorded for a unit time period under the emergent state becomes 1.5 times larger than that under the normal state. The rotation speed of the disk 170 is always constant. Thus, while the video data corresponding to two fields is recorded during one rotation under the normal state, the video data corresponding to three fields can be recorded during one rotation under the emergent state. The track corresponding to one rotation is divided into six sectors. During one third rotation of the disk, the first and the second heads 139 and 140 access to two sectors, respectively. Thus the video data corresponding to one field is recorded on the four sectors. In this example, since the recording data rate becomes 1.5 times higher by switching the recording state from the normal one to the emergent one, the read rate of the memory circuit 208 also becomes 1.5 times higher. Therefore, the time required for recovering the remaining capacity in the memory circuit 208 can be shortened to two-thirds.

After a certain time has passed since the start of the recording under the emergent state, the Q value becomes the predetermined amount Qm or less. That is to say, when Q≦Qm, the recording in the emergent recording area 136 is suspended; the read operation from the memory circuit 208 is also suspended temporarily; the first and the second heads 139 and 140 are returned to the track on which an off-track has just been generated; and the recording starts again. In this case, the recording is performed in the same way as the recording under the normal state.

In this example, the switching of the recording states from a normal one to an emergent one, or from the emergent one to the normal one is performed on a rotation basis. For example, by predetermining the start sector of the track corresponding to one rotation, the recording is started from the start sector of the track corresponding to one rotation in both of the following two cases, i.e., the case where the vacant area is recovered until Q≦Qm, and the case where an off-track is generated. That is to say, even when the off-track is generated on a sector in a middle of the track, the recording operation starts from the data which has already been recorded on the start sector of the rotation. On the other hand, even if Q becomes equal to or smaller than Qm on a sector in a middle of the track, the recording is continued until the last sector of the rotation and then the head is returned to the normal recording area 137. The system controller 210 stores the address of the sector immediately before the return to the normal recording area 137. From the next generation of the off-track on, the recording under the emergent state is started from the address next to the address of the sector stored by the system controller 210.

In order to determine the timing of moving the heads and the address to which the heads are required to be moved when the recording state are switched from a normal one to an emergent one, or from the emergent one to the normal one so as to give the instruction to the respective head controllers 205, the system controller 210 outputs a first track return instruction 157 and a second track return instruction 159 to the respective head controllers 205. On the other hand, when the recording states are switched, the dividing operation of the digital data by the distribution circuit 142 and the setting of the recording modes of the first and the second recording signal processors 143 and 144 must be changed. A distribution mode setting signal 165 and recording mode setting signals 163 and 164 are provided for these purposes. In this example, the zone numbers are given by the system controller 210.

As is apparent from the foregoing description, the heads move to the emergent recording area 136 every time an off-track is generated and the recording operation is performed at a higher rate as compared with the normal recording operation. Therefore, it is possible to perform the continuous recording by maintaining a certain amount of the remaining capacity in the memory circuit 208.

Moreover, the emergent recording area 136 can be used during the normal recording operation. That is to say, in the case where the data has already been recorded on all the sectors in the normal recording area 137 and no unrecorded area exists in the normal recording area 137, but some unrecorded areas remain in the emergent recording area 136, the recording operation is performed continuously by moving to the emergent recording area 136, even if an off-track is not generated. In this way, all the areas on the disk 170 can be used without any loss.

In this example, the data is recorded onto both faces of an MCAV method disk by using two heads. However, the format of the disk and the number of the heads are not limited thereto. For example, if a disk whose single face can be used for recording is rotated at a constant angular velocity; the length of the sector and the recording clock frequency are set so that the amount of the data recorded on one sector within the normal recording area 137 becomes always constant; and the amount of the data recorded on one sector within the emergent recording area 136 is set to be larger than that during the normal recording operation, the same effects can be attained.

Since the amount of the data on a sector within the emergent recording area 136 is set to be larger than that on a sector within the normal recording area 137 without complicating the control of the apparatus, the signals are arranged within one sector as shown in FIG. 23C. One sector is divided into an address information area 124, a gap area 128, and an information recording area 126 in this order. The gap area 128 is mainly used as a laser power control area, i.e., an area for setting the power of a semiconductor laser incorporated in a head. A preamble 129 is provided on the head of the information recording area 126, and a special signal for reproducing a clock during the reproduction Operation is recorded thereon. The information recording area 126 is further divided into a plurality of sync blocks 166. On a sync block, a signal sync for a block synchronization, an identification signal ID indicating the contents of the block data, and an actual data DATA are recorded in this order from the top of the sync block. The number of the data bytes recorded within one sync block is set to be constant in any zone. Based on the MCAV method, the larger the zone number becomes, the larger the number of the sync blocks within one sector is set to be. Therefore, the number of the sync blocks 166 within one sector in the emergent recording area 136 always becomes larger than the number of the sync blocks 166 within one sector in the normal recording area 137. By arranging the signals in the sector in this way, the distribution circuit 142 can perform the division processing of the digital data 211 on a sync block basis. Consequently, the switching of the division processing can be advantageously performed in both of the normal state and the emergent state without complicating the processing.

EXAMPLE 6

In this example, of a method for recording a history of a track jump in the case where a recording device (or a head) records a series of information both in the normal recording area and the emergent recording area of an information recording medium (or a disk) while track-jumping to the two areas will be described.

Figure 25A:
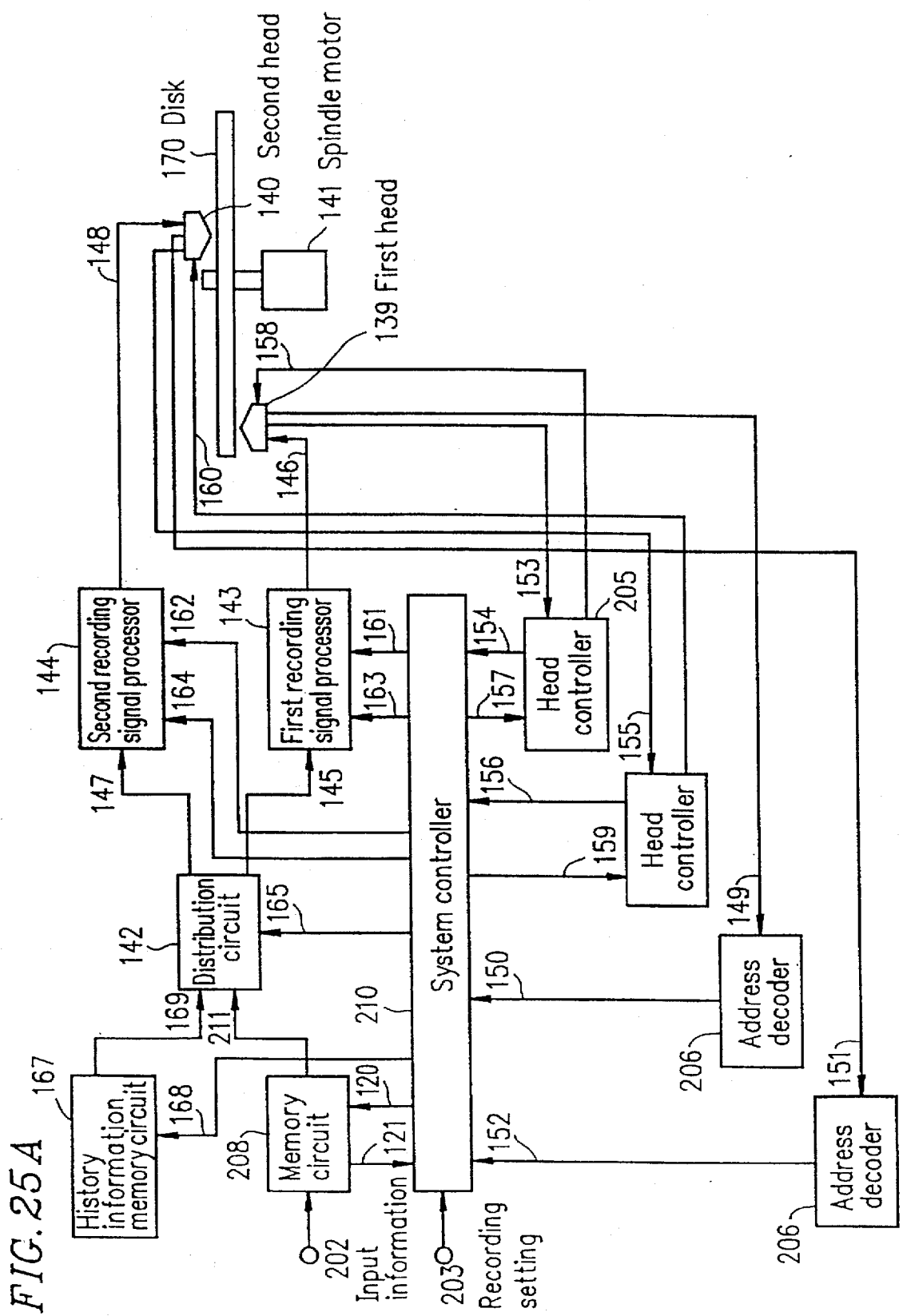
FIG. 25A is a block diagram showing a configuration of an optical disk recording apparatus according to a sixth example of the invention.

FIG. 25A is a block diagram showing a configuration of a disk recording apparatus according to a sixth example of the invention. In FIG. 25A, all the components other than a history information memory circuit 167 have completely the same functions as those of the components of the fifth example as shown in FIG. 23. The history information memory circuit 167 stores the sector in the emergent recording area 136 to which the head moves because of the generation of an off-track, and the sector in the normal recording area 137 to which the head returns when Q becomes equal to or smaller than Qm as track-jump history information 168 during the recording of a series of video data. After a series of recording operations are finished, the track-jump history information 169 read by the history information memory circuit 167 is recorded in a history information recording area 171 provided on the disk 170.

When the reproduction is started, by accessing to he history information recording area 171 on the disk 170 at first so as to reproduce the track-jump history information, the track-jump processing can be performed smoothly during the reproduction.

In this example, as shown in FIG. 25B, the history information recording area 171 is provided only on the outermost track on the disk 170. However, the position of the history information recording area 171 is not limited thereto. For example, the history information recording area 171 may be provided only on the innermost track of the disk 170, or on each sector in the emergent recording area 136 and the normal recording area 137. In such a case, the history information is required to be recorded simultaneously with the recording of the video data, not after the recording operation of a series of video data is finished. However, it is not necessary to reproduce the history information at once when the reproduction is started. Thus the track-jump processing can be performed sequentially while reproducing the signal.

In the foregoing first to sixth examples, the present invention has been described as being applied to a disk recording apparatus for recording information onto a disk-shaped recording medium such as an optical disk, a magneto-optical disk, and a magnetic disk. However, the present invention is applicable not only to such a disk recording apparatus, but also to any kind of information recording apparatus as long as the apparatus can record information onto a tape-shaped recording medium and a card-shaped recording medium by using a head. Particularly, in the case where an apparatus is likely to be affected by the vibration or the shock externally applied because of the construction thereof and the recording operation is very likely to be interrupted depending upon the operation condition thereof, the present invention can be applied to such an apparatus very effectively. A disk cam-corder described above is a typical example of such an apparatus. The method of this invention is very effective in improving the resistance to the vibration or the shock of the entire apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording method for writing input information into a memory means once so as to record the information read from the memory means onto a recording medium, wherein a detection of a recording-enable state and a recording-disable state of a recording means is performed during a series of recording operations; on detecting the recording-disable state, the recording operation of the recording means and a reading of the information from the memory means are interrupted; after the recording-enable state is detected again, the reading of the information from the memory means and the recording operation are started again; and a write rate into the memory means is reduced during a predetermined period after the detection of the recording-disable state.

2. An information recording method for writing input information into a memory means once so as to record the information read from the memory means onto a recording medium, wherein a detection of a recording-enable state and a recording-disable state of a recording means, and a detection of a remaining capacity of the memory means are performed during a series of recording operations; on detecting the recording-disable state, the recording operation of the recording means and a reading of the information from the memory means are interrupted; after the recording-enable state is detected again, the reading of the information from the memory means and the recording operation are started again; and based on results of the detection of the recording-enable state, the recording-disable state, and the remaining capacity, a period during which a write rate into the memory means is reduced is determined.

3. An information recording method for writing input information into a memory means once so as to record the information read from the memory means onto a recording medium, wherein a detection of vibration or shock externally applied, a detection of a recording-enable state and a recording-disable state of a recording means, and a remaining capacity of the memory means are performed during a series of recording operations; on detecting the recording-disable state or the vibration or the shock at a predetermined acceleration or more, the recording operation of the recording means and a reading of the information from the memory means are interrupted; after the recording-enable state, or a decrease in the vibration or the shock externally applied to the predetermined acceleration or less is detected again, the reading of the information from the memory means and the recording operation are started again; and based on results of the detection of the vibration or the shock externally applied, the recording-enable state, the recording-disable state, and the remaining capacity, a period during which a write rate into the memory means is reduced is determined.

4. An information recording method according to claim 3, wherein the input information is a video signal; the video signal is analog/digital converted; the analog/digital converted data is written into a memory means; and a number of quantization bits at the analog/digital conversion processing is reduced during a predetermined period.

5. An information recording method according to claim 3, wherein the input information is a video signal; a write rate into the memory means is reduced by deleting a part of pixel of the video signal during a predetermined period.

6. An information recording method according to claim 3, wherein the input information is a video signal; a write rate into the memory means is reduced by deleting the video signal on a frame basis or on a field basis during a predetermined period.

7. An information recording method according to claim 3, wherein the input information is a video signal; the video signal is orthogonally transformed into a frequency region based on a first block consisting of a predetermined number of pixels; the orthogonally transformed data is written into the memory means; and a write rate into the memory means is reduced by deleting a part of the orthogonally transformed data and corresponding to AC components of the first block during a predetermined period.

8. An information recording method according to claim 3, wherein the input information is a video signal; the video signal is orthogonally transformed into a frequency region based on a first block consisting of a predetermined number of pixels; the orthogonally transformed data is quantized by using a plurality of quantization matrices and the quantized data is written into the memory means; and a write rate into the memory means is reduced by performing the quantization using a quantization matrix where the values of a part or all of the respective components are larger than those of a quantization matrix used for normal recording during a predetermined period.

9. An information recording method according to claim 3, wherein the input information is a video signal; the video signal is coded based on a second block consisting of a predetermined number of pixels; the coded data is written into the memory means; and a write rate into the memory means is reduced by deleting the coded data based on the second block during a predetermined period.

10. An information recording method according to claim 3, wherein a coded data obtained by error-correction coding the input information is written into the memory means; and a method for generating an error-correction code is changed during a predetermined period.

11. An information recording method for writing input information into a memory means once based on a predetermined unit so as to record the information read from the memory means onto a recording medium, wherein a detection of a remaining capacity of the memory means and a detection of an overflow of the memory means are performed during a series of recording operations; and based on results of the detection of the remaining capacity and the detection of the overflow, a period during which a write rate into the memory means is reduced, and a period during which the information after the detection of the overflow is overwritten on a data written into the memory means are determined.

12. An information recording method for writing input information into a memory means once based on a predetermined unit so as to record the information read from the memory means onto a recording medium, wherein a detection of a recording-enable state and a recording-disable state of a recording means, a detection of a remaining capacity of the memory means and a detection of an overflow of the memory means are performed during a series of recording operations; and based on results of the detection of the recording-enable state and the recording-disable state, the detection of the remaining capacity, and the detection of the overflow, a period during which a write rate into the memory means is reduced, and a period during which the information after the detection of the overflow is overwritten on a data written into the memory means are determined.

13. An information recording method for writing input information into a memory means once based on a predetermined unit so as to record the information read from the memory means onto a recording medium, wherein a detection of vibration or shock externally applied, a detection of a recording-enable state and a recording-disable state of a recording means, a detection of a remaining capacity of the memory means, and a detection of an overflow of the memory means are performed during a series of recording operations; and based on results of the detection of the vibration or the shock externally applied, the detection of the recording-enable state and the recording-disable state, the detection of the remaining capacity, and the detection of the overflow, a period during which a write rate into the memory means is reduced, and a period during which the information after the detection of the overflow is overwritten on a data written into the memory means are determined.

14. An information recording method for writing input information into a memory means once based on a predetermined unit so as to record the information read from the memory means onto a recording medium, wherein a detection of an overflow of the memory means is performed during a series of recording operations; and when the overflow of the memory means is detected, the information after the detection of the overflow is overwritten on a data written into the memory means based on the predetermined unit, and wherein the input information is a video signal; the video signal is divided into odd-numbered pixel blocks consisting of a plurality of odd-numbered pixels obtained by a checkerboard sampling with respect to a screen and even-numbered pixel blocks consisting of a plurality of even-numbered pixels; the divided data is written into the memory means based on the odd-numbered pixel blocks and the even-numbered pixel blocks; and overwriting is performed only on portions of the data written into the memory means where the odd-numbered pixel blocks or the even-numbered pixel blocks are written during a predetermined period.

15. An information recording method for writing input information into a memory means once based on a predetermined unit so as to record the information read from the memory means onto a recording medium, wherein a detection of an overflow of the memory means is performed during a series of recording operations; and when the overflow of the memory means is detected, the information after the detection of the overflow is overwritten on a data written into the memory means based on the predetermined unit, and wherein the input information is a video signal; the video signal is coded based on a second block consisting of a predetermined number of pixels; the coded data is written into the memory means based on the second block; and overwriting is performed only on portions of the data written into the memory means where a data corresponding to a predetermined number of second blocks per frame or field of the video signal is written during a predetermined period.

16. An information recording method for writing input information into a memory means once based on a predetermined unit so as to record the information read from the memory means onto a recording medium, wherein a detection of an overflow of the memory means is performed during a series of recording operations; and when the overflow of the memory means is detected, the information after the detection of the overflow is overwritten on a data written into the memory means based on the predetermined unit, and wherein the input information is a video signal; the video signal is coded by using an orthogonal transform into a frequency region based on a block consisting of a predetermined number of pixels; the coded data is divided into a third block consisting of a part of AC components in the first block and a fourth block consisting of the other AC components and DC components; the divided coded data is written into the memory means based on the third block and the fourth block; and overwriting is performed only on portions of the data written into the memory means where the data corresponding to the third block is written during a predetermined period.

17. An information recording method for writing input information into a memory means once based on a predetermined unit so as to record the information read from the memory means onto a recording medium, wherein a detection of an overflow of the memory means is performed during a series of recording operations; and when the overflow of the memory means is detected, the information after the detection of the overflow is overwritten on a data written into the memory means based on the predetermined unit, and wherein the input information is error-correction coded by using a product code; the error-correction coded data is divided into a check block consisting of inner codes including a check bit for an outer code and an information block consisting of inner codes including an information bit for an outer code; the divided data is written into the memory means based on the check block and the information block; and overwriting is performed only on portions of the data written into the memory means where the data corresponding to the check block is written during a predetermined period.

18. An information recording method for writing input information into a memory means once so as to record the information read from the memory means onto a recording medium where a track formed thereon is divided into a plurality of sectors to which address information is added, wherein a write rate into the memory means is varied based on a third block consisting of a number of bits corresponding to the sector; and rate variation management information including address information of the sector corresponding to a rate variation point is recorded in a predetermined area on the recording medium.

19. An information recording apparatus comprising: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; and a recording-disable detection means for detecting a recording-enable state and a recording-disable state of the recording means so as to output a recording-disable signal to the data amount control means, the memory control means and the recording control means under the recording-disable state, wherein, while the recording-disable signal is output, the memory control means interrupts the reading of the memory means; the recording control means interrupts the recording operation of the recording means; and the data amount control means reduces the data amount of the input information during a predetermined period subsequent to the output of the recording-disable signal.

20. An information recording apparatus according to claim 19, wherein a track is formed on the recording medium; the recording means records on the track formed on the recording medium; and the recording-disable detection means detects the recording-disable state by using a tracking error signal output from the recording means.

21. An information recording apparatus according to claim 19, wherein the recording medium is an optical recording medium on which a track is formed; the recording means records on the track formed on the recording medium by focusing a light spot thereon; and the recording-disable detection means detects the recording-disable state by using a focusing error signal output from the recording means.

22. An information recording apparatus according to claim 19, wherein the recording-disable detection means comprises a vibration detection means for detecting a vibration or an shock externally applied; and at least while the vibration or the shock at a predetermined acceleration or more is detected, the recording-disable detection means outputs the recording-disable signal.

23. An information recording apparatus comprising: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; and a disability detection means for detecting a variation in the rotation speed of the recording medium and for outputting a rotation speed disability signal to the data amount control means, the memory control means and the recording control means when the rotation speed is varied from the predetermined rotation speed, wherein, while the rotation speed disability signal is output, the memory control means interrupts the reading of the memory means; the recording control means interrupts the recording operation of the recording means; and the data amount control means reduces the data amount of the input information during a predetermined period from after the rotation speed disability signal is output.

24. An information recording apparatus comprising: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; a recording-disable detection means for detecting a recording-enable state and a recording-disable state of the recording means, and a variation in the rotation speed of the rotation means so as to output a recording-disable signal to the data amount control means, the memory control means and the recording control means when the recording means is under the recording-disable state or when the rotation speed is varied from the predetermined rotation speed; and a remaining capacity detection means for detecting the remaining capacity of the memory means so as to output a remaining capacity decrease signal to the data amount control means when the remaining capacity is of a predetermined value or less, wherein, while the recording-disable signal is output, the memory control means interrupts the reading of the memory means; the recording control means interrupts the recording operation of the recording means; the data amount control means starts a processing for reducing the data amount of the input information from the point where the recording-disable signal is output; and in a case where the remaining capacity decrease signal is output when the recording-disable signal is no longer output, the data amount control means performs a processing for reducing the data amount of the input information until the remaining capacity decrease signal is no longer output.

25. An information recording apparatus comprising: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; a vibration detection means for outputting a vibration/shock detection signal to the data amount control means when a vibration or a shock externally applied at a predetermined acceleration or more is detected; a recording-disable detection means for detecting a recording-enable state and a recording-disable state of the recording means, and a variation in the rotation speed of the recording medium so as to output a recording-disable signal to the data amount control means, the memory control means and the recording control means when the recording means is under the recording-disable state or when the rotation speed is varied from the predetermined rotation speed; and a remaining capacity detection means for detecting the remaining capacity of the memory means so as to output a remaining capacity decrease signal to the data amount control means when the remaining capacity is predetermined value or less, wherein, while the recording-disable signal is output, the memory control means interrupts the reading of the memory means; the recording control means interrupts the recording operation of the recording means; and the data amount control means performs a processing for reducing the data amount of the input information by using the vibration/shock detection signal, the recording-disable signal and the remaining capacity decrease signal.

26. An information recording apparatus comprising: a data amount control means for controlling a data amount of input information; a memory means for temporarily storing the data whose amount is controlled by the data amount control means; a memory control means for controlling to write and to read the data into the memory means; a recording means for recording the data read from the memory means onto a recording medium; a recording control means for controlling a start and an interruption of a recording operation of the recording means; a rotation means for rotating the recording medium at a predetermined rotation speed; a vibration detection means for outputting a vibration/shock detection signal to the data amount control means when a vibration or a shock externally applied at a predetermined acceleration or more is detected; a recording-disable detection means for detecting a recording-enable state and a recording-disable state of the recording means, and a variation in the rotation speed of the recording medium so as to output a recording-disable signal to the data amount control means, the memory control means and the recording control means when the recording means is under the recording-disable state or when the rotation speed is varied from the predetermined rotation speed; and a remaining capacity detection means for detecting a remaining capacity of the memory means so as to output a remaining capacity decrease signal to the data amount control means when the remaining capacity is of a predetermined value or less, and a memory full signal to the data amount control means and the memory control means when an overflow of the memory means is detected, wherein, whale the recording-disable signal is output, the memory control means interrupts the reading of the memory means; the recording control means interrupts the recording operation of the recording means; the data amount control means performs a processing for reducing the data amount of the input information by using the vibration/shock detection signal, the recording-disable signal and the remaining capacity decrease signal; and the memory control means overwrites the data after the detection of the overflow in a predetermined area within the memory means during a predetermined period from after the memory full signal is output.

* * * * *